US010782499B2

(12) United States Patent
Van Baelen et al.

(10) Patent No.: US 10,782,499 B2
(45) Date of Patent: Sep. 22, 2020

(54) CABLE STORAGE ARRANGEMENT

(71) Applicants: CommScope Connectivity Belgium BVBA, Kessel-Lo (BE); ADC Czech Republic, S.R.O., Brno (CZ)

(72) Inventors: David Jan Irma Van Baelen, Winksele (BE); Jiri Ambroz, Brno (CZ); Stephane Collart, Olen (BE)

(73) Assignees: CommScope Connectivity Belgium BVBA, Kessel-Lo (BE); ADC Czech Republic, S.R.O., Brno (CZ)

( * ) Notice: Subject to any disclaimer, the term of this patent is extended or adjusted under 35 U.S.C. 154(b) by 0 days.

(21) Appl. No.: 15/567,923

(22) PCT Filed: Apr. 22, 2016

(86) PCT No.: PCT/EP2016/059103
§ 371 (c)(1),
(2) Date: Oct. 19, 2017

(87) PCT Pub. No.: WO2016/170171
PCT Pub. Date: Oct. 27, 2016

(65) Prior Publication Data
US 2018/0299632 A1    Oct. 18, 2018

Related U.S. Application Data

(60) Provisional application No. 62/151,239, filed on Apr. 22, 2015.

(51) Int. Cl.
*G02B 6/44*  (2006.01)
*G02B 6/38*  (2006.01)

(52) U.S. Cl.
CPC ......... *G02B 6/4457* (2013.01); *G02B 6/3897* (2013.01); *G02B 6/4466* (2013.01); *G02B 6/4471* (2013.01)

(58) Field of Classification Search
CPC ... G02B 6/4457; G02B 6/3897; G02B 6/4466
See application file for complete search history.

(56) References Cited

U.S. PATENT DOCUMENTS 6,889,926 B1    5/2005  Li
9,354,415 B2 *  5/2016  Nair ..................... G02B 6/4441
(Continued)

FOREIGN PATENT DOCUMENTS

EP      2 159 618 A1    3/2010
JP    2009-131212 A1    6/2009
(Continued)

OTHER PUBLICATIONS

International Search Report and Written Opinion of the International Searching Authority for corresponding International Patent Application No. PCT/EP2016/059103 dated Nov. 14, 2016, 17 pages.

*Primary Examiner* — Sung H Pak
*Assistant Examiner* — Hoang Q Tran
(74) *Attorney, Agent, or Firm* — Merchant & Gould P.C.

(57) ABSTRACT

Example telecommunications wall outlets (200) include a base structure (220) and a stationary spool structure (237) extending from the base structure (220). The spool structure (237) includes a hub portion (248) extending between a first wall (238) and a second wall (250). A length of fiber optic cable (190) is coiled about the hub portion (248) between the first and second walls (238, 250). A cover (260) is also provided which covers at least a portion of the spool structure (237). The cover (260) includes a port (266) aligned over the hub portion (248) through which the length of cable can be dispensed from the spool structure (237) by unwinding the cable (190) about the spool structure (237) such that the port (266) revolves around the spool structure (237). Additional embodiments are disclosed.

14 Claims, 47 Drawing Sheets

(56) References Cited

U.S. PATENT DOCUMENTS

| | | | | |
|---|---|---|---|---|
| 2012/0055965 A1* | 3/2012 | Zhang | ................ | B65H 75/4434 |
| | | | | 224/269 |
| 2013/0094828 A1 | 4/2013 | Loeffelholz et al. | | |
| 2014/0010513 A1* | 1/2014 | Kowalczyk | .......... | G02B 6/4441 |
| | | | | 385/135 |
| 2014/0224913 A1* | 8/2014 | Wilson | ............... | B65H 75/4402 |
| | | | | 242/378 |

FOREIGN PATENT DOCUMENTS

| WO | 2012/138856 A1 | 10/2012 |
|---|---|---|
| WO | 2016/100927 A1 | 6/2016 |
| WO | 2016/170172 A1 | 10/2016 |

* cited by examiner

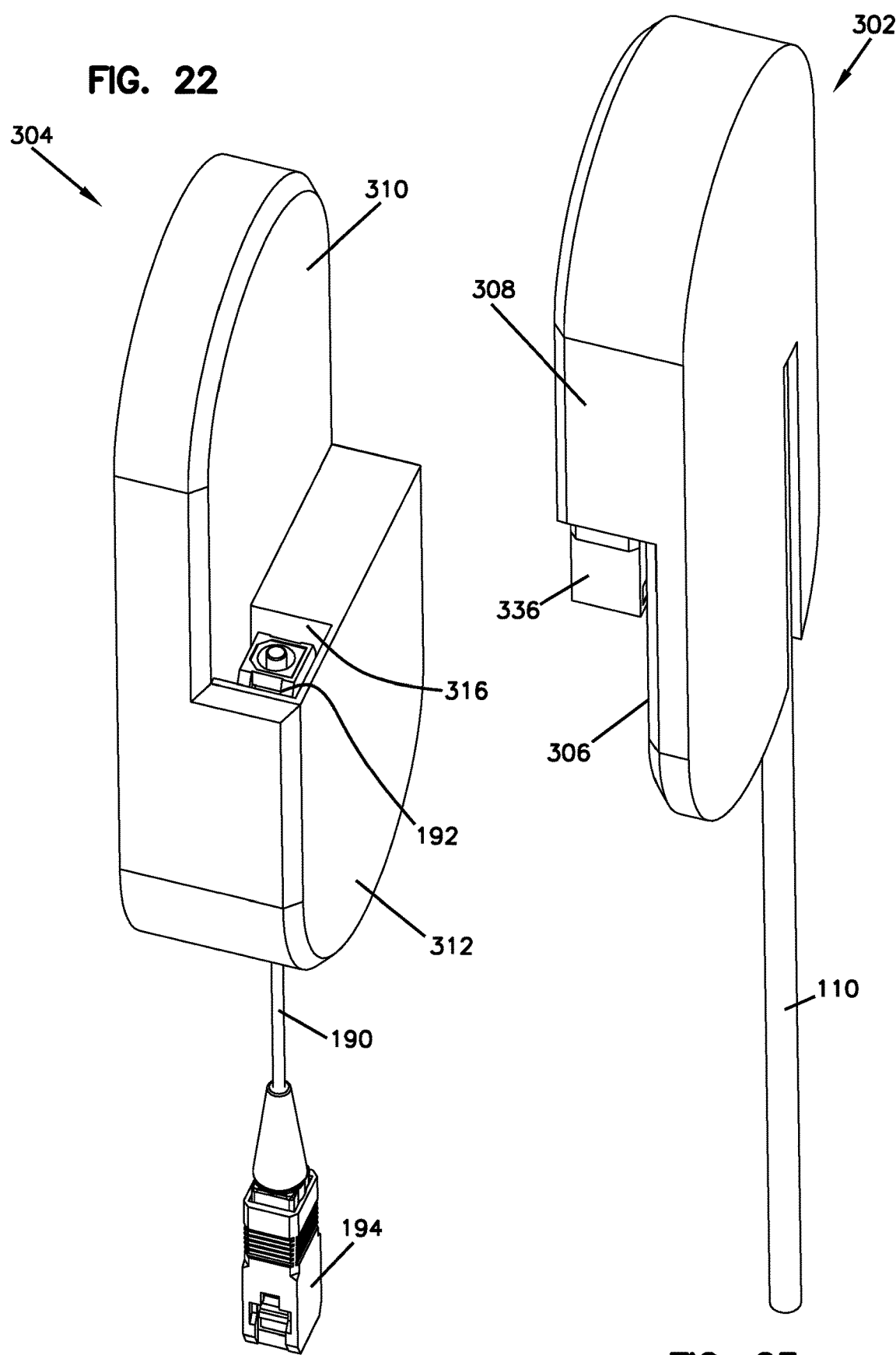

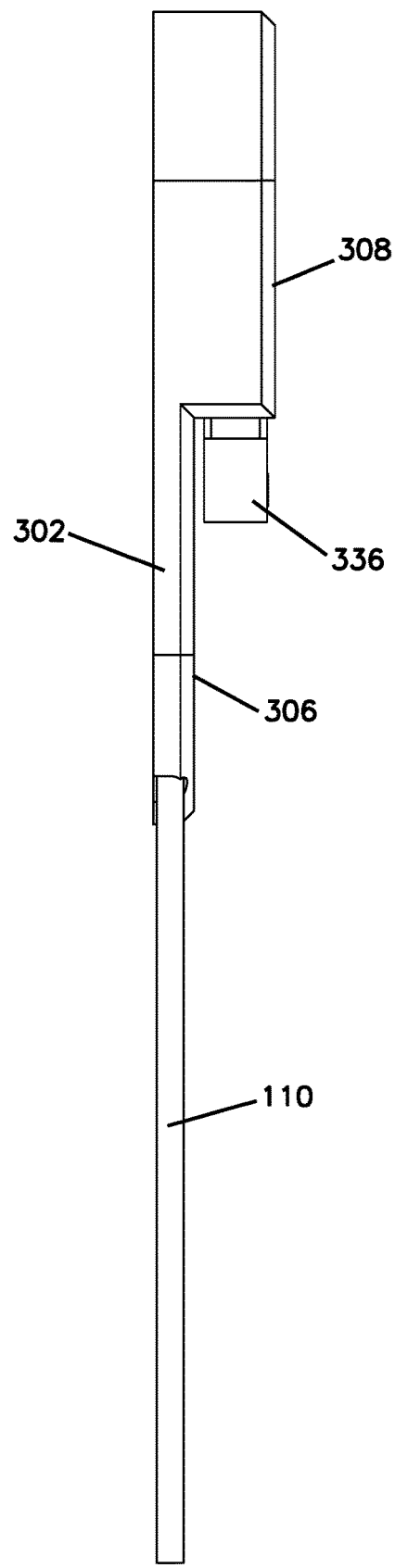
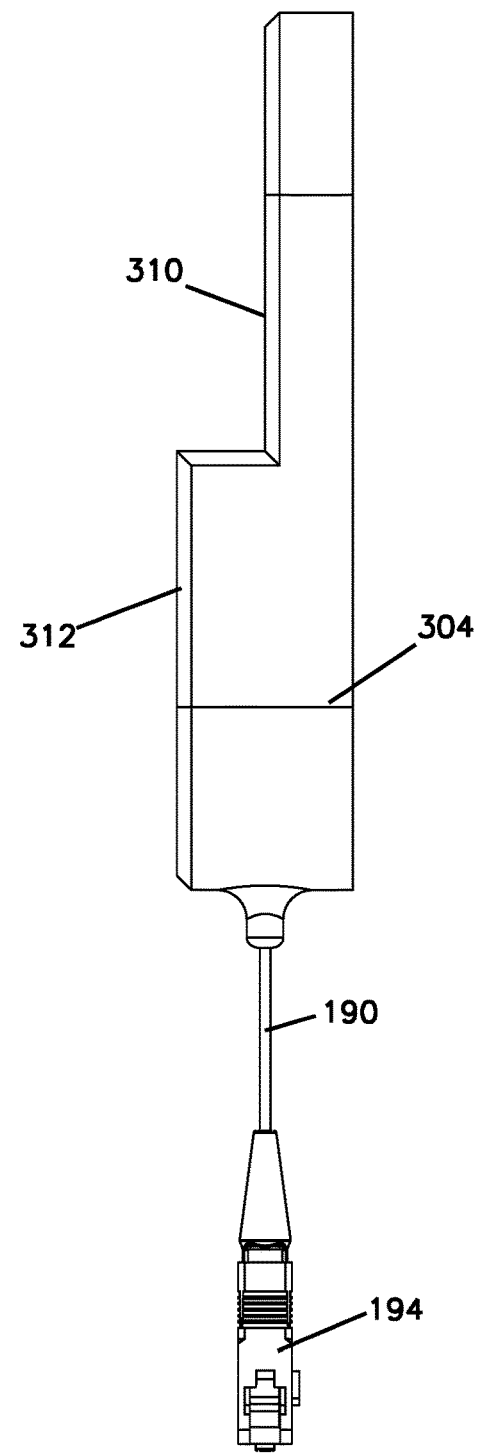

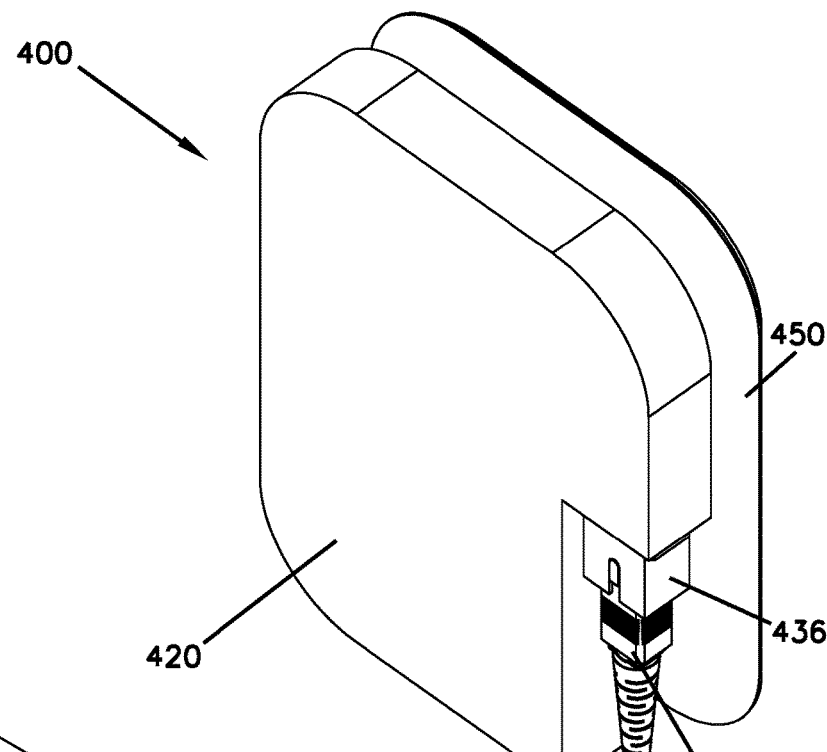
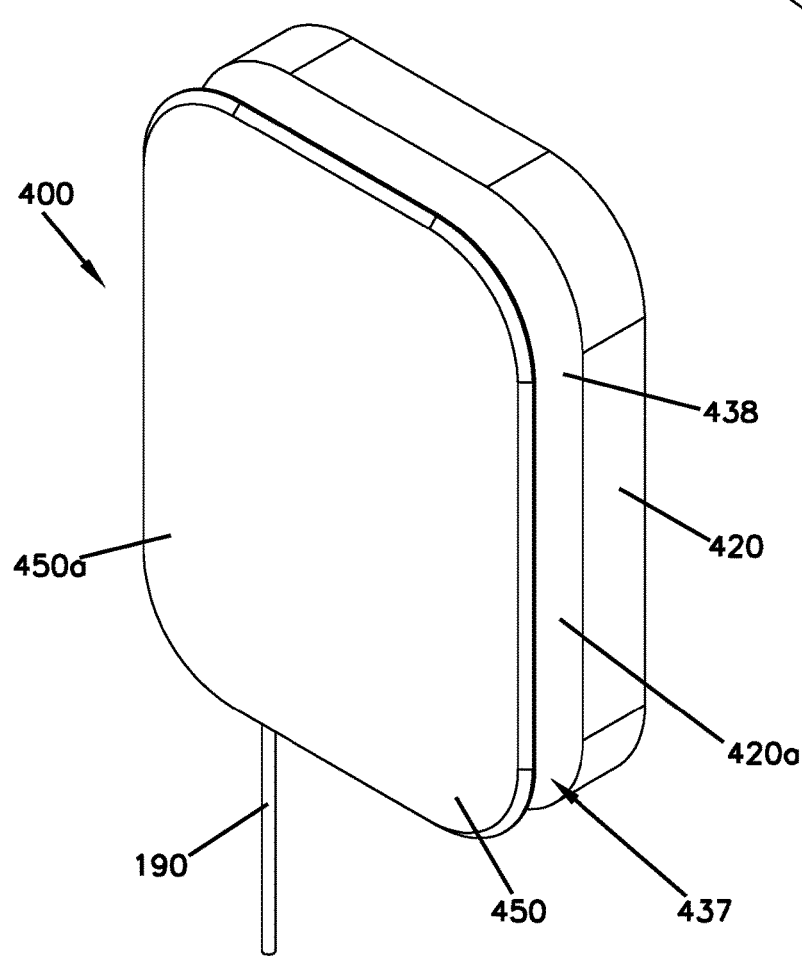
FIG. 28
FIG. 27

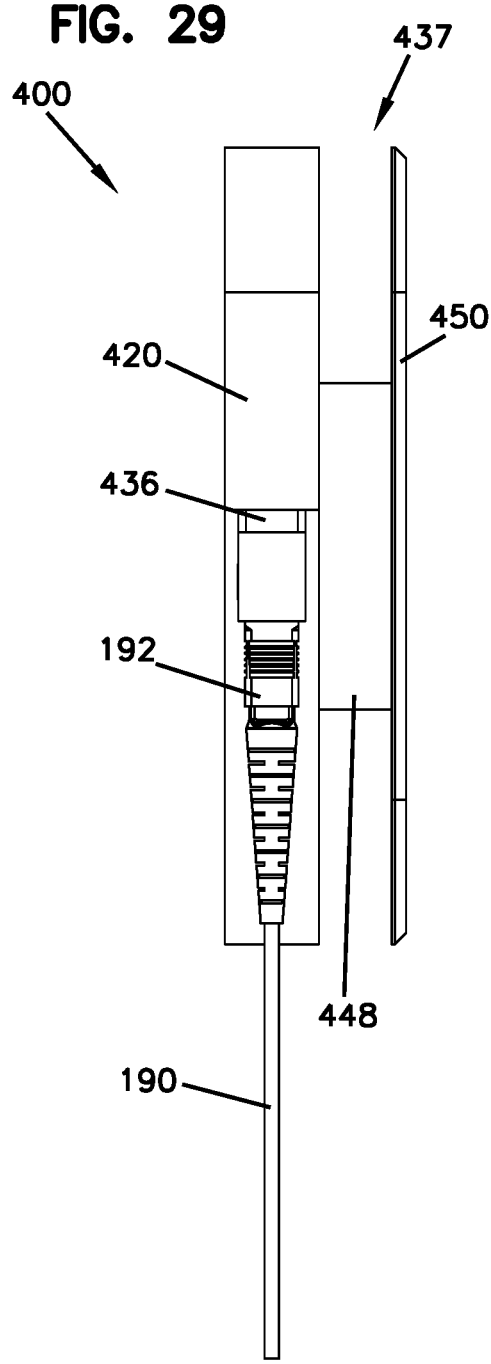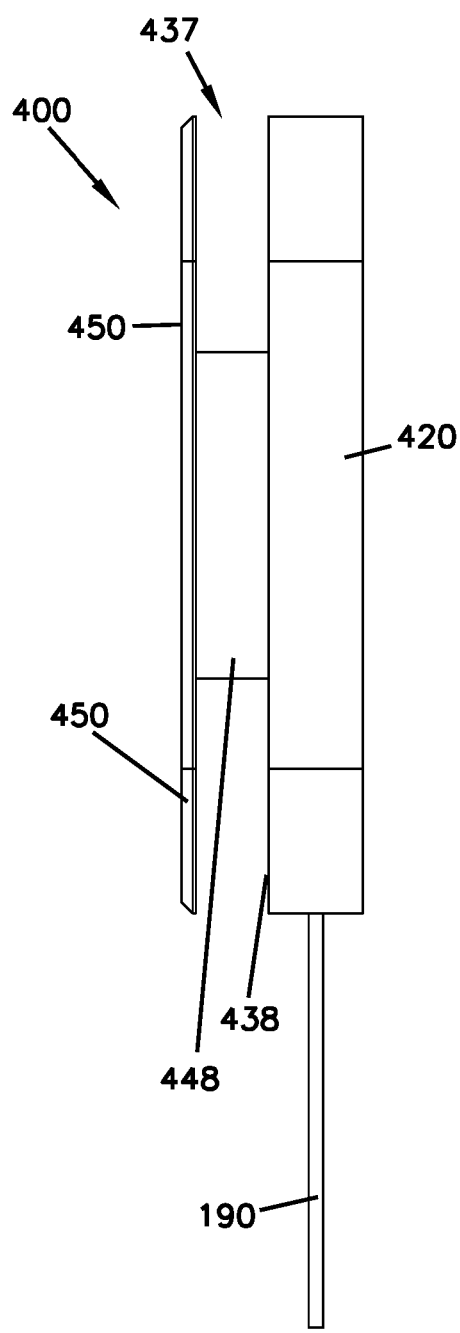

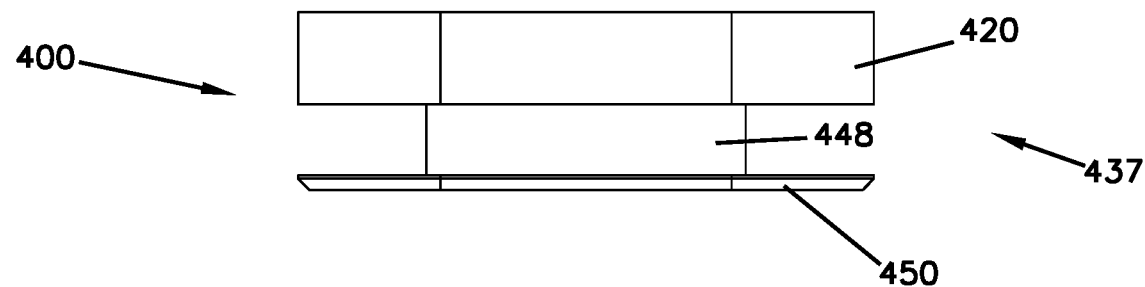
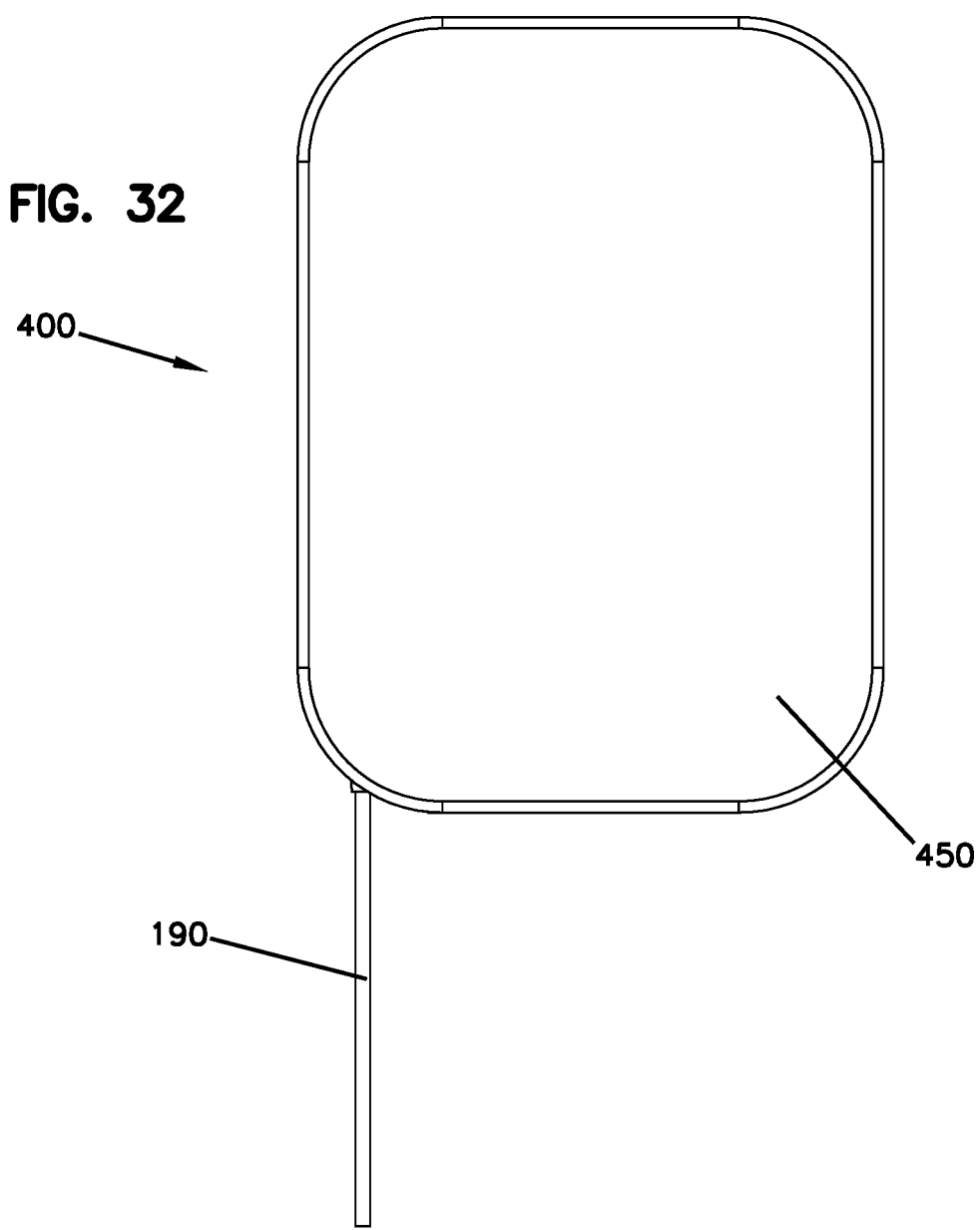

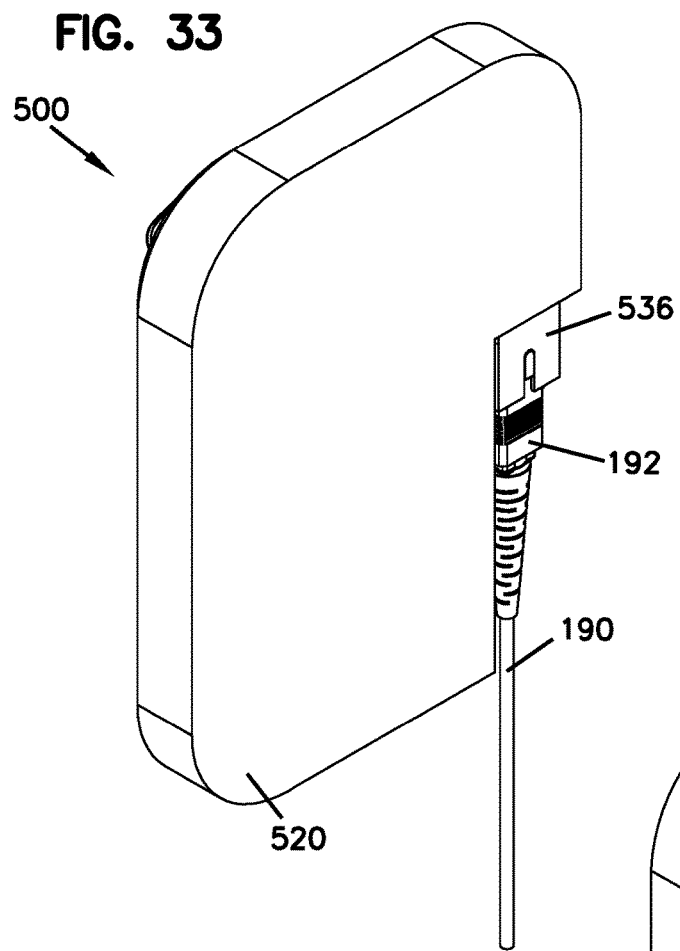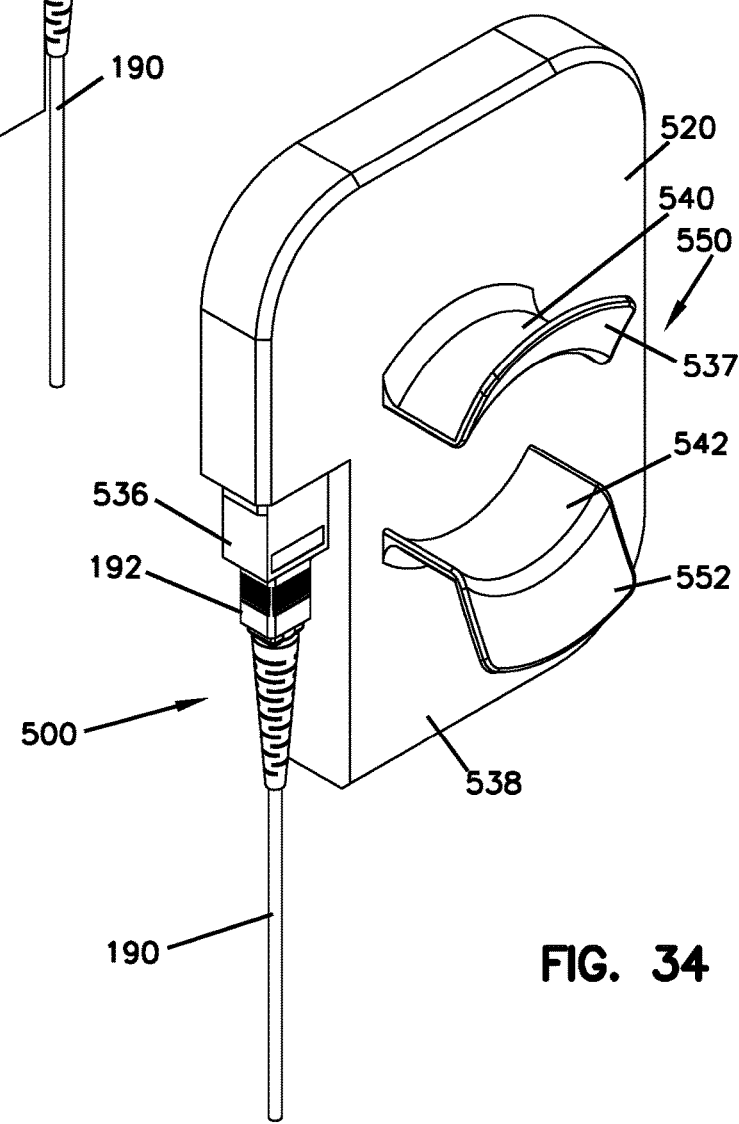

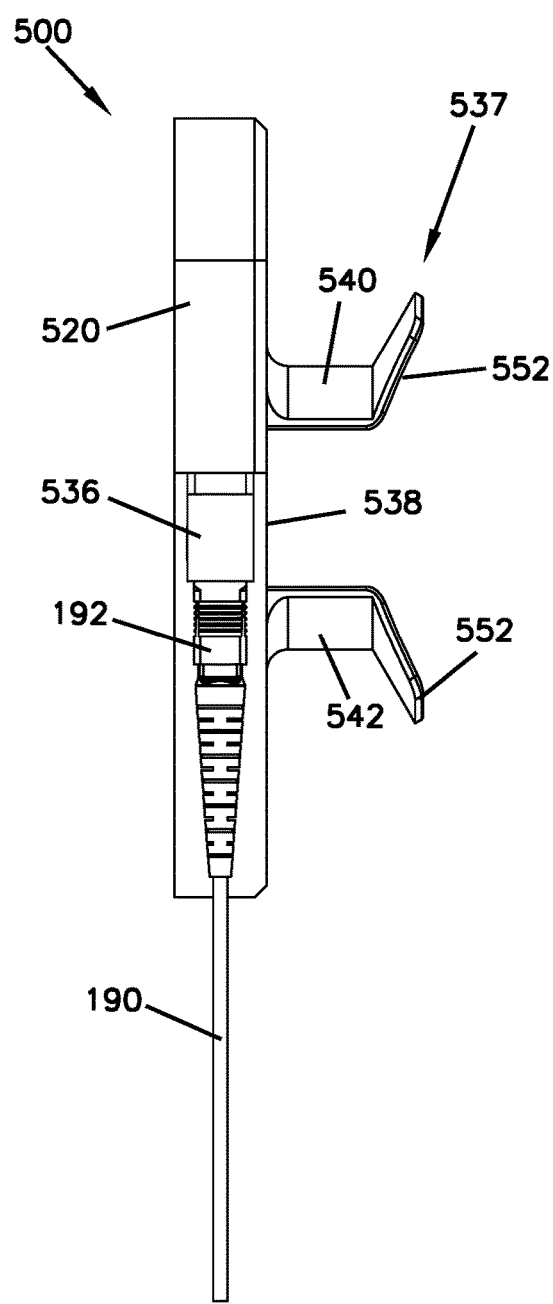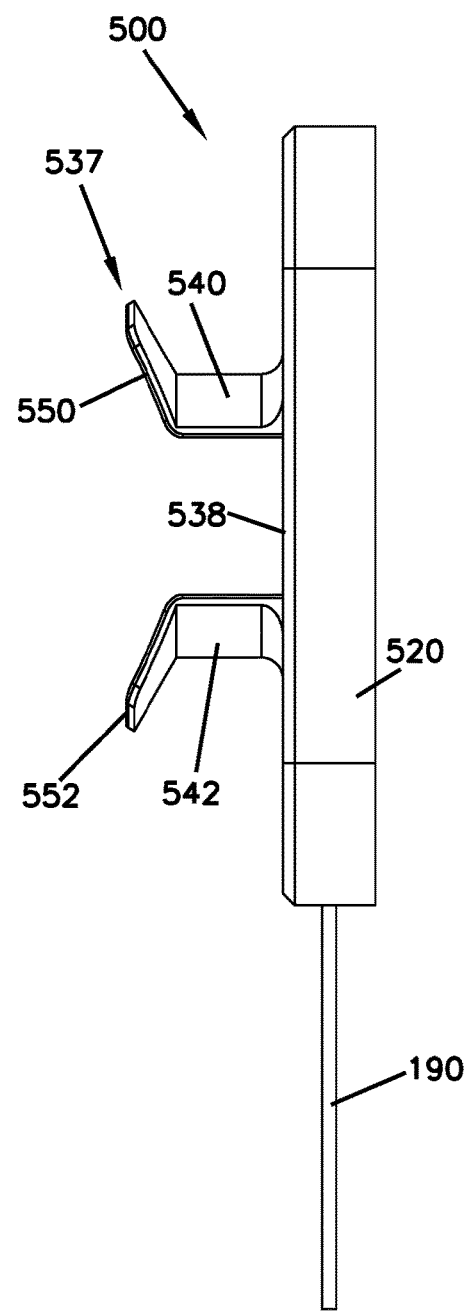

FIG. 40
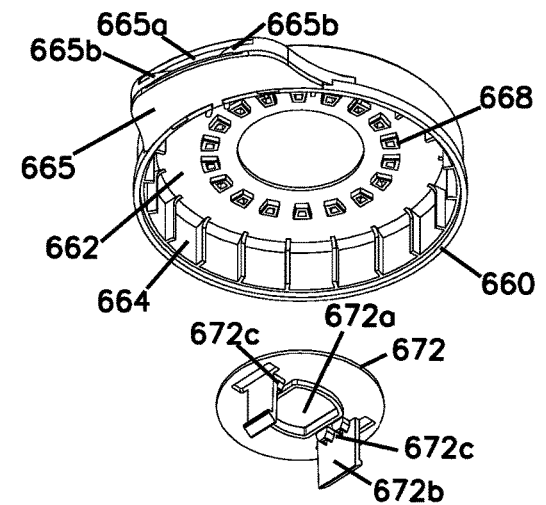
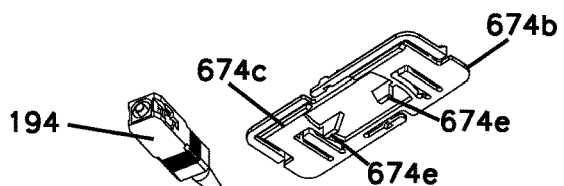
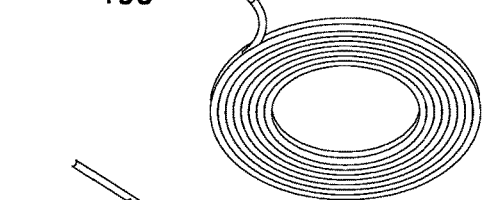
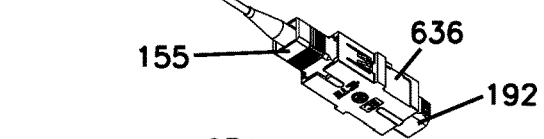
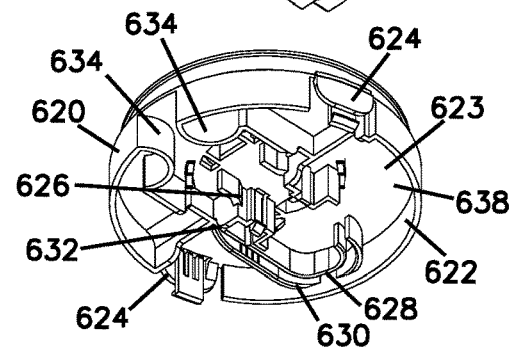
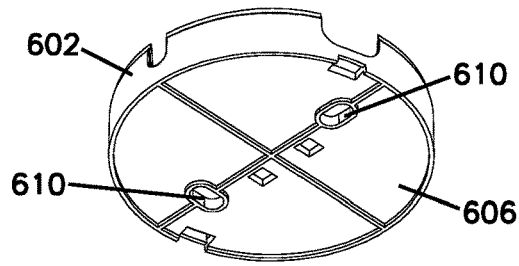

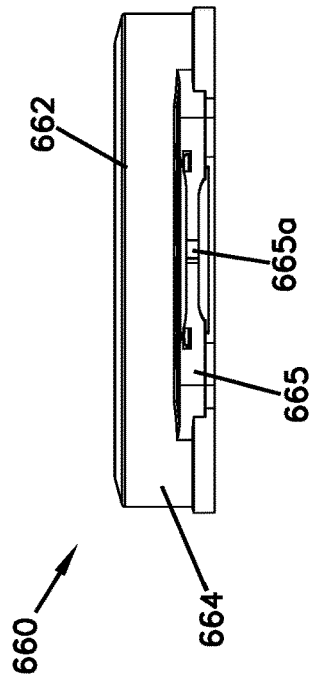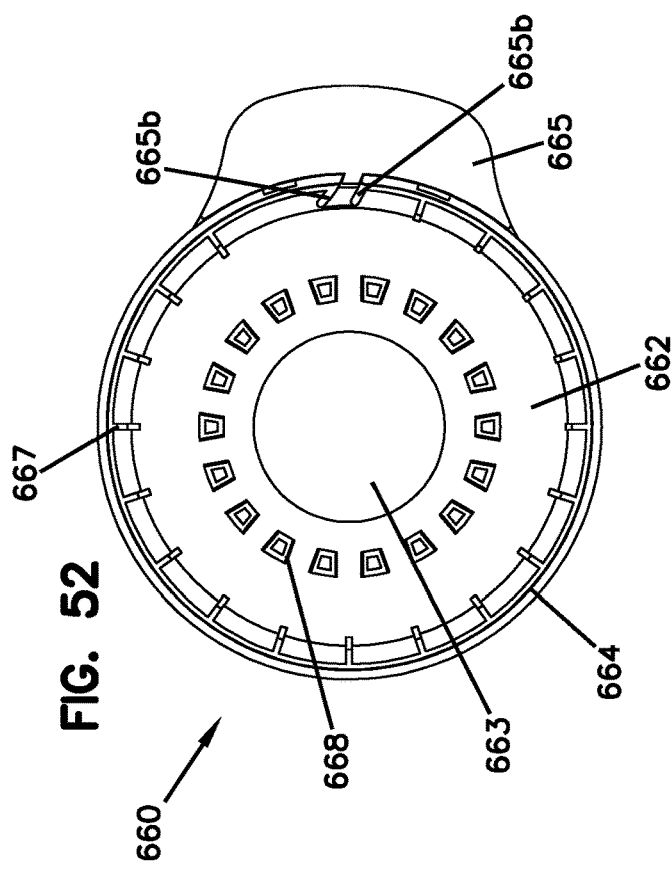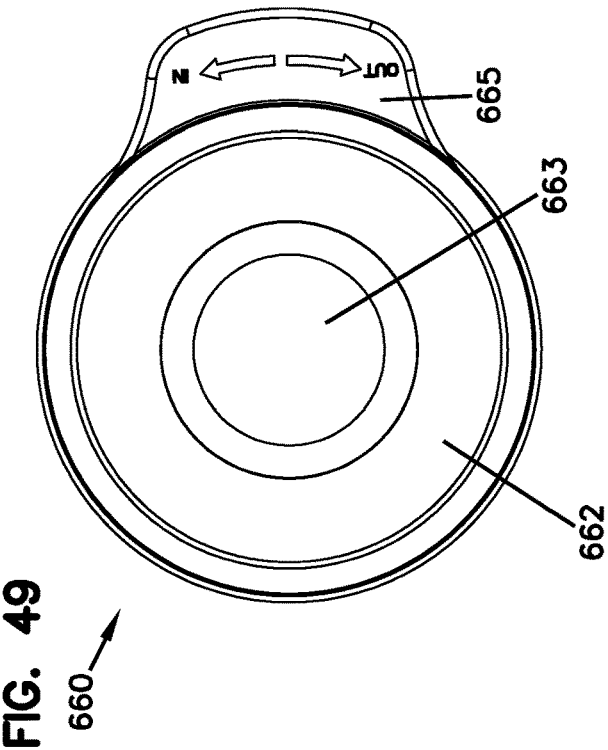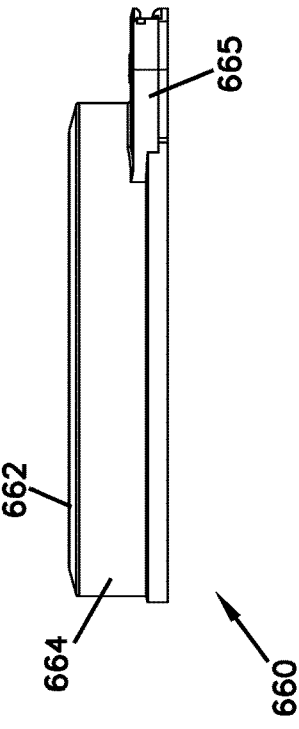

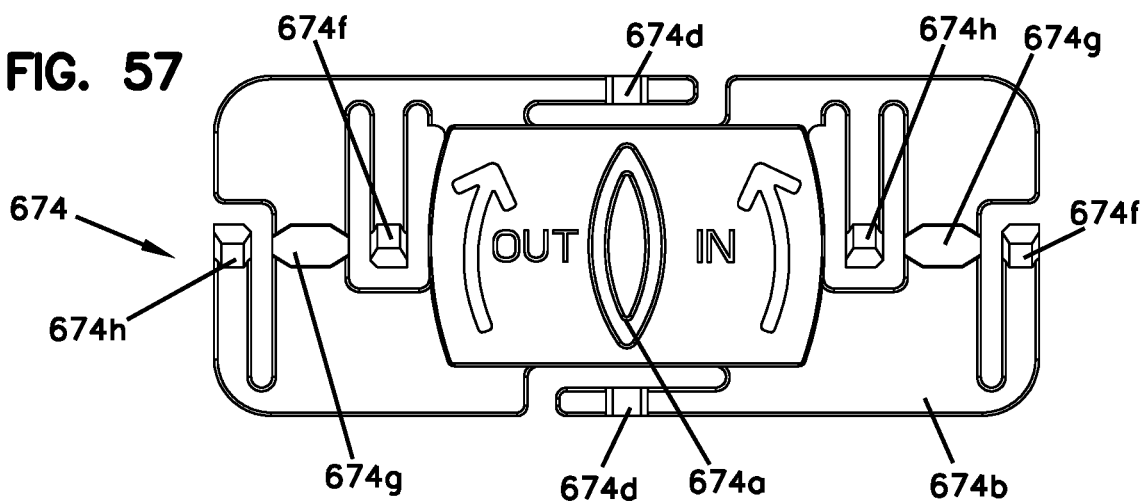
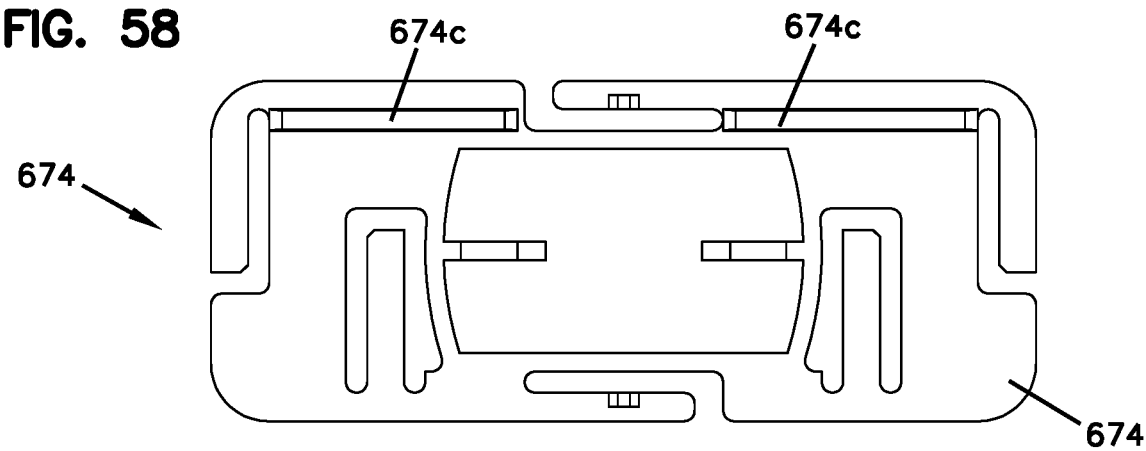
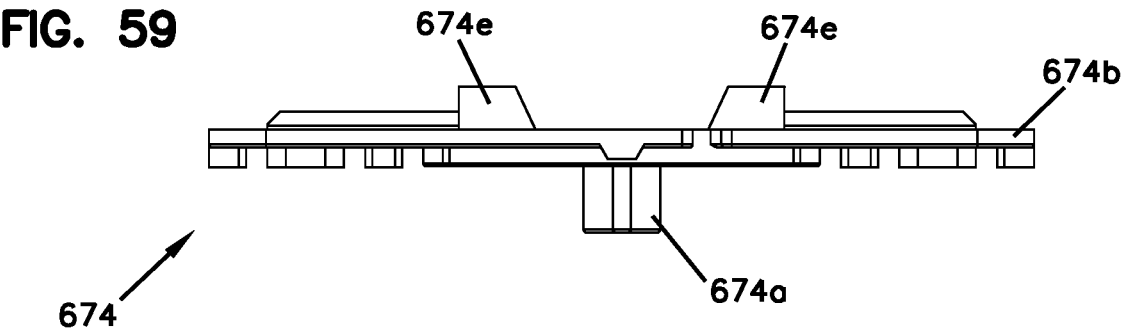
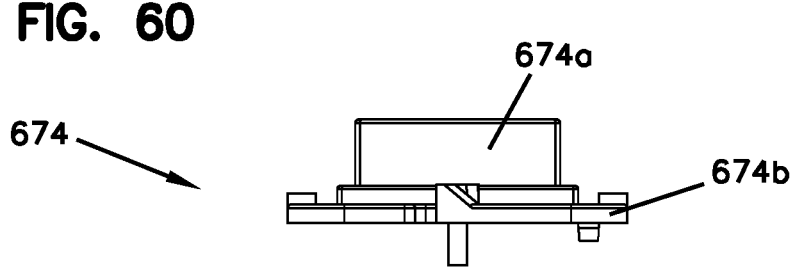

CABLE STORAGE ARRANGEMENT

CROSS-REFERENCE TO RELATED APPLICATION

This application is a National Stage Application of PCT/EP2016/059103, filed on Apr. 22, 2016, which claims the benefit of U.S. Patent Application Ser. No. 62/151,239, filed on Apr. 22, 2015, the disclosures of which are incorporated herein by reference in their entireties. To the extent appropriate, a claim of priority is made to each of the above disclosed applications.

BACKGROUND

Demand for fiber optic services is continuously increasing. In accommodating the need of current and future customers, fiber optic distribution cables are routed from a central office to extended areas. Providing fiber optic services to customers in some applications, such as to customers in a multiple dwelling unit, for example, involves splitting a fiber optic distribution cable into individual cables that are associated with a particular dwelling of the multiple dwelling unit.

In conventional arrangements, the distribution cable is routed from the central office to a large fiber distribution hub. The distribution cable is split out into a number of individual fiber optic cables at the fiber distribution hub. The individual fiber optic cables are then each routed to a wall-mount box (e.g., a floor box) located at the multiple dwelling unit. Subscriber cables are routed from the wall-mount box to one or more residences. The large fiber distribution hub is located remote from the wall-mount box. Typically, the fiber distribution hub splits out a number of multi-fiber distribution cables and feeds a number of wall-mount boxes.

In general, improvements are needed.

SUMMARY

Some aspects of the disclosure are directed to a cable storage arrangement or wall outlet including a base structure, a non-rotatable spool structure extending from the base structure, a length of cable wound about the spool structure, and a cover rotatably mounted to the base structure and/or spool structure. The spool structure includes a hub portion extending between a first wall and a second wall. The length of cable extends between first and second ends, each of which can be provided with a fiber optic connector. At least a portion of the cable is coiled about the spool structure hub portion between the first and second walls.

The cover is rotatably mounted to the spool structure and includes a sidewall extending over the second wall and at least a portion of the hub portion. The cover sidewall includes a port through which the length of cable can be dispensed from the spool structure. The port is aligned over the hub portion such that the cable can be dispensed from the spool structure by unwinding the cable about the stationary spool structure such that the port revolves around the hub portion.

In one example, a telecommunications cable storage arrangement or wall outlet is provided that includes a base unit that mates to a cable storage and dispensing unit. The base unit receives a first cable with a connector. The cable storage and dispensing unit stores and dispenses a second cable extending between a first connector and a second connector. The cable storage and dispensing unit is configured to mate with the base unit such that the first connector and the connector of the base are connected together by relative movement of the base unit and the cable storage and dispensing unit with an intermediate adapter. In one example, the relative movement is along an axis that is parallel to a longitudinal axis of the base and dispensing units. The second cable is wound into a coreless coil defining a hollow interior winding surface within an internal cavity of the cable storage and dispensing unit. The second cable is dispensed from the internal cavity through an aperture.

In one example, a telecommunications cable storage arrangement or wall outlet is provided that includes a base portion and a connector and/or an adapter located at least partially within the base portion. A spool structure extends from the base portion and includes a hub portion extending between the base portion and a cable retaining wall. A length of cable extends between a first fiber optic connector connected to the adapter and a second fiber optic connector, wherein at least a portion of the cable is coiled about the spool structure hub portion between the base structure and the cable retaining walls.

In one example, a cable storage arrangement is presented which includes a spool structure having a fixed hub portion being configured to be non-rotatably mounted to a surface, a length of cable coiled about the spool structure hub portion, and a cover secured to the spool structure. The cover can include a sidewall that extends over at least a portion of the spool structure. The cover can also include a port through which the length of cable can be dispensed from the spool structure and through the cover. A selector assembly is also provided that has at least a first position in which the cover is rotatable with respect to the spool structure and a second position in which the cover is non-rotatable with respect to the spool structure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 22 is a rear perspective view of the cable storage and dispensing unit shown in FIG. 20;

FIG. 23 is a rear perspective view of the base unit shown in FIG. 20;

FIG. 24 is a top view of the base unit shown in FIG. 20;

FIG. 25 is a top view of the cable storage and dispensing unit shown in FIG. 20;

FIG. 27 is a front perspective view of a third example telecommunications wall outlet having a base structure and a spool structure in accordance with the principles of the present disclosure;

FIG. 28 is a rear perspective view of the telecommunications wall outlet shown in FIG. 27;

FIG. 29 is a first side view of the telecommunications wall outlet shown in FIG. 27;

FIG. 30 is a second side view of the telecommunications wall outlet shown in FIG. 27;

FIG. 31 is a top view of the telecommunications wall outlet shown in FIG. 27;

FIG. 32 is a rear view of the telecommunications wall outlet shown in FIG. 27;

FIG. 33 is a rear perspective view of a fourth example telecommunications wall outlet having a base structure and a spool structure in accordance with the principles of the present disclosure;

FIG. 34 is a front perspective view of the telecommunications wall outlet shown in FIG. 33;

FIG. 36 is a first side view of the telecommunications wall outlet shown in FIG. 33;

FIG. 37 is a second side view of the telecommunications wall outlet shown in FIG. 33;

FIG. 40 is an exploded bottom perspective view of the telecommunications wall outlet shown in FIG. 38;

FIG. 49 is a top view of the cover shown in FIG. 47;

FIG. 50 is a front view of the cover shown in FIG. 47;

FIG. 51 is a side view of the cover shown in FIG. 47;

FIG. 52 is a bottom view of the cover shown in FIG. 47;

FIG. 57 is a top view of a selector plate of the telecommunications wall outlet shown in FIG. 38;

FIG. 58 is a bottom view of the selector plate shown in FIG. 57;

FIG. 59 is a front view of the selector plate shown in FIG. 57;

FIG. 60 is a side view of the selector plate shown in FIG. 57;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
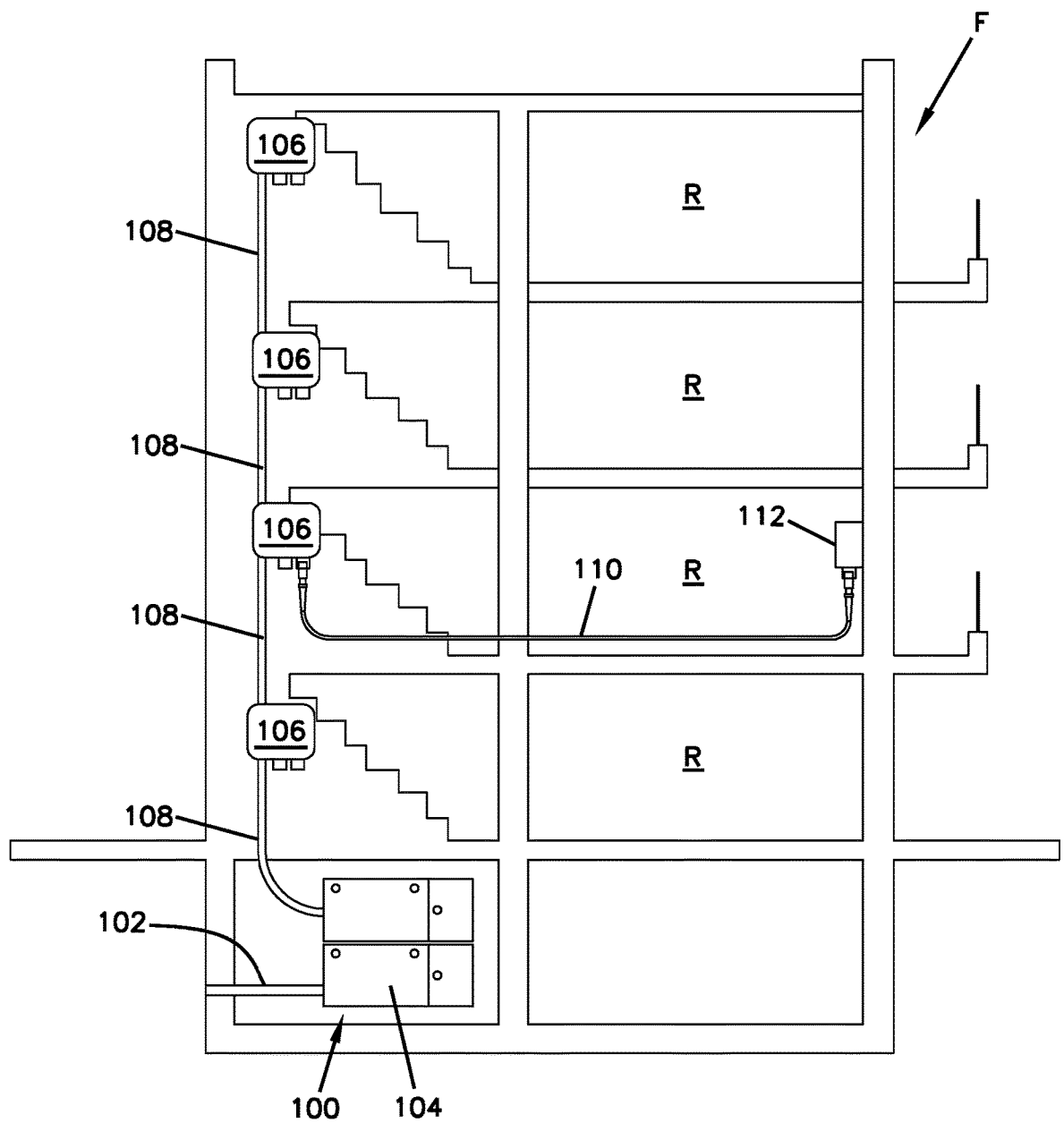
FIG. 1 is a schematic representation of a fiber optic network disposed in a facility.

FIG. 1 is a schematic representation of a fiber optic network 100 disposed in a facility F. In examples, the facility F includes multiple individual residences R (e.g., apartments, condominiums, businesses, etc.). In the example shown, the facility F includes five floors, including a basement, that each have one or more residences R located thereat. In other examples, the facility F can have a greater or lesser number of floors.

The fiber optic network 100 includes a feeder cable 102 from a central office (not shown). The feeder cable 102 enters a feeder cable input location 104 (e.g., a fiber distribution hub, a network interface device, etc.) disposed at the facility F (e.g., in the basement of the facility). The fiber distribution hub 104 has one or more optical splitters (e.g., 1-to-8 splitters, 1-to-16 splitters, or 1-to-32 splitters) that generate a number of individual fibers.

At least one fiber optic enclosure 106 is mounted at each floor of the facility F. In the example shown, a fiber optic enclosure 106 is mounted at each floor above the basement. The individual fibers generated by the optical splitters are routed to the fiber optic enclosures 106 via one or more riser cables 108. Examples of fiber optic enclosures 106 suitable for use in the fiber optic network 100 can be found in U.S. Publication No. 2013/0094828, the disclosure of which is hereby incorporated herein by reference.

Subscriber cables 110 are routed from the fiber optic enclosures 106 to respective residences R. The subscriber cable 110 includes an optical fiber disposed in a jacket or protective tubing. In some implementations, a subscriber cable 110 is routed to a transition box at the respective residence R. In other examples, a subscriber cable 110 is routed through the walls of the residence R (e.g., within ducts) towards a wall outlet 112.

Figure 2:
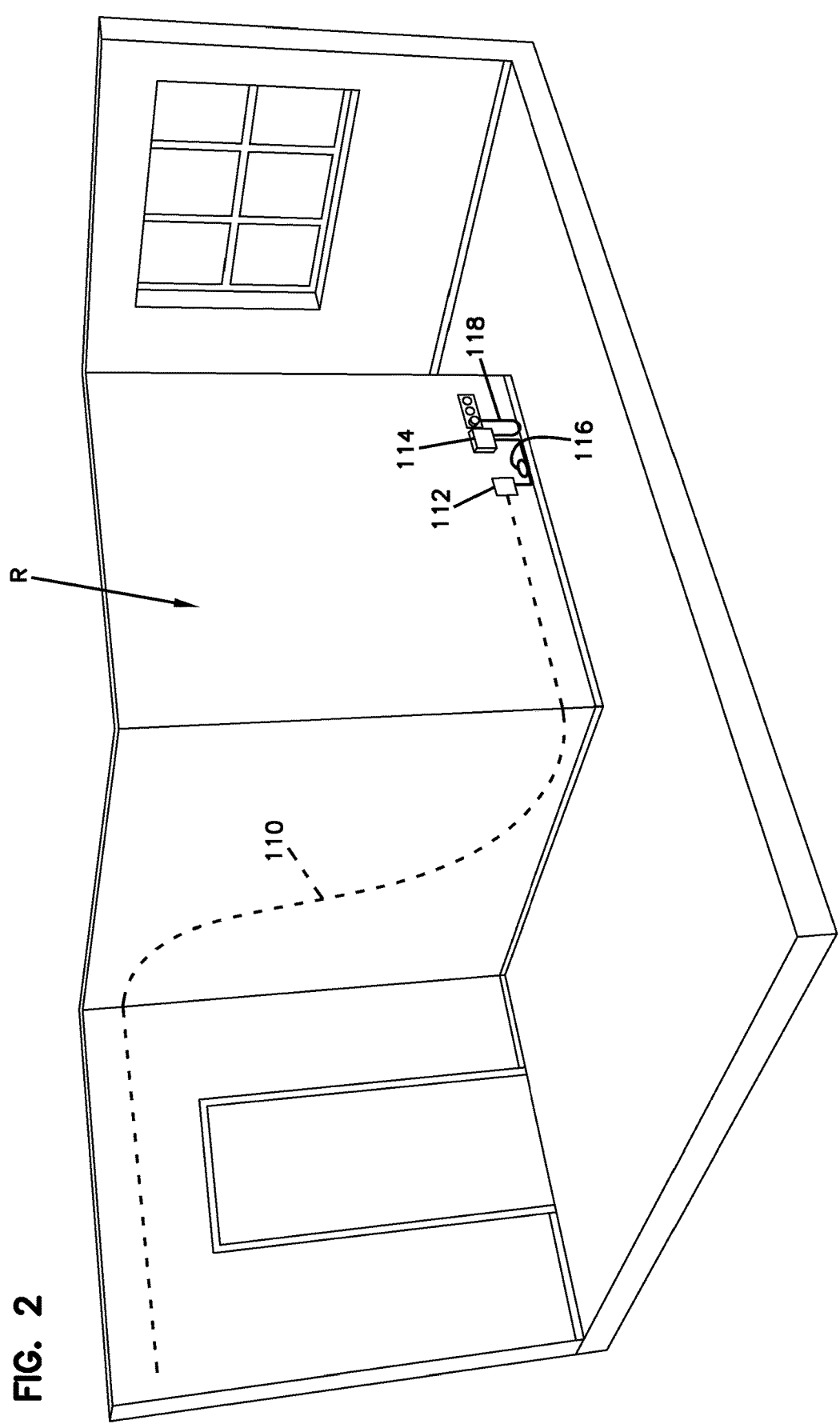
FIG. 2 is a schematic representation of an example residence in which a subscriber cable is deployed to a wall outlet box.
Figure 3:
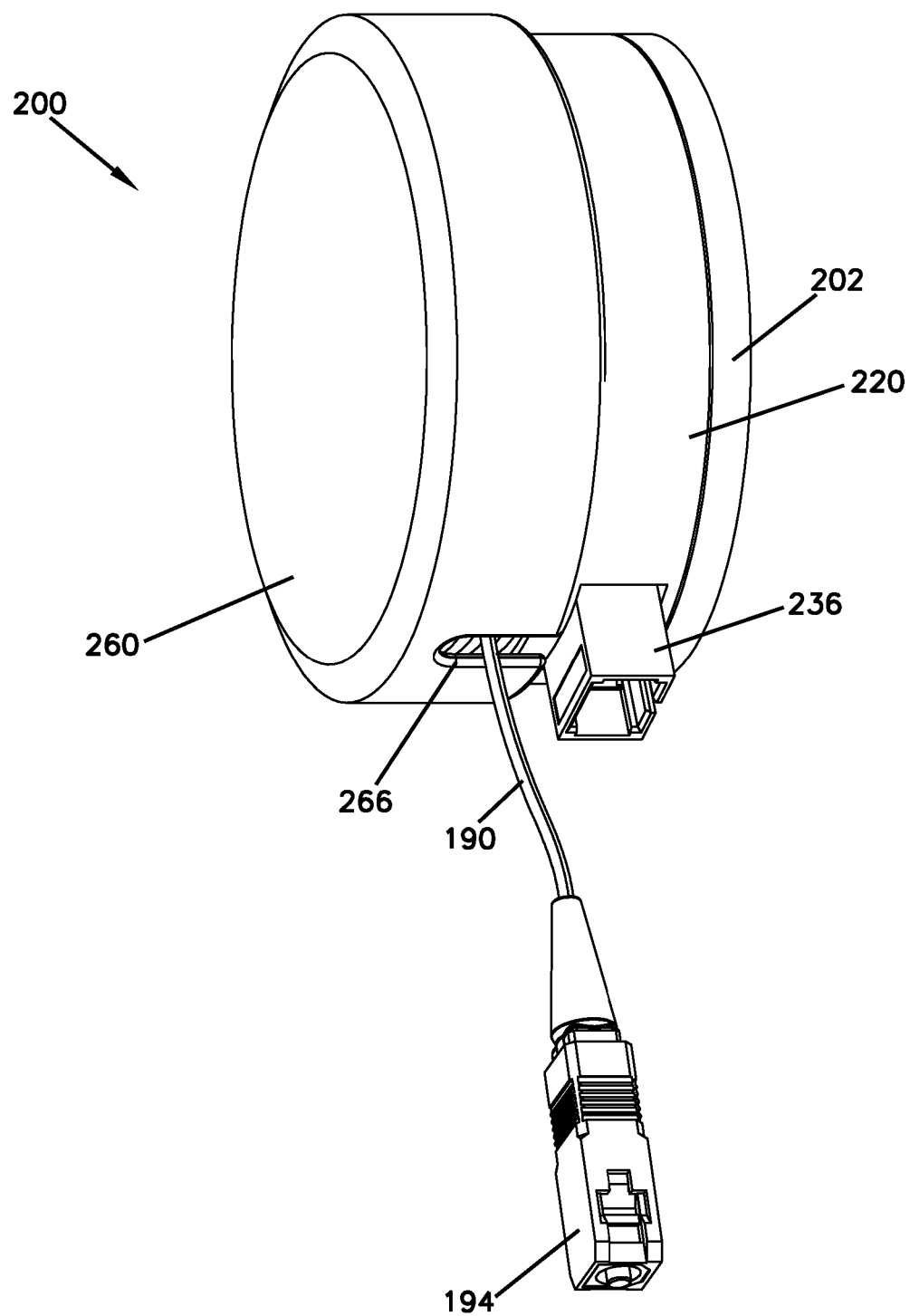
FIG. 3 is a perspective view of a first example telecommunications wall outlet having a mounting plate, a base structure, a spool structure, a coiled cable, and a cover in accordance with the principles of the present disclosure.

FIG. 2 is a schematic representation of an example residence R including walls and a floor defining a room. A wall box 112 is disposed at a desirable location within the residence R for optical and/or optoelectronic equipment. In some implementations, the subscriber cable 110 extends through ducts in the wall and enters the residence R behind the wall outlet 112. In other implementations, the subscriber cable 110 enters the residence and extends over the wall to the wall outlet 112. In certain implementations, the subscriber cable 110 can be routed through the room by adhesively affixing the subscriber cable 110 to the walls, floor, ceiling, and/or moldings within the room.

The wall box 112 serves as a demarcation point within the residence R for the optical service provider. The subscriber cable 110 is optically coupled to an optical connector at the wall outlet 112. Accordingly, optical signals carried by the subscriber cable 110 are available at the optical connector.

In some implementations, the optical connector terminates the subscriber cable 110. In some examples, the end of the subscriber cable 110 can be fully connectorized with optical connector so that the end can be plugged into a corresponding port at the wall outlet 112. The terminated end can be factory installed and factory inspected prior to installation in the field. In other examples, the subscriber cable 110 can have a partially terminated end that is fully connectorized as optical connector in the field and plugged into a port at the wall outlet 112. Partially terminated ends can be advantageously routed through small ducts to facilitate passage through walls of the residence R. The partially terminated end can be quickly installed in the field without tools, such as an optical fusion splicer.

In other implementations, the optical connector terminates a pigtail that is optically coupled to the subscriber cable 110. In an example, the pigtail is spliced (e.g., fusion spliced or mechanically spliced) to an unterminated end of the subscriber cable 110. Unterminated ends can be advantageously routed through small ducts to facilitate passage through walls of the residence R. In another example, another connectorized end of the pigtail is connected to a connectorized end of the subscriber cable 110 at an adapter disposed at the wall outlet 112.

A user can choose to connect an optical network terminal (ONT) 114 or other equipment to the connector of the wall outlet 112 to connect the ONT 114 or other equipment to the fiber optic network 100. For example, a patch cord or jumper cable 190 can extend between the ONT 114 and the wall outlet 112. The ONT 114 also can have a power cord 118 that plugs into an electrical outlet to provide power to the ONT 114.

Referring to FIGS. 3-43, exemplary cable storage arrangements 200, 300, 400, 500, 600 are shown. The cable storage arrangements 200, 300, 400, 500, 600 are for managing the cable length between the wall outlet 112 and the ONT 114. In some examples, a cable storage arrangement 200, 300, 400, 500, 600 is the wall outlet 112, while in other examples a cable storage arrangement 200, 300, 400, 500, 600 serves as an intermediate structure between the wall outlet 112 and the ONT 114. Each of the cable storage arrangements 200, 300, 400, 500, 600 is configured to store a connectorized patch cord or jumper cable 190 having connectors 192, 194 at each end, in a coiled fashion about a fixed spool structure 237, 337, 437, 537, 637 that is non-rotatably mounted to a surface, such as a wall or wall outlet. In some examples, the subscriber cable 110 is directly routed to the cable storage arrangement 200, 300, 400, 500, 600 and connected to the jumper cable 190 via an adapter 236, 336, 436, 536, 636. The subscriber cable 110 may be spliced to a connector within a wall outlet or may be pre-connectorized within the wall outlet. In some examples, an adapter is part of a fixed demarcation zone on the fixed base and the connector 192 connects to the adapter. In some examples, an adapter 236, 336, 436, 536, 636 is part of the cable storage arrangement 200, 300, 400, 500, 600 that connects to a connector on the wall outlet. In some examples, the cable storage arrangement 200, 300, 400, 500, 600 serves as the wall outlet and the subscriber cable 110 directly connects to an adapter 236, 336, 436, 536, 636 that is part of the cable storage arrangement 200, 300, 400, 500, 600 or, alternatively, includes an adapter that connects to the connector 192.

Referring to FIGS. 3-19, an exemplary cable storage arrangement 200 configured as a wall outlet 200 is presented. The wall outlet 200 stores the patch cord or jumper cable 190, which has connectors 192, 194 at each end, in a coiled fashion. As configured, only the length of jumper cable 190 needed to extend from the wall outlet 200 to the ONT 180 is dispensed, with the remainder being stored within the wall outlet 200 in a concealed fashion. As shown, the wall outlet 200 also includes a mounting plate 202, a base structure 220, and a cover 260.

The mounting plate 202 has a sidewall 204 extending between a first side 206 and a second opposite side 208. As shown, the sidewall 204 defines a cylindrically shaped outer profile. Other shapes are possible. The mounting plate 202 is also provided with a pair of apertures 210 extending between the first and second sides 206, 208. The apertures 210 allow for a fastener (not shown) to extend through the mounting plate 202 such that the mounting plate 202 can be mounted to a wall or other similar structure, with the first side 206 adjacent the wall. It is noted that the mounting plate 202 could be attached to a wall through other means, such as by an adhesive.

The second side 208 of the mounting plate 202 is provided with an attachment structure 212 configured to engage with a corresponding attachment structure 224 on the base structure 220. This structure allows the base structure 220 to be mounted and retained onto the mounting plate 202 after the mounting plate 202 has been secured to a wall. As shown, the attachment structure 212 is configured as a channel 212a while the attachment structure 224 is configured as a pair of aligned ribs 224a, 224b that can slide within and be retained within the channel 212. In one example, the channel 212a and ribs 224a, 224b form a dovetail-type joint. As shown, channel 212a has an open end 212b through which the ribs 224a, 224b can initially enter the channel 212a and has a closed end 212c that acts as a stop. Other attachment means may be used for connecting the mounting plate 202 to the base structure 220.

The base structure 220 has a first sidewall 222, extending from a base wall 238, upon which at least a portion of the attachment structure 224 is disposed. The first sidewall 222 is shown as being cylindrically shaped and defines an internal cavity 223 in conjunction with the base wall 238. As shown, the base structure sidewall 222 and the mounting plate sidewall 204 have a similar dimension. Accordingly, when the base structure 220 is secured to the mounting plate 202, the sidewalls 202, 222 are flush. In this position, the base structure 220 entirely covers the second side 208 of the mounting plate 202 such that the mounting plate second side 208 encloses the internal cavity 223 of the base structure 220.

Figure 4:
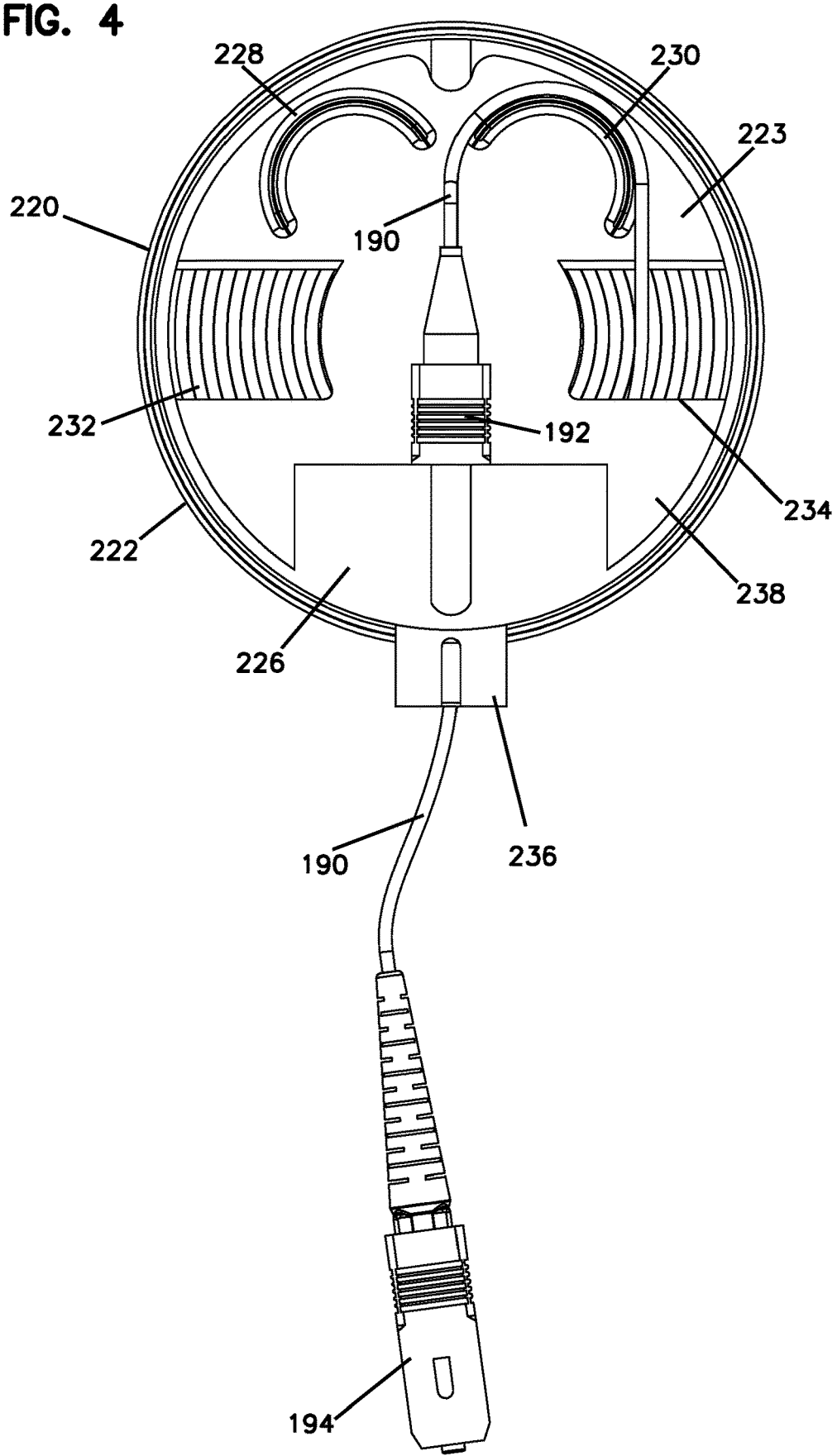
FIG. 4 is a bottom view of the telecommunications wall outlet of FIG. 3 with an internal cavity of the base structure exposed by removal of the associated mounting plate.
Figure 5:
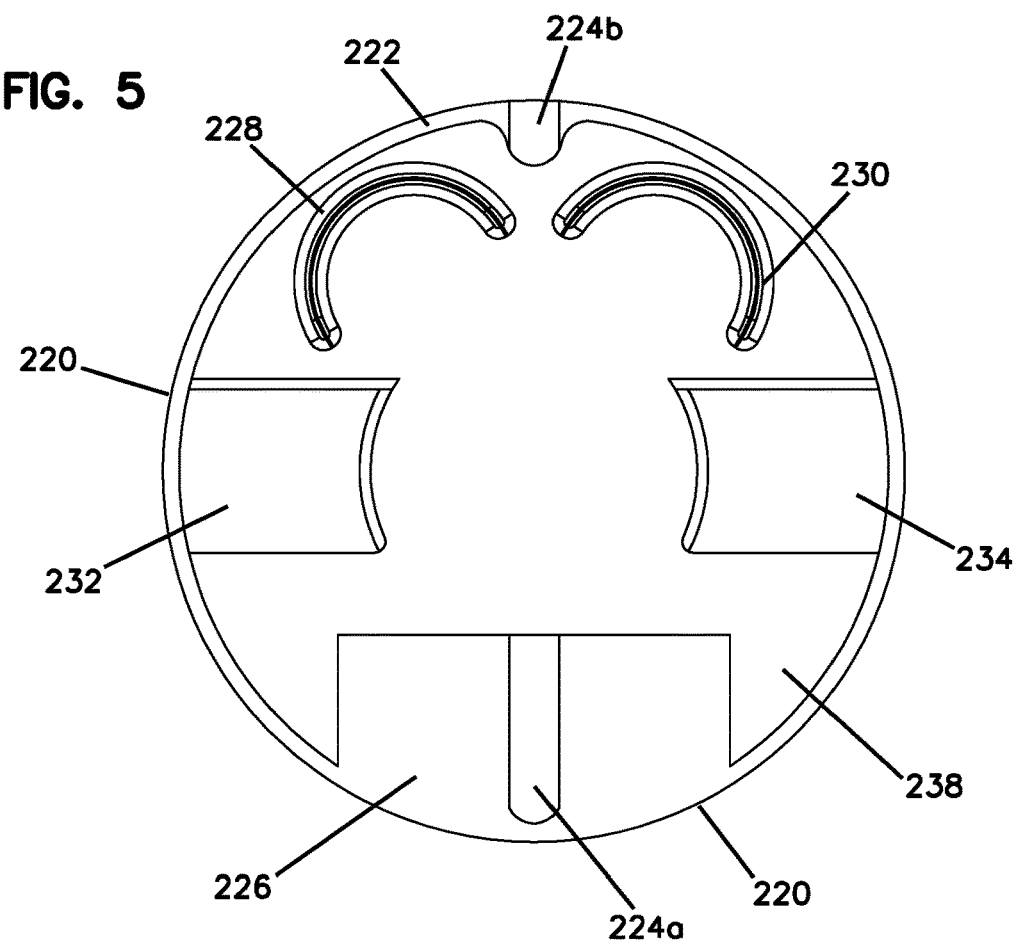
FIG. 5 is a bottom view of the base structure shown in FIG. 3.
Figure 6:
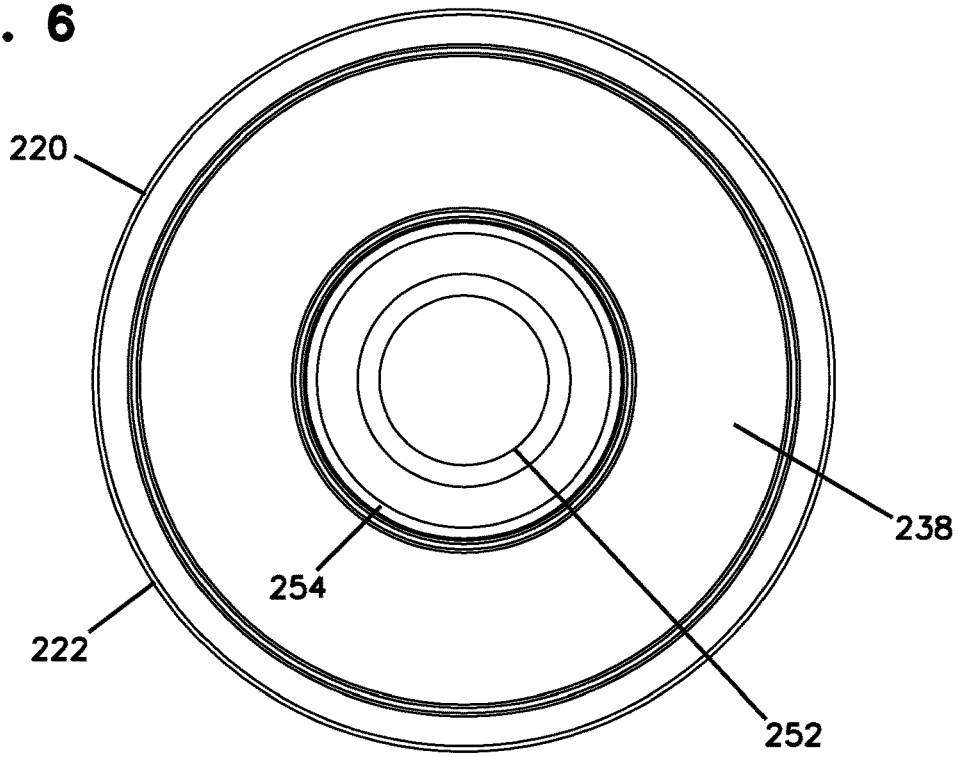
FIG. 6 is a top view of the base structure shown in FIG. 3.
Figure 7:
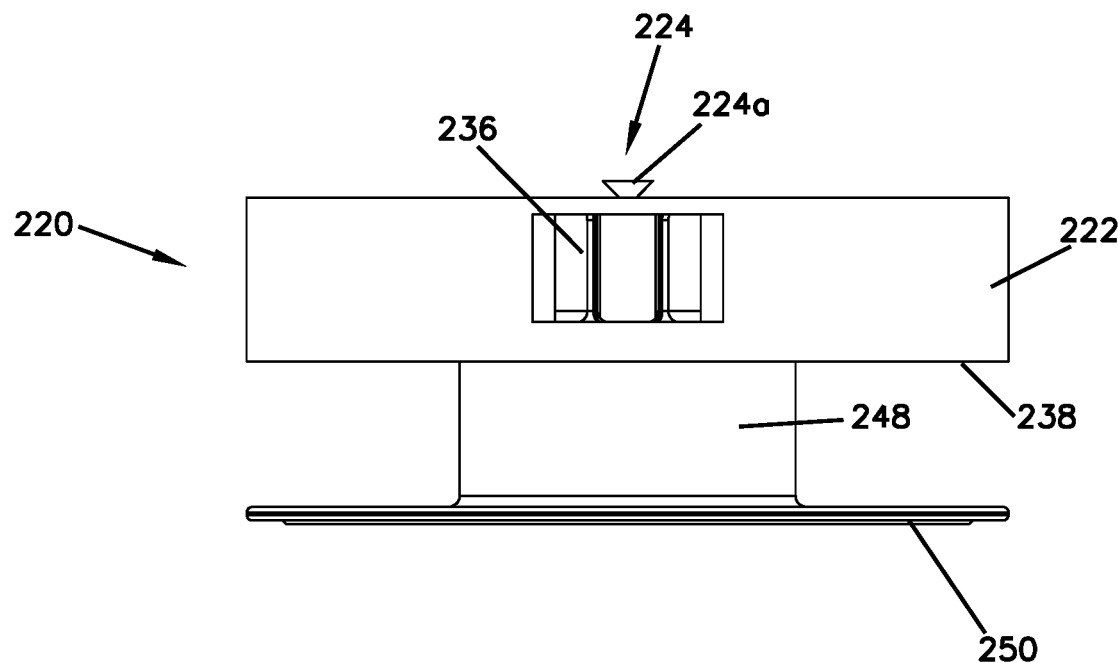
FIG. 7 is a first side view of the base structure shown in FIG. 3.
Figure 8:
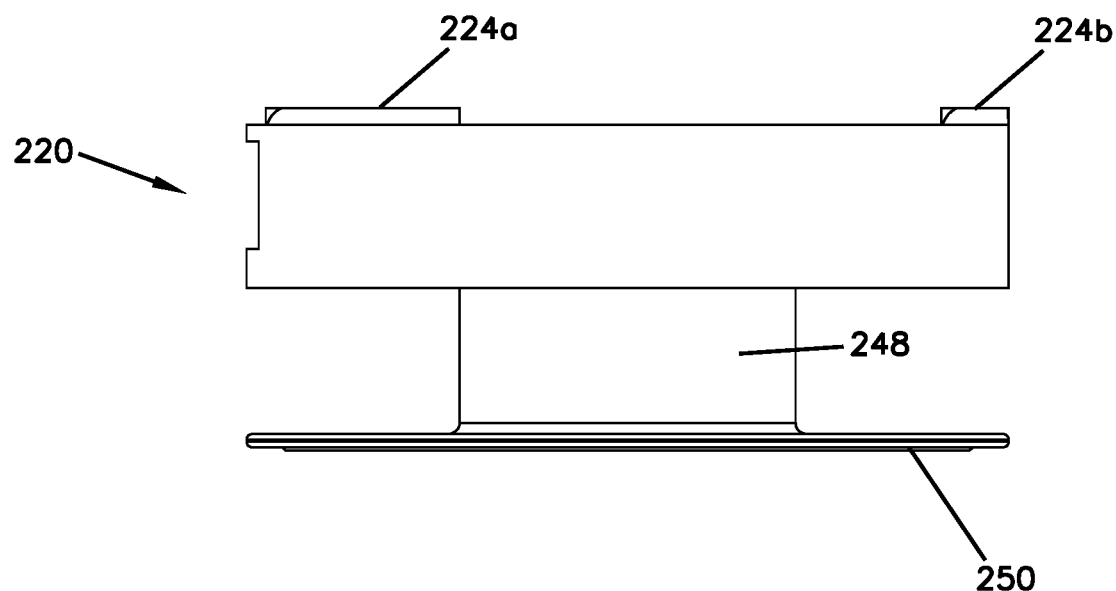
FIG. 8 is a second side view of the base structure shown in FIG. 3.
Figure 9:
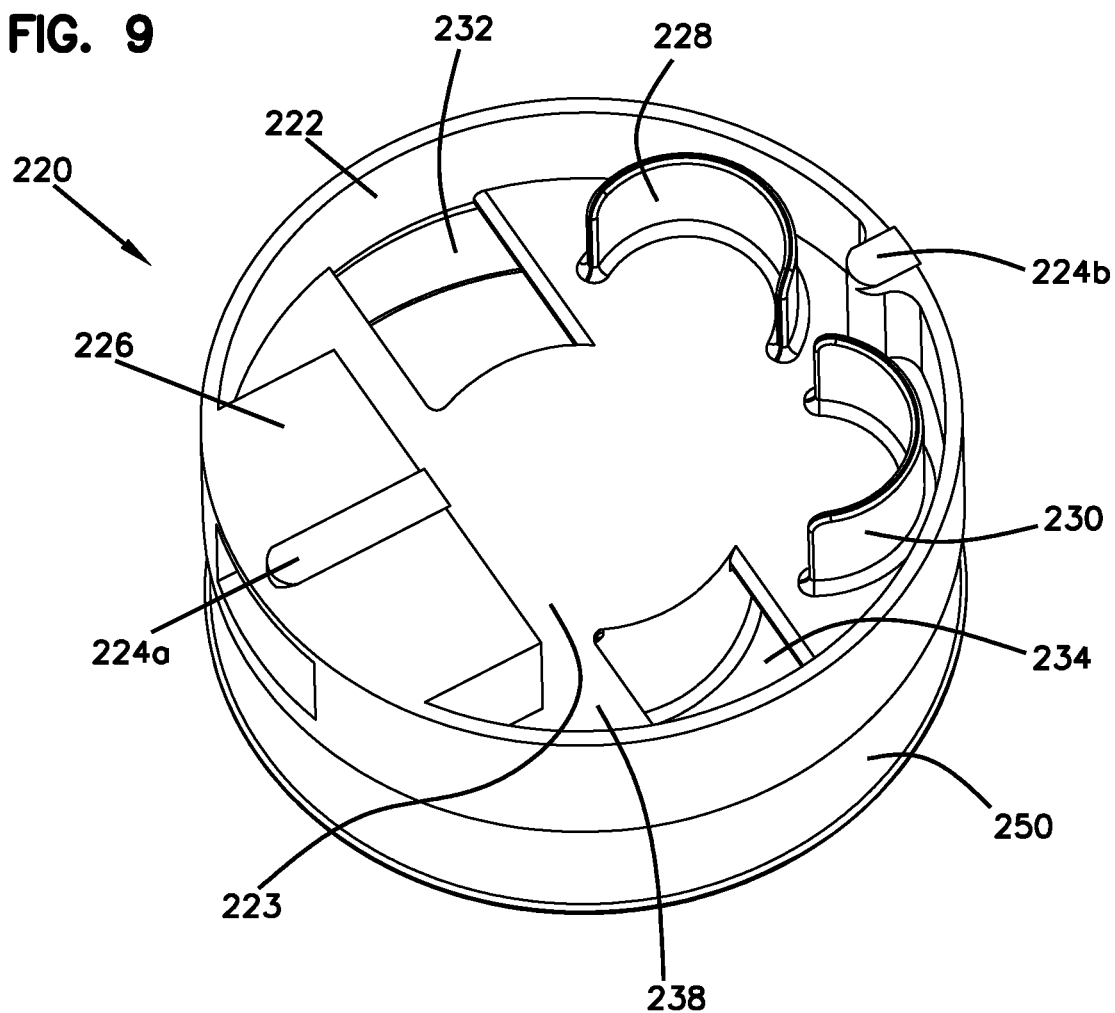
FIG. 9 is a perspective bottom view of the base structure shown in FIG. 3.
Figure 10:
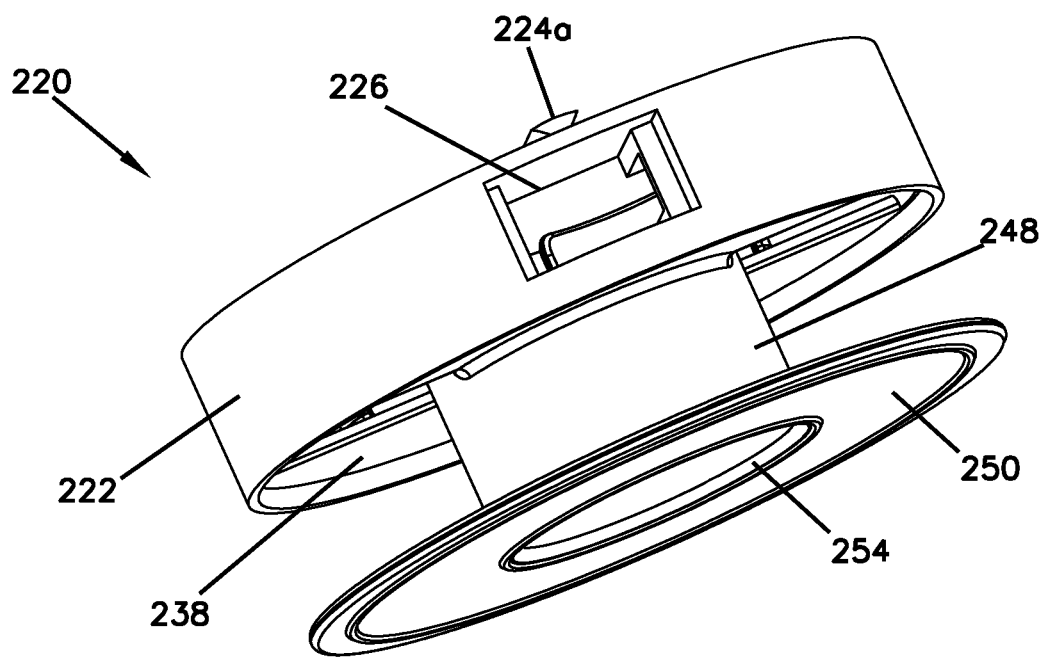
FIG. 10 is a perspective top view of the base structure shown in FIG. 3.
Figure 11:
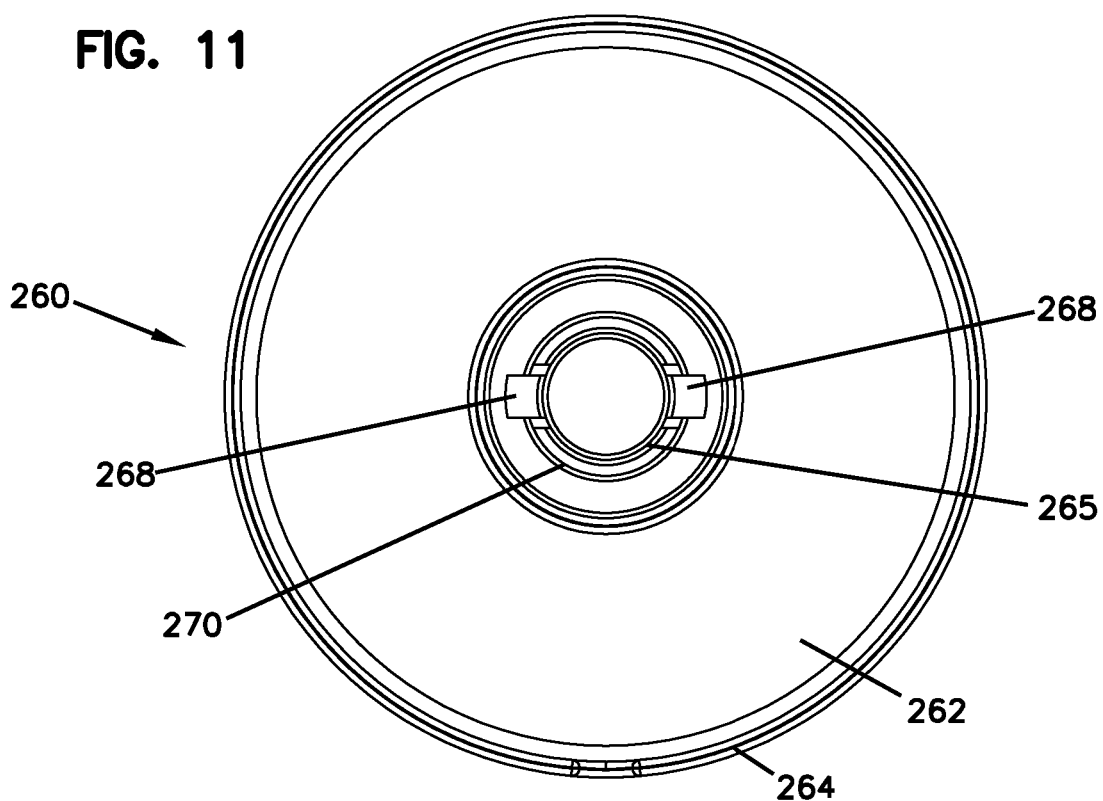
FIG. 11 is a bottom view of the cover associated with the telecommunications wall outlet shown in FIG. 3.
Figure 12:
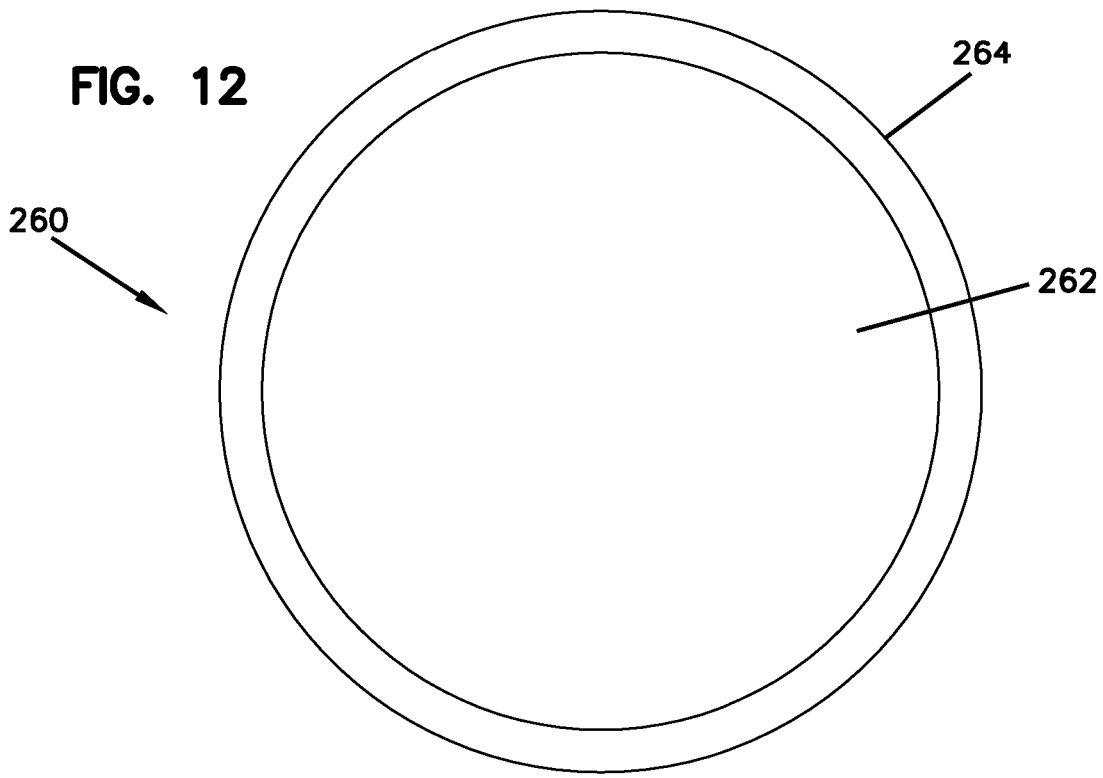
FIG. 12 is a top view of the cover shown in FIG. 3.
Figure 13:
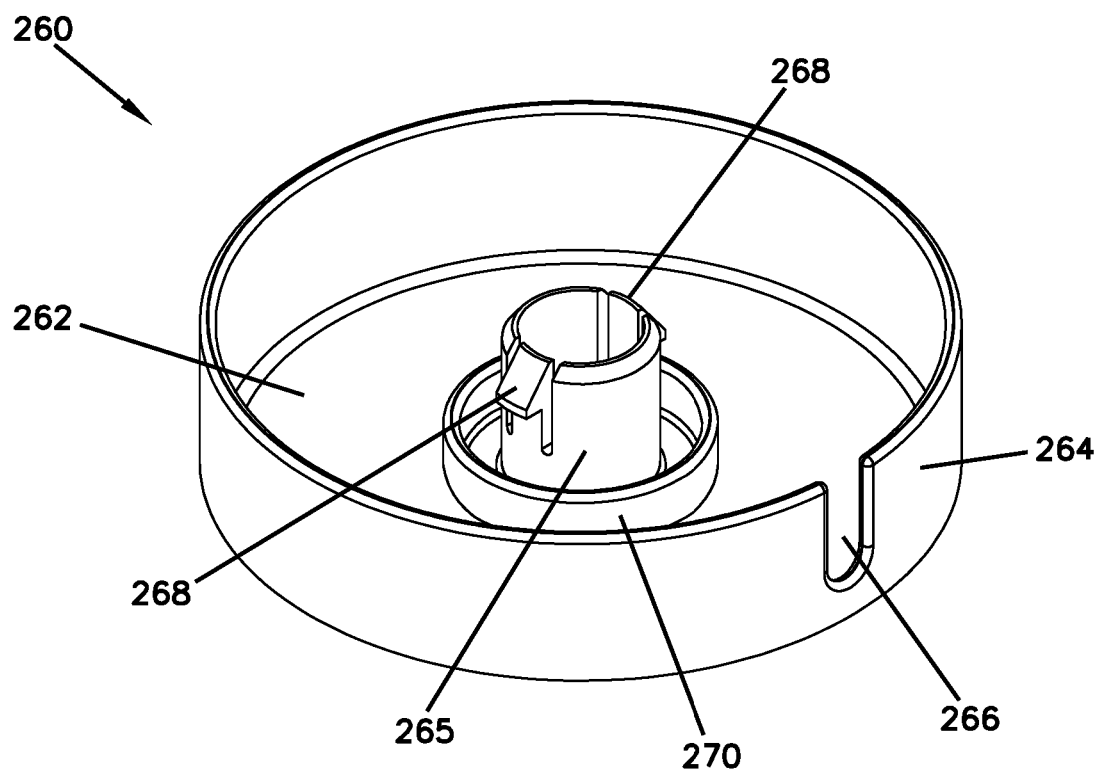
FIG. 13 is a bottom perspective view of the cover shown in FIG. 3.
Figure 14:
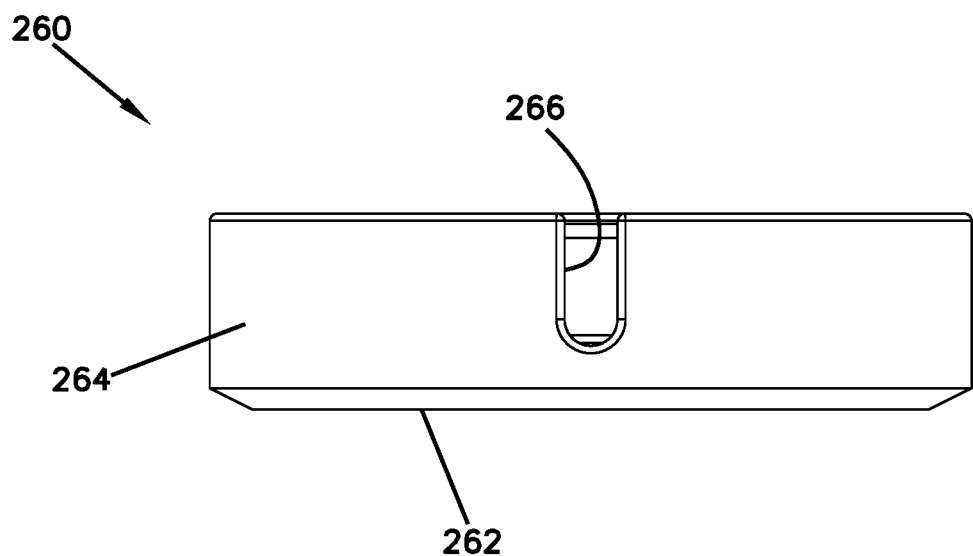
FIG. 14 is a first side view of the cover shown in FIG. 3.
Figure 15:
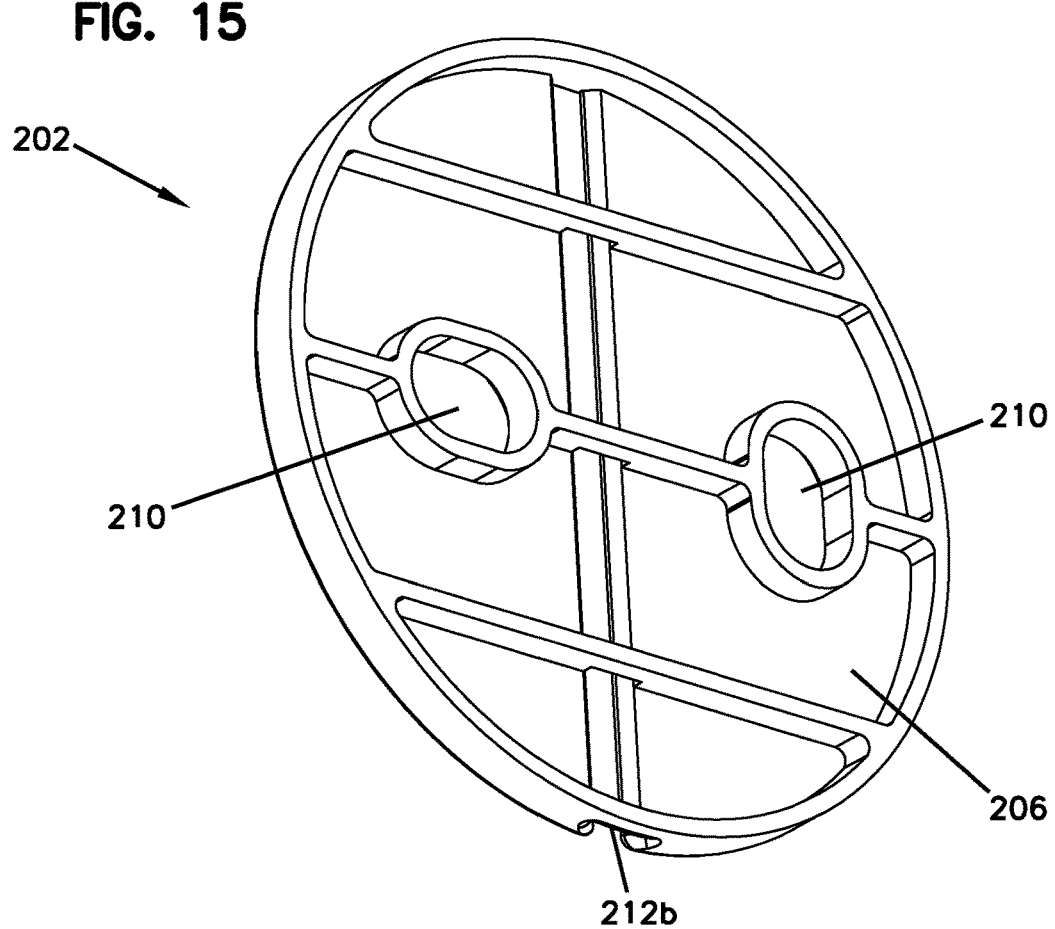
FIG. 15 is a bottom perspective view of the mounting plate associated with the telecommunications wall outlet shown in FIG. 3.
Figure 16:
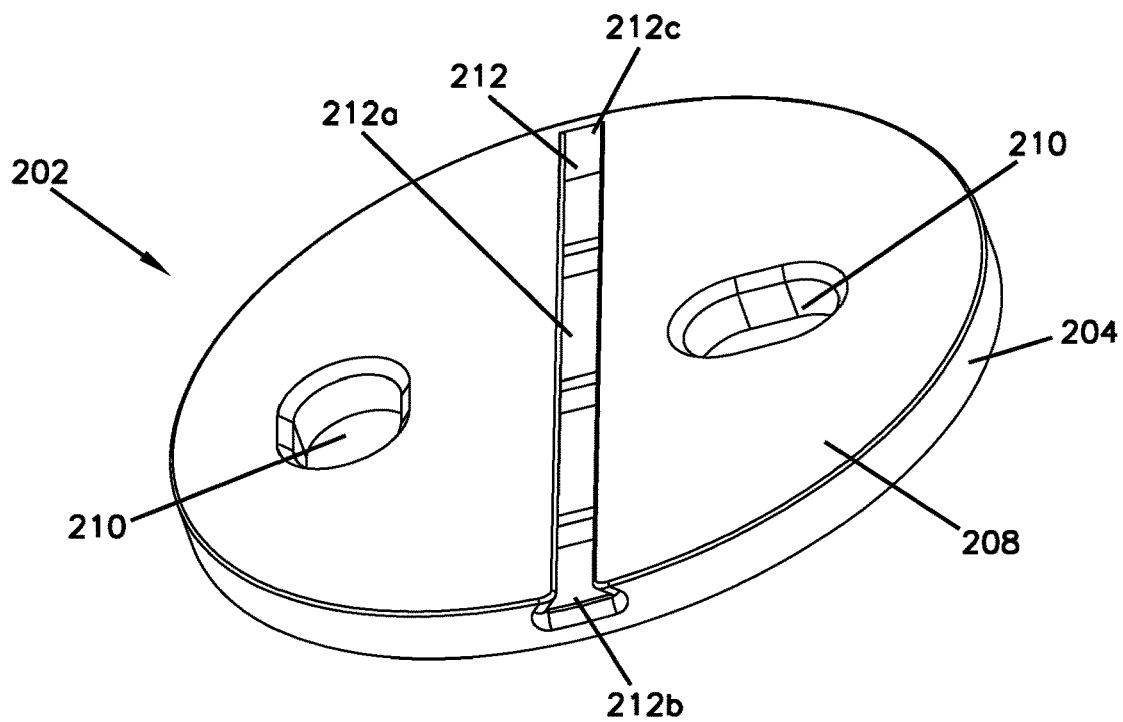
FIG. 16 is a top perspective view of the mounting plate shown in FIG. 3.
Figure 17:
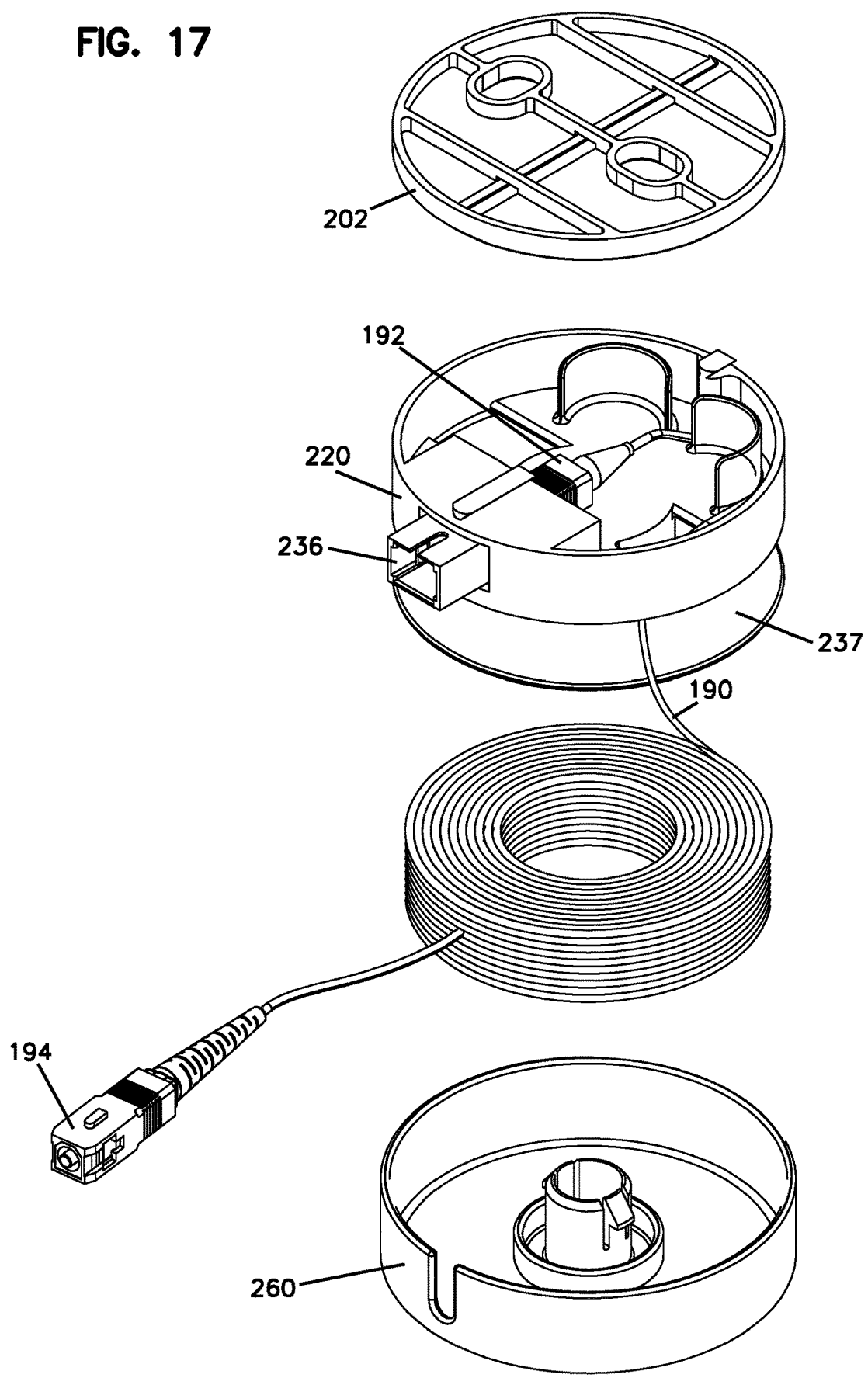
FIG. 17 is a bottom exploded perspective view of the telecommunications wall outlet shown in FIG. 3, with the cable shown as being separated from the spool structure of the base structure.
Figure 18:
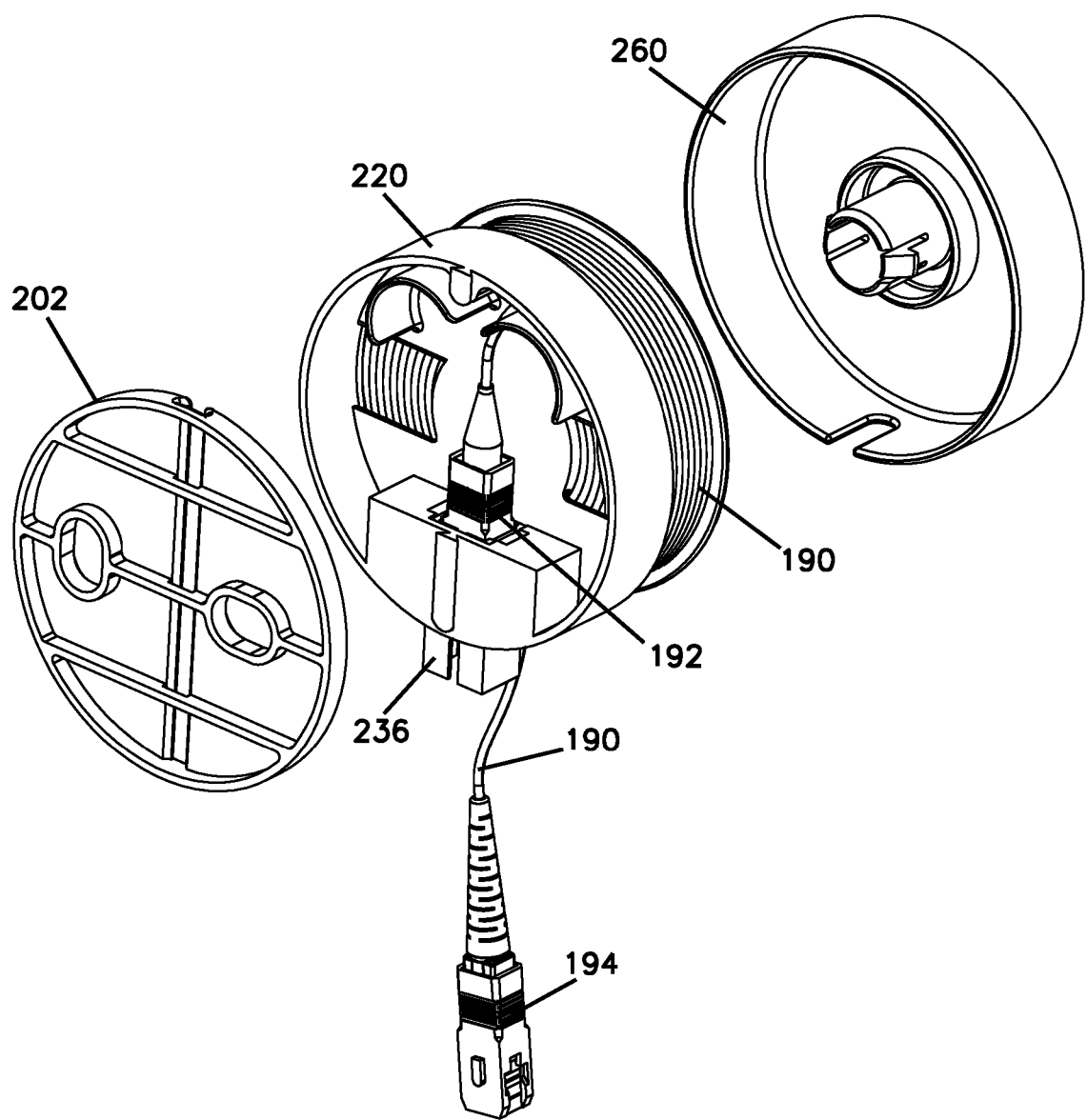
FIG. 18 is a bottom partially exploded perspective view of the telecommunications wall outlet shown in FIG. 3, with the cable shown as being coiled around the spool structure of the base structure.
Figure 19:
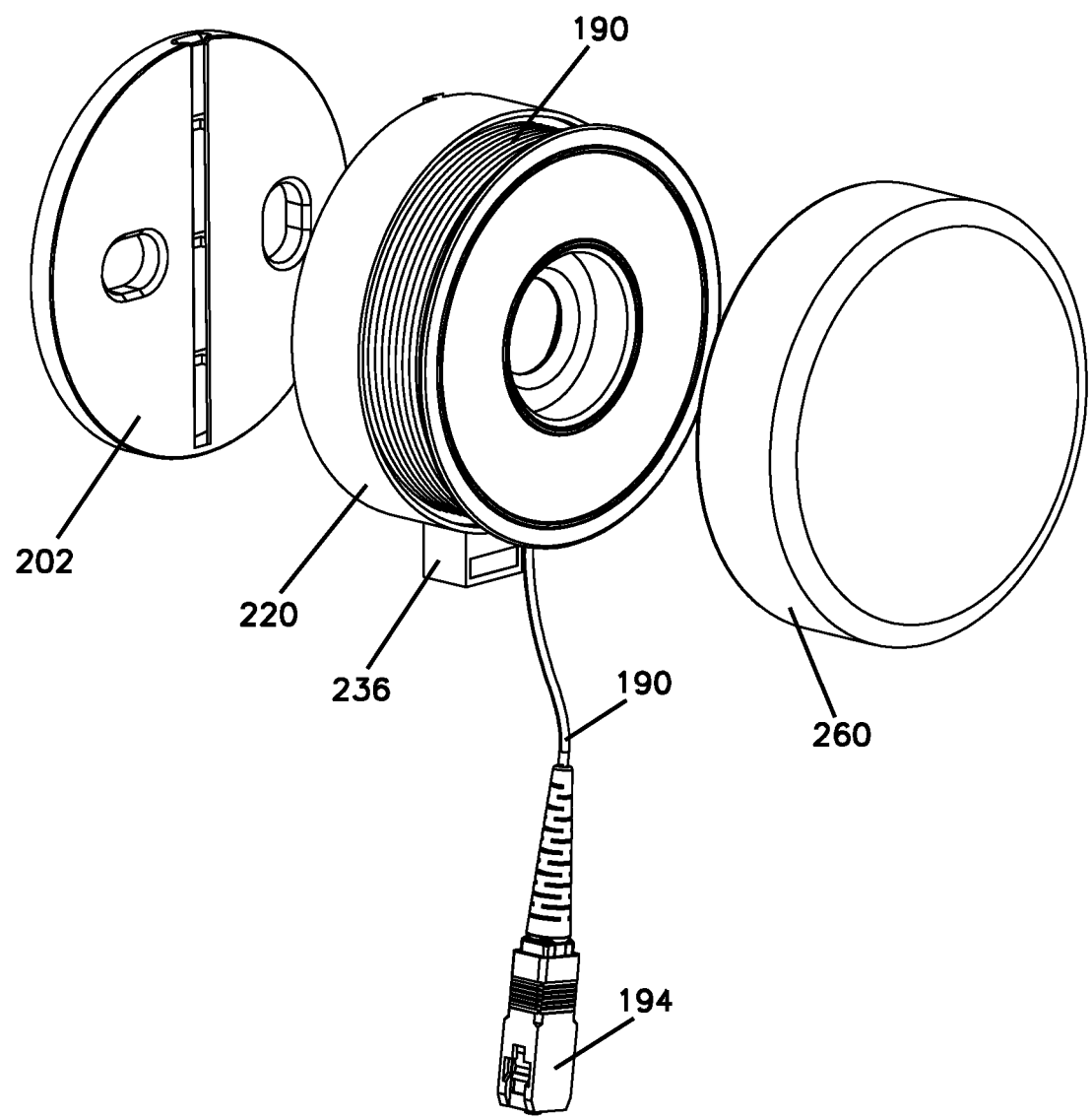
FIG. 19 is a top partially exploded perspective view of the telecommunications wall outlet shown in FIG. 3, with the cable shown as being coiled around the spool structure of the base structure.
Figure 20:
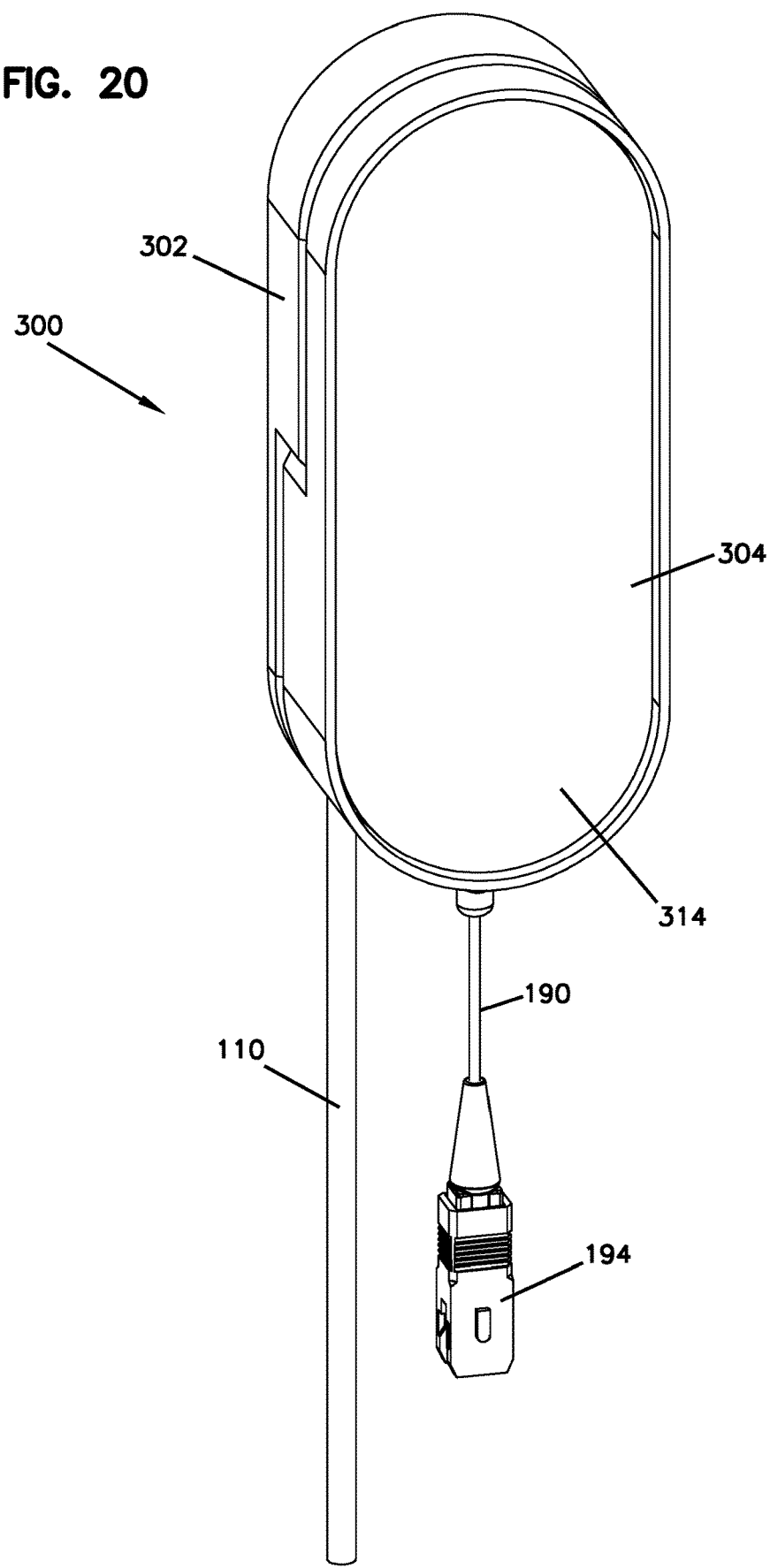
FIG. 20 is a front perspective view of a second example telecommunications wall outlet having a base unit connected to a cable dispensing and storage unit in accordance with the principles of the present disclosure.
Figure 21:
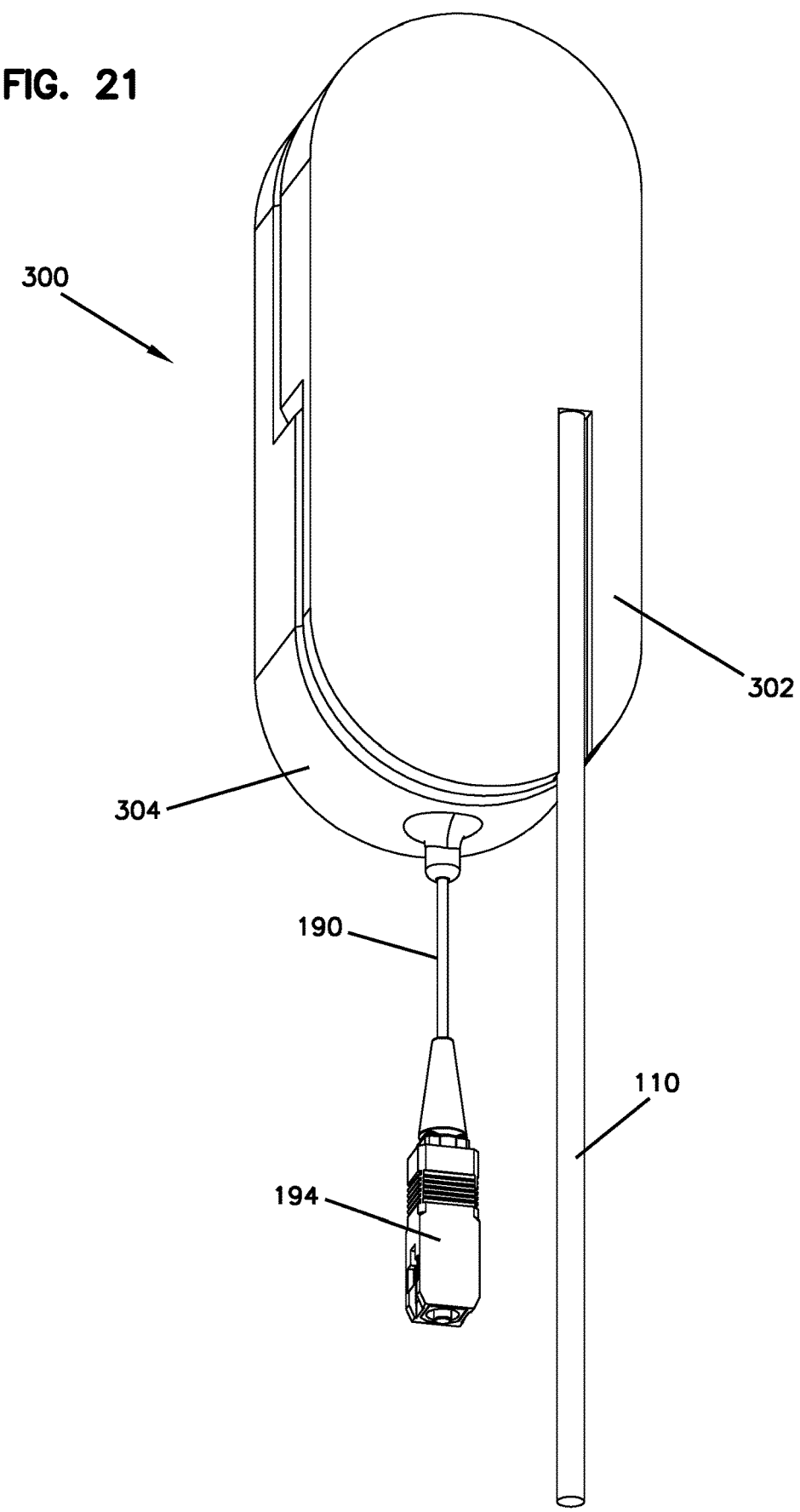
FIG. 21 is a rear perspective view of the telecommunications wall outlet shown in FIG. 20.

The base structure 220 is further shown as including an adapter mounting structure 226 extending through sidewall 222 and into the internal cavity 223. The base structure also includes a pair of bend radius limiters 228, 230 extending from the base wall 238 and a pair of apertures 232, 234 extending through the base wall 238. The adapter mounting structure 226 receives and retains an adapter 236. In one example, the adapter 236 is a male-to-male type adapter that receives optical connector 155 and optical connector 192 of the jumper cable 190. From the connector 192, the jumper cable 190 extends around one of the bend radius limiters 228, 230 and then through the nearest aperture 232, 234 such that the remaining length of the jumper cable 190 can be coiled about a drum region or spool structure 237 defined by the base wall 238, a hub portion 248, and a second wall 250 parallel to the base wall 238. As can be seen at FIG. 4, the bend radius limiter 230 prevents jumper cable 190 from bending too sharply before passing through aperture 234.

The spool structure 237 can be covered by the cover 260 such that the portion of the jump cable 190 wound about the spool structure 237 is concealed from view. The cover portion can be provided with a front wall 262 from which a cylindrical sidewall 264 extends. The sidewall 264 can be provided with a port or aperture 266 through which the jumper cable 190 can extend. As shown, the port 266 extends to the end of the sidewall 264 such that the cover 260 can be attached or removed from the base structure 220 without requiring threading of the jumper cable 190 through an enclosed opening. Additionally, the port 266 is provided with rounded surfaces to reduce friction between the port 266 and the jumper cable 190 and to prevent the jumper cable 190 from being pulled against an otherwise sharp edge. The cover 260 can be attached to the base structure 220 by a projection 265 extending from the front wall 262 that is received in a first socket 252 defined within the hub portion 248 of the base structure 220. The projection 265 is provided with a pair of latches 268 that engage with the ends of the first socket 252 and are configured in a snap-fit arrangement, wherein the latches 268 initially deflect within the first socket 252 and then expand to lock the cover 260 to the base structure 220 once the latches 268 extend past the first socket 252. The cover 260 is additionally provided with a flange wall 270 that is received by a second socket 254 which has a larger diameter than the first socket 252. The second socket 254 acts as a bearing surface for the flange wall such that the cover 260 can easily rotate with respect to the base structure 220 and such that alignment is maintained between the projection 265 and latches 268 with respect to the first socket 252 to prevent binding. It is noted that when the cover 260 is rotated with respect to the base structure 220, the latches 268 freely rotate over the end of the first socket 252 without resistance from the first socket 252. Once the cover 260 is mounted to the base structure 220, the sidewall 264 and port 266 are aligned over the spool structure 237 such that the jumper cable 190 can easily transition from the spool hub portion 248 and through the port 266 during winding or unwinding of the jumper cable.

Once the wall outlet 200 is mounted and assembled, a selected length of the jumper cable 190 can be unwound from the wall outlet 200 simply by pulling and rotating the exposed portion of the jumper cable 190 about the spool hub portion 248 in an unwinding direction. As the jumper cable 190 becomes unwound, the cover 260 will naturally rotate with the jumper cable 190 as the port 266 revolves about the spool structure 237 and follows the jumper cable 190 as it is being withdrawn around the hub portion 248. The jumper cable 190 can also be wound back onto the hub portion 248 by rotating the cover 260 in a winding direction. Accordingly, the disclosed configuration allows an installer to tightly control the length of exposed jumper cable 190 to be only that necessary for extending between the wall outlet 200 and the ONT 180. Once the desired length of cable 190 has been dispensed, the cover 260 can be locked to the base structure 220 and/or the spool structure 237 such that the cover is no longer to rotate about the spool structure 237 to effectuate further dispensing. Examples of suitable locking arrangements can be found in PCT Appl. No. PCT/EP2016/

059104, filed herewith, and titled "DEPLOYING OPTICAL FIBERS WITHIN A MULTI-DWELLING UNIT"; and in U.S. Provisional Patent Applications 62/186,697 and 62/151,226, the disclosures of which are hereby incorporated herein by reference.

Referring to FIGS. 20-26, an exemplary cable storage arrangement 300 configured as a wall outlet 300 is presented. The wall outlet 300 stores the patch cord or jumper cable 190, which has connectors 192, 194 at each end, in a coiled fashion. As configured, only the length of jumper cable 190 needed to extend from the wall outlet 300 to the ONT 180 is dispensed, with the remainder being stored within the wall outlet 300 in a concealed fashion. As shown, the wall outlet 300 includes a base unit 302 which receives the subscriber cable 110 and a cable storage and dispensing unit 304 which stores and dispenses cable 190.

As can be seen at FIGS. 22 to 25, the base unit 302 and the cable storage and dispensing unit 304 are completely separable. The base unit 302 is shown as being provided with a first portion 306 and a second portion 308 having a larger dimension than the first portion 308. An adapter 336 is disposed at the second portion 308 and is connected to the cable 110 via a connector, splice, and/or other means. As shown, the adapter 336 protrudes from the second portion 308 over a portion of the first portion 306. The cable storage and dispensing unit 304 is also configured with a first portion 310 and a second portion 312, wherein the second portion 312 has a larger dimension than the first portion 310. The fiber optic connector 192 of the cable 190 is housed in a recess 316 defined in the second portion 312. The recess 316 of unit 304 is configured to receive the adapter 336 of unit 302 such that the cable 110 and cable 190 are placed in optical communication with each other. It is noted that the unit 302 could be configured with adapter 336, optionally connected to connector 192, and that unit 304 could be configured with recess 316 and a connector. To mate the units 302, 304, the first portion 306 of unit 302 is placed adjacent the second portion 312 of unit 304 and the first portion 310 of unit 304 is placed adjacent the second portion 308 of unit 302 with the adapter 336 being aligned with the connector 192. Once aligned, the units 302, 304 can be slid against each other until the connector 192 and adapter 336 fully engage. Additional structures may be provided on the units 302, 304 to secure the units 302, 304 together. Examples of attachment structures are explained in the above application referenced under PCT/EP2016/059104.

Figure 26:
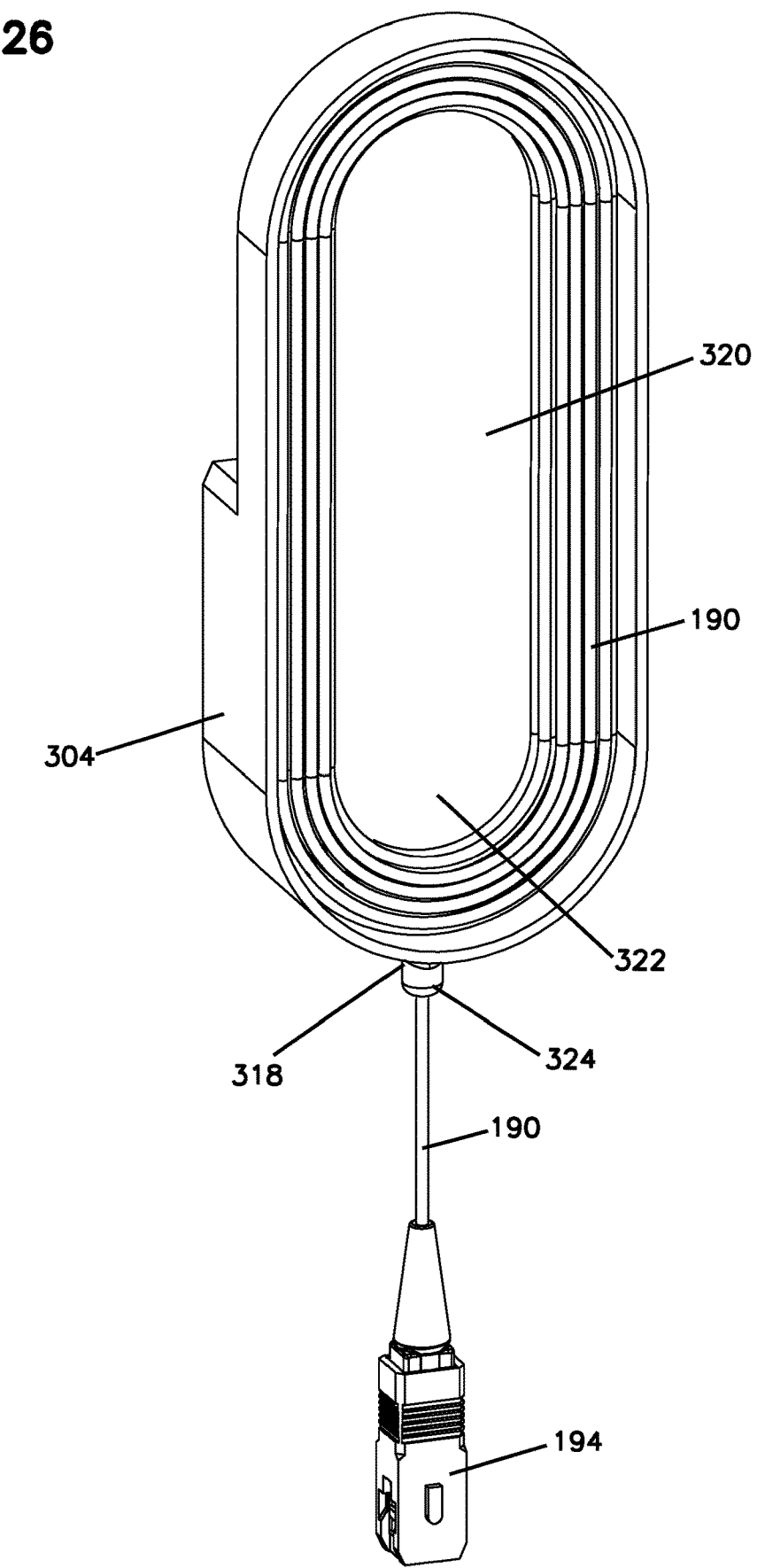
FIG. 26 is a front perspective view of the cable storage and dispensing unit shown in FIG. 20, with a cover panel removed from view to show a coiled cable.
Figure 35:
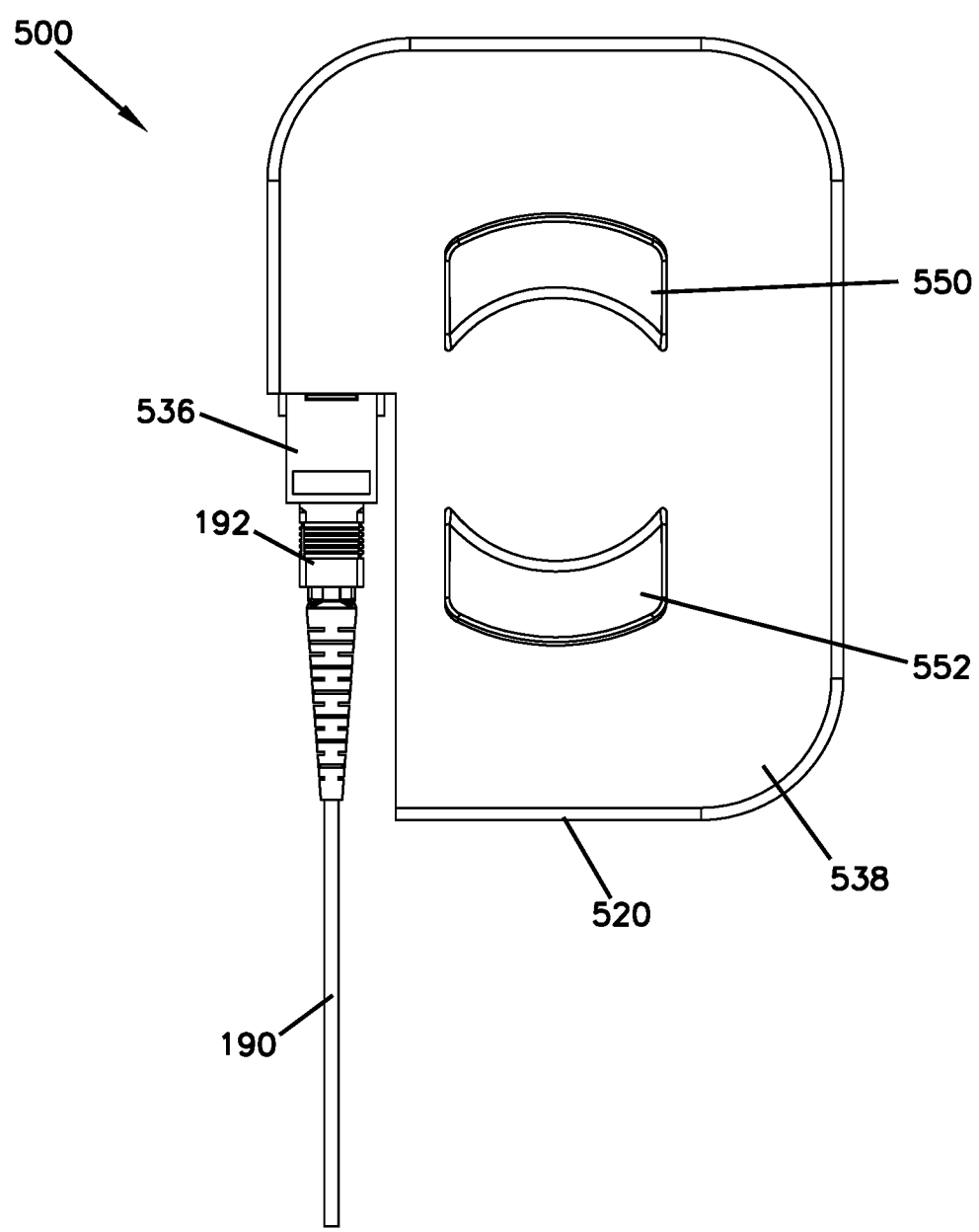
FIG. 35 is a front view of the telecommunications wall outlet shown in FIG. 33.
Figure 38:
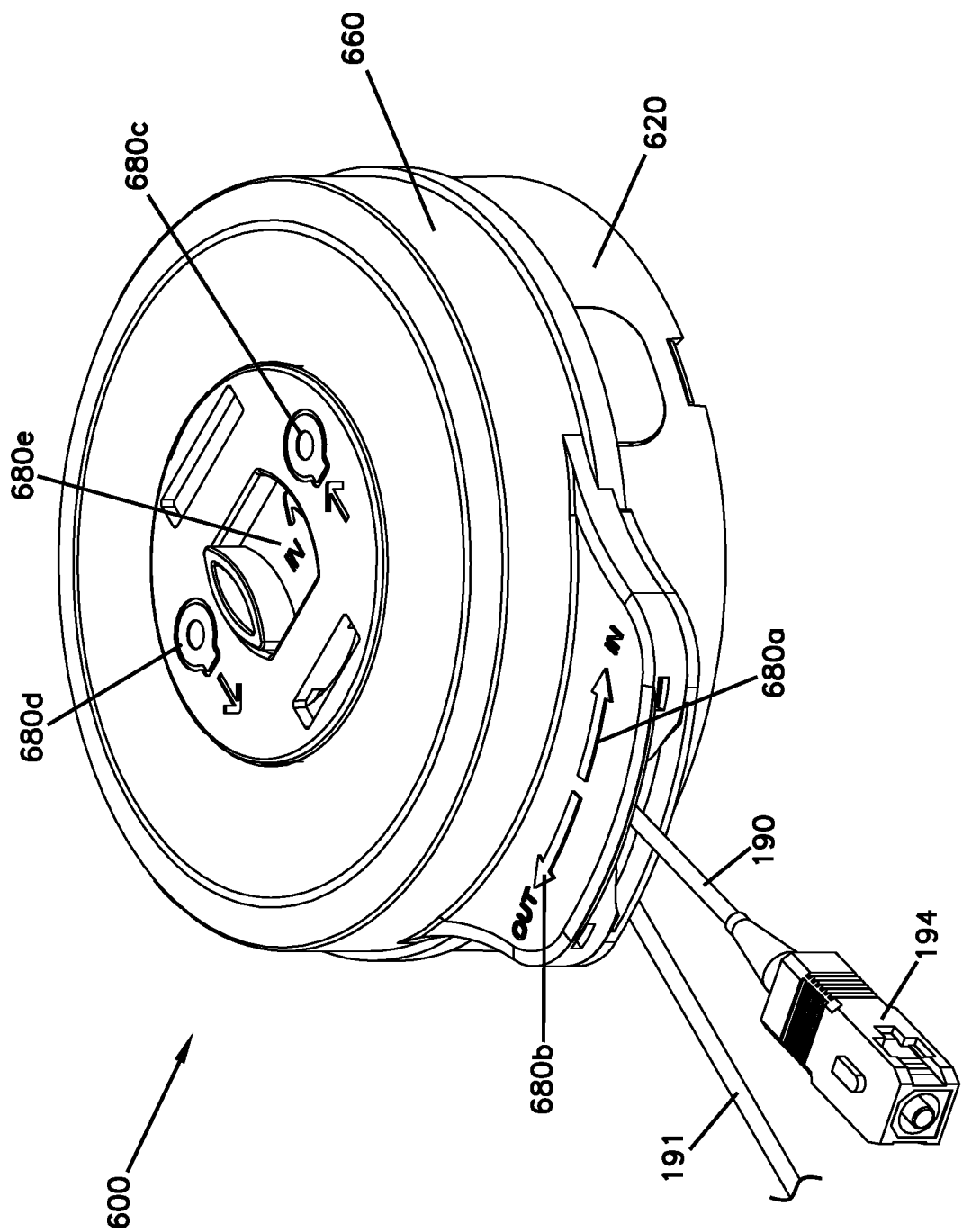
FIG. 38 is a perspective view of a fifth example telecommunications wall outlet having a mounting plate, a base structure, a spool structure, a coiled cable, and a cover in accordance with the principles of the present disclosure.
Figure 39:
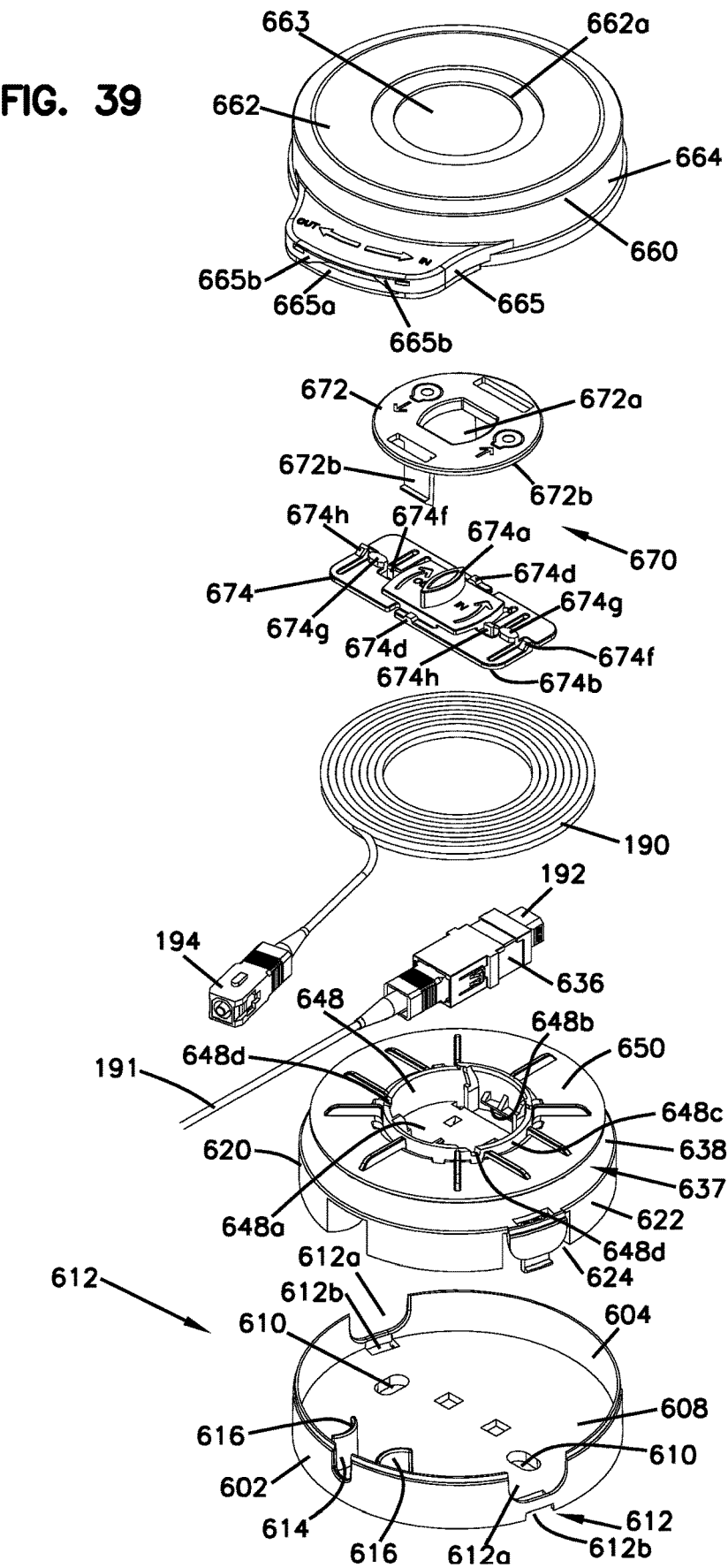
FIG. 39 is an exploded top perspective view of the telecommunications wall outlet shown in FIG. 38.

As can be seen at FIG. 26, which shows a cover 314 having been removed, the cable 190 may be stored within an internal cavity 320 in the cable storage and dispensing unit 304. In this configuration, the cable 190 is wound in a coreless configuration with a hollow winding interior 322 in which no spool type structure is provided. Examples of coreless winding configuration suitable for use with the cable storage and dispensing unit 304 can be found in U.S. Appl. No. 62/094,656, and titled "FIBER DISTRIBUTION SYSTEM AND CORELESS WOUND COIL," the disclosure of which is hereby incorporated herein by reference. Once the cable 190 is wound into the internal cavity 320, the cover 314 can be installed and the cable 190 can then be dispensed through aperture 318 by pulling the cable 190. A bushing 324 may be provided at aperture 318 to protect the cable 190 and to act as a guide for the cable 190 as the cable 190 is being dispensed. It is noted that because the base unit 302 and the cable storage and dispensing unit 304 are separable, that several configurations of cable storage and dispensing units 304 may be used with the same base unit 302. For example, cable storage and dispensing units 304 may be provided with different lengths of cable 190 such that the most appropriate length may be selected for any given application. A damaged cable 190 can also be conveniently replaced.

Referring to FIGS. 27-32, an exemplary cable storage arrangement 400 configured as a wall outlet 400 is presented. The wall outlet 400 stores the patch cord or jumper cable 190, which has connectors 192, 194 at each end, in a coiled fashion. As configured, only the length of jumper cable 190 needed to extend from the wall outlet 400 to the ONT 180 is dispensed, with the remainder being stored within the wall outlet 400 in a concealed fashion. As shown, the wall outlet 400 includes a base portion 420. An adapter 436 is provided at the base portion 420 and is located at least partially within the base portion 420. The adapter 436 may be connected to a subscriber cable 110 that extends into an interior of the base portion 420.

A spool structure 437 is provided and extends from the base portion 420 with a hub portion 448. Opposite the base portion 420, the hub portion 448 is attached to a cable retaining wall 450. As such, the spool structure 437 can be defined as including the base structure 420, the hub portion 448, and the cable retaining wall 450. The first fiber optic connector 192 is connected to the adapter 436 and the length of cable 190 between the connectors 192, 194 is coiled about the hub portion 448 and between the base portion 420 and wall 450.

In one aspect, the base portion 420 defines a first front face 420a while the cable retaining wall 450 defines a second front face 450a. In one example, the first front face 420a is parallel to the second front face 450a. In one example, the first front face 420a has a height and a width that are each equal to a corresponding height and width of the second front face 450a.

Referring to FIGS. 33-37, an exemplary cable storage arrangement 500 configured as a wall outlet 500 is presented. The wall outlet 500 stores the patch cord or jumper cable 190, which has connectors 192, 194 at each end, in a coiled fashion. As configured, only the length of jumper cable 190 needed to extend from the wall outlet 500 to the ONT 180 is dispensed, with the remainder being stored within the wall outlet 500 in a concealed fashion. As shown, the wall outlet 500 includes a base portion 520. An adapter 536 is provided at the base portion 520 and is located at least partially within the base portion 520. The adapter 536 may be connected to a subscriber cable 110 that extends into an interior of the base portion 520.

A spool structure 537 is provided and extends from the base portion 420 with a first hub portion 540 and an oppositely disposed second hub portion 542. A first cable retaining flange 550 extends from the first hub portion 540 to form a first lobe structure while a second cable retaining flange 552 extends from the second hub portion 542 to form a second lobe structure. As shown, the flanges 550, 552 extend at an oblique angle from the hub portions 540, 542 to allow for easier dispensing of the cable off of the flanges 550, 552. Although two lobe structures are shown, it is noted that any number of suitable spaced lobe structures may be used, such as three, four, five, or six lobe structures. As configured, the spool structure 537 can be defined as including the base structure 520, the hub portions 540, 542 and the cable retaining flanges 550, 552.

The first fiber optic connector 192 is connected to the adapter 536 and the length of cable 190 between the connectors 192, 194 is coiled about the hub portions 540, 542 and between the base portion 520 and the flanges 550, 552.

Referring to FIGS. 38-43, an exemplary cable storage arrangement 600 configured as a wall outlet 600 is presented. The wall outlet 600 stores the patch cord or jumper cable 190, which has connectors 192, 194 at each end, in a coiled fashion. As configured, only the length of jumper cable 190 needed to extend from the wall outlet 600 to the ONT 180 is dispensed, with the remainder being stored within the wall outlet 600 in a concealed fashion. As shown, the wall outlet 600 also includes a mounting plate 602, a base structure 620, and a cover 660. The operation of the wall outlet 600 is similar in principle to the wall outlet 200 in that the base structure 620 defines a fixed spool about which the cable 190 can be wound and unwound with the cove rotatably disposed on the base structure 620.

As shown, the mounting plate 602 has a sidewall 604 extending between a first side 606 and a second opposite side 608. As shown, the sidewall 604 defines a cylindrically shaped outer profile. Other shapes are possible. The mounting plate 602 is also provided with a pair of apertures 610 extending between the first and second sides 606, 608. The apertures 610 allow for a fastener (not shown) to extend through the mounting plate 602 such that the mounting plate 602 can be mounted to a wall or other similar structure, with the first side 606 adjacent the wall. It is noted that the mounting plate 602 could be attached to a wall through other means, such as by an adhesive.

The second side 608 of the mounting plate 602 is provided with a pair of attachment structures 612 configured to engage with corresponding attachment structures 624 on the base structure 620. This structure allows the base structure 620 to be mounted and retained onto the mounting plate 602 after the mounting plate 602 has been secured to a wall. As shown, the attachment structures 612 are each configured with a recess 612a and a latch aperture 612b while each attachment structure 624 is configured with a tab 624a that is received by the recess 612a and with a latch 612b that can provide a snap-fit type connection with the latch aperture 612b. This configuration ensures a proper orientation of the base structure 620 with respect to the mounting plate 602. The mounting plate 602 further includes an exit aperture, channel, or recess 614 through which a cable 191 extending from the base structure 620 can extend. A pair of bend radius limiters 616 can be provided to ensure that the cable 191 is properly guided through the recess 614.

As presented, the base structure 620 has a first sidewall 622, extending from a base wall 638, upon which at least a portion of the attachment structures 624 are disposed. The first sidewall 622 is shown as being cylindrically shaped and defines an internal cavity 623 in conjunction with the base wall 638. As shown, the base structure sidewall 622 and the mounting plate sidewall 604 have a similar dimension. Accordingly, when the base structure 620 is secured to the mounting plate 602, the sidewalls 602, 622 are flush. In this position, the base structure sidewall 622 is received within the sidewall 604 and the second side 208 of the mounting plate 202 encloses the internal cavity 623 of the base structure 620.

The base structure 620 is further shown as including an adapter mounting structure 626 extending from the base wall 638 and into the internal cavity 223. The base structure 620 also includes a pair of bend radius limiters 628, 630 extending from the base wall 638 and an aperture 632 extending through the base wall 638. The adapter mounting structure 226 receives and retains an adapter 636 in a snap-fit type arrangement. In one example, the adapter 636 is a male-to-male type adapter that receives optical connector 155 and optical connector 192 of the jumper cable 190. From the connector 192, the jumper cable 190 extends in a channel defined by the spaced apart and parallel bend radius limiters 628, 630 and then through the aperture 632 such that the remaining length of the jumper cable 190 can be coiled about a drum region or spool structure 637. As shown, the spool structure 637 is defined by the base wall 638, a hub portion 648, and a second wall 650 parallel to the base wall 638. The bend radius limiters 628, 630 prevent jumper cable 190 from bending too sharply before passing through aperture 632. The base structure 620 additionally includes a pair of bend radius limiters 634 that act to guide cable 191 through recess 614 in cooperation with the adjacently disposed bend radius limiters 616.

The spool structure 637 can be covered by the cover 660 such that the portion of the jump cable 190 wound about the spool structure 637 is concealed from view. The cover 660 can be provided with a front wall 662 from which a cylindrical sidewall 664 extends. The sidewall 664 can be provided with a plurality of ribs 667 to maintain proper orientation of the cover 660 with respect to the base structure sidewall 602. The sidewall 664 can be provided with a port structure 665 through which the jumper cable 190 can extend. As shown, the port structure 665 is configured as a nose structure extending away from the sidewall 664 and defines a central passageway 665a between a pair of bend radius limiters 665b and a removable bottom plate 665c that is snap-fit to the port structure 665 via snap-fit type latches received in apertures of the port structure 665. The cable 190 extends from the spool structure 637 and through the central passageway 665a as the cable 190 is fed into or out of the wall outlet 600. The bend radius limiters 665b ensure that the cable 190 is carefully guided onto the spool structure 637 when the cable 190 is being wound about the spool structure 637 and is carefully guided off of the spool structure 637 when the cable 190 is being unwound from the spool structure 637 such that the cable 190 is prevented from being pulled against a sharp edge. The bottom plate 665c is removable from the port structure 665 such that the passageway 665a has an open face, thereby allowing the cover 660 to be removed from the base structure 620 without requiring the cable 190 to be completely unwound from the hub structure 637 or threaded back out of the passageway 665a.

In one aspect, the cover 260 is rotatably attached to the base structure 620 by a selector assembly 670. As shown, the lock assembly 670 includes a latch member 672 and a selector plate 674, wherein the latch member 672 rests on a recessed portion 662a of the front wall 662 and extends through an aperture 663 of the front wall 662. The selector plate 674 is disposed on the opposite side of the front wall 662 from the latch member 672 and has a handle portion 674a that extends through an aperture 672a in the latch member 672. The handle portion 674a extends from a plate portion 674b. The latch member 672 is secured to the base structure 620 via latch members 672 that extend into the central area 648a defined by the hub portion and snap-fit onto tabs 648b extending from the sidewall of the hub portion 648.

Once the latch member 672 is secured to the base structure 620, the selector plate 674 is slidably disposed between the latch member 672 and a top edge 648c of the hub portion 648. Grooves 648d are provided in the top edge 648c that receive a guide rib 674c on the selector plate 674. The grooves 648d and rib 674c cooperate such that the selector plate 674 is constrained to be slidable in a single direction D1 parallel with the direction of the guide rib 674c. In this position, the cover 660 is also rotatable with respect to the latch member 672 and the base structure 620, provided the selector plate 74 is in a neutral position.

The selector plate 674 is configured to be moved into one of three different positions via the handle portion 674a. These three positions are defined as discrete positions by an indexing feature 674d on the selector plate 675, configured as a protrusion extending from a cantilevered arm, and by an indexing feature 672c on the latch member 672, configured as two pairs of spaced apart protrusions. In a first position, the protrusions of the indexing feature 674d are entirely on a first side of the protrusions of the indexing feature 672c. In a second position of the selector plate 674, each protrusion of the indexing feature 674d is between two of the protrusions of the indexing feature 672c. In a third position, the protrusions of the indexing feature 674d are entirely on a second side of the protrusions of the indexing feature 672c. As the selector plate 674 is moved between these positions, the protrusions of the indexing features 672c, 674d engage each other such that the cantilevered arm of the indexing feature 672 is deflected. Once one of the three defined positions is reached, the protrusions of the indexing feature 674d snap back via the cantilevered arm as they are no longer held away by the protrusions of the indexing feature 672c. Thus, an operator can be assured that a particular position has been obtained, as a snapping action will occur which can be felt by the operator and can also be audible to the operator. The selector plate 674 can also be provided with end stops 674e which engage with the hub portion sidewall 648 to prevent the selector plate 674 from moving beyond the first position and from moving beyond the third position.

The selector plate 674 is also provided with three pairs of engagement members 674f, 674g, 674h. Depending on the position of the selector plate, the pairs of engagement members 674e, 674f, 674g are either engaged or disengaged with projection members 668 which extend from the cover front wall 662 in a circumferential arrangement. Each of the first and third pair of engagement members 674f, 674h is configured as a ramped protrusion extending from a cantilevered arm. In contrast, each of the second pair of engagement members 674g is configured as a protrusion extending directly from the main body of the selector plate 674 without a ramped surface on either side of the protrusion. In one aspect, the projection members 668 are provided with a trapezoidal shape to ensure that the engagement members 674, 674f, 674g are presented generally orthogonally against the side surfaces of the projection members 668.

Figure 41:
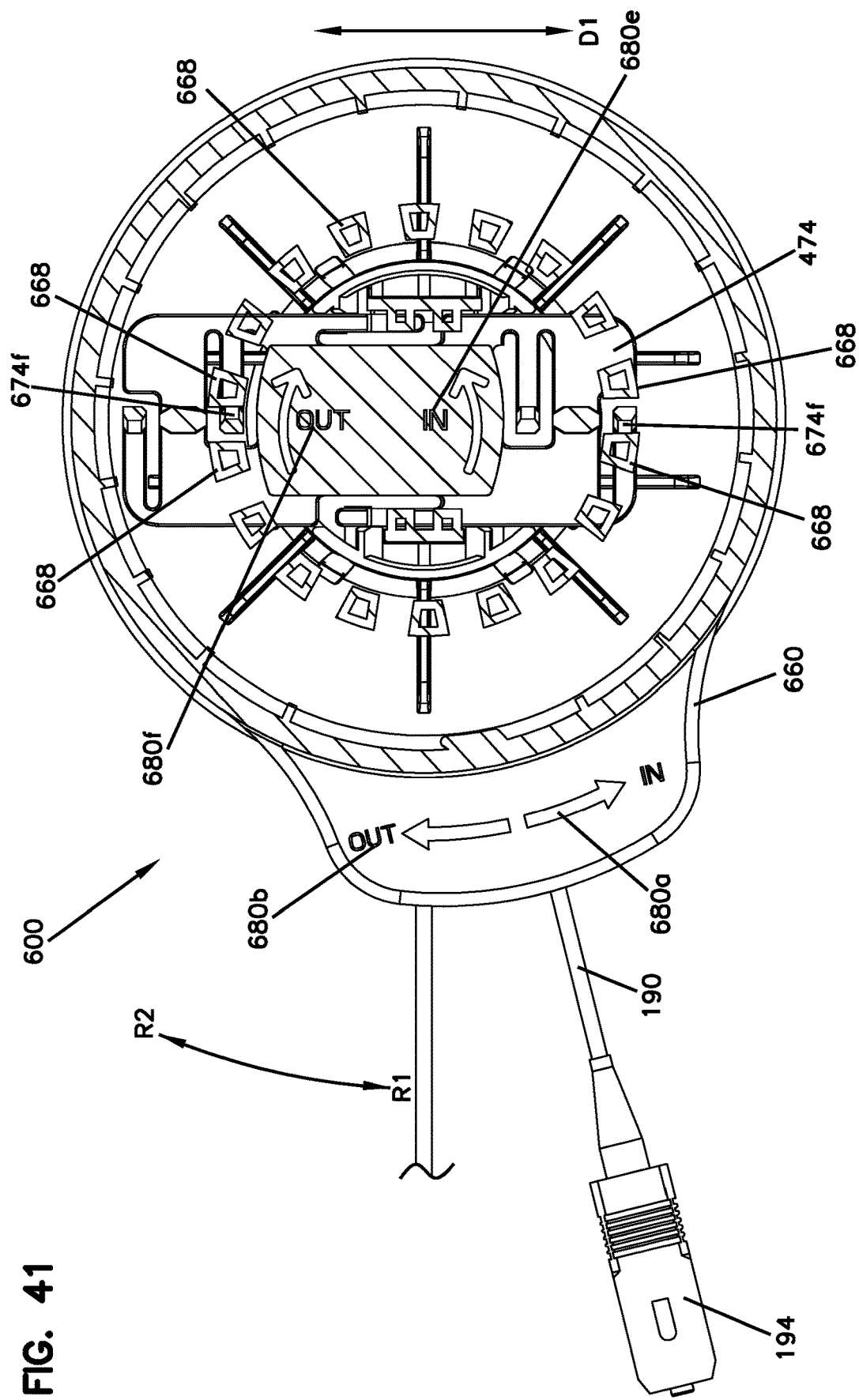
FIG. 41 is a top cross-sectional view of the telecommunications wall outlet shown in FIG. 38, with a selector switch in a first position.

When the selector plate 674 is moved to the first position, the engagement members 674f engage between the projection members 668, as most easily seen at FIG. 41. Due to the orientation of the ramped surface on the protrusions of the engagement members 674f, the cover 660 is enabled to rotate in a first rotational direction R1 (e.g. the direction that allows cable to be wound about the hub) but prevented from rotating in a second opposite rotational direction R2 (e.g. the direction that allows the cable to be unwound about the hub). When the cover 660 is rotated in the first rotational direction R1, the ramped side of the protrusions of the engagement members 674f allows the protrusions of the engagement members 674f to deflect away from the projection members 668 via the cantilevered arm. Accordingly, a resulting audible clicking sound will result as the cover is rotated in the first rotational direction R1 with the selector plate 674 in the first position. When the cover 660 is attempted to be rotated in the second rotational direction R2, the non-ramped side of the protrusions of the engagement members 674 abut the adjacent projections members 668 and prevent the cover 660 from rotating in the second rotational direction R2. Thus, when the selector plate 674 is moved into the first position, the cable 190 can be wound back into the wall outlet 600, but cannot be fed out the wall outlet 600.

Figure 42:
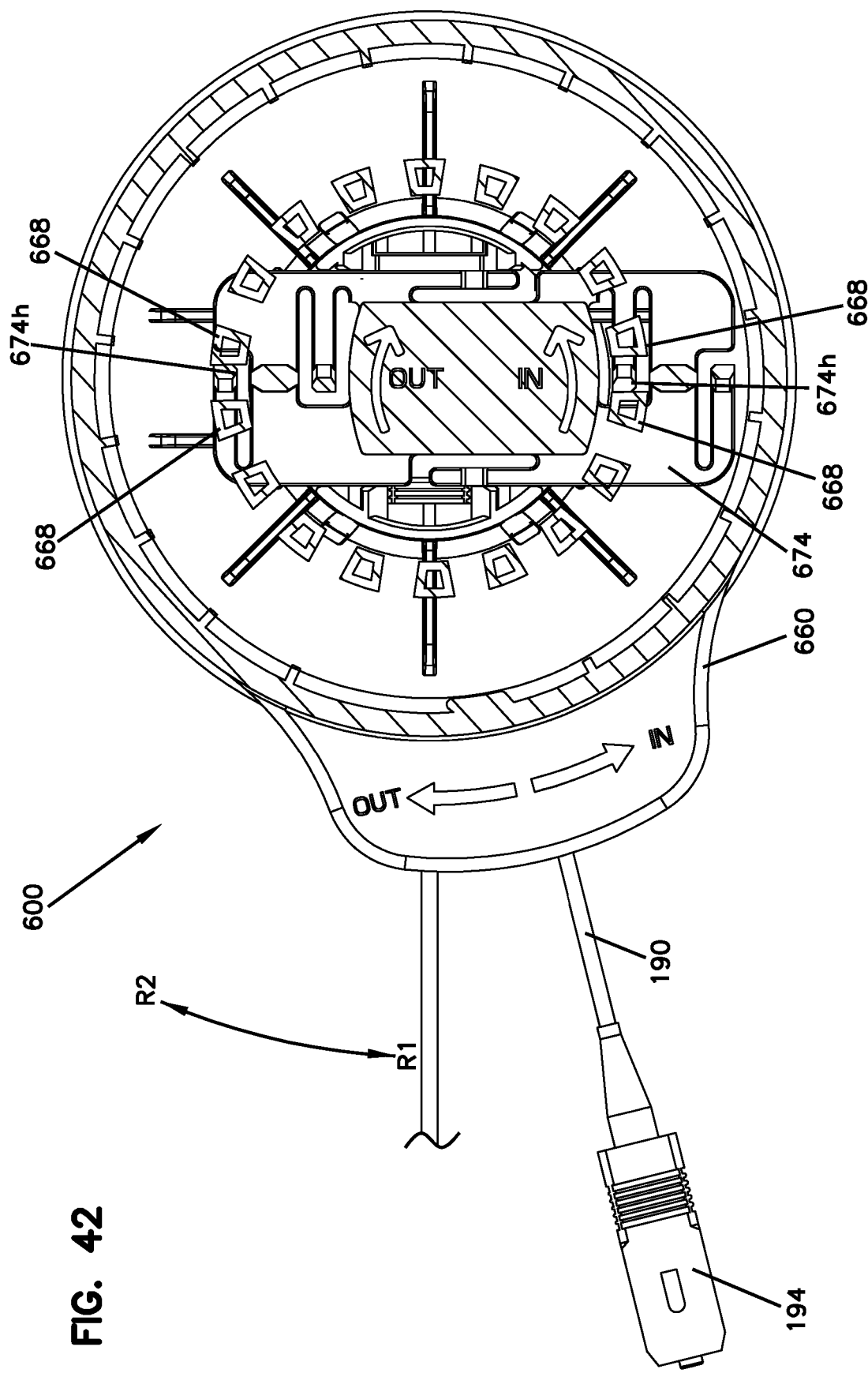
FIG. 42 is a top cross-sectional view of the telecommunications wall outlet shown in FIG. 38, with a selector switch in a second position.

When the selector plate 674 is moved to the third position, the engagement members 674h engage between the projection members 668, as most easily seen at FIG. 42. Due to the orientation of the ramped surfaces on the protrusions of the engagement members 674h, which is the opposite orientation of the ramped surfaces on the protrusions of the engagement members 674h, the cover 660 is enabled to rotate in the second rotational direction R2 but prevented from rotating in the first rotational direction R1. When the cover 660 is rotated in the second rotational direction R2, the ramped side of the protrusions of the engagement members 674h allows the protrusions to deflect away from the projection members 668 via the cantilevered arm. Accordingly, a resulting audible clicking sound will result as the cover is rotated in the second rotational direction R2 with the selector plate 674 in the third position. When the cover 660 is attempted to be rotated in the first rotational direction R1, the non-ramped side of the protrusions of the engagement members 674h abut the adjacent projections members 668 and prevent the cover 660 from rotating in the first rotational direction R1. Thus, when the selector plate 674 is moved into the third position, the cable 190 can be fed out the wall outlet 600, but cannot be wound back into the wall outlet 600.

Figure 43:
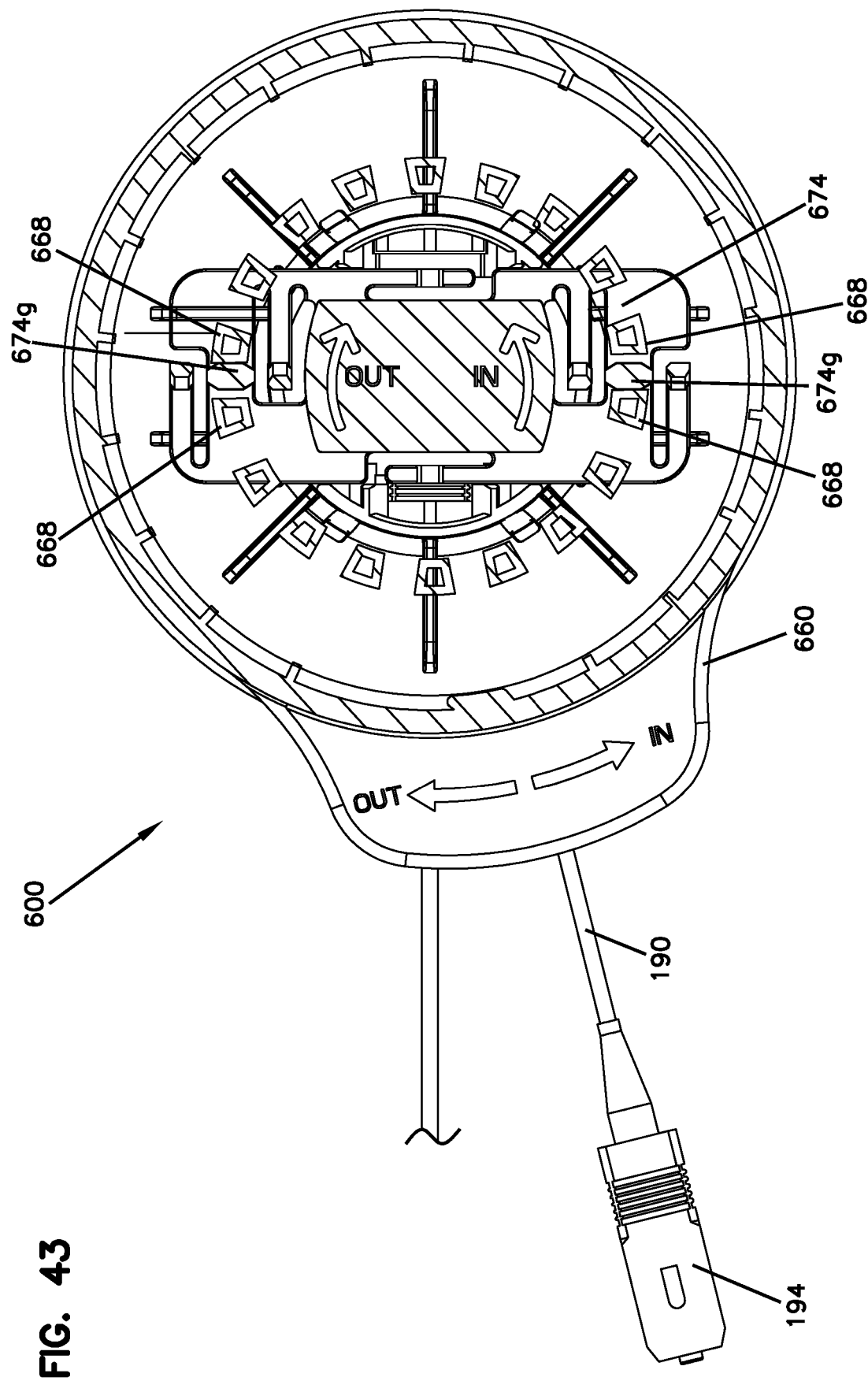
FIG. 43 is a top cross-sectional view of the telecommunications wall outlet shown in FIG. 38, with a selector switch in a third position.
Figure 44:
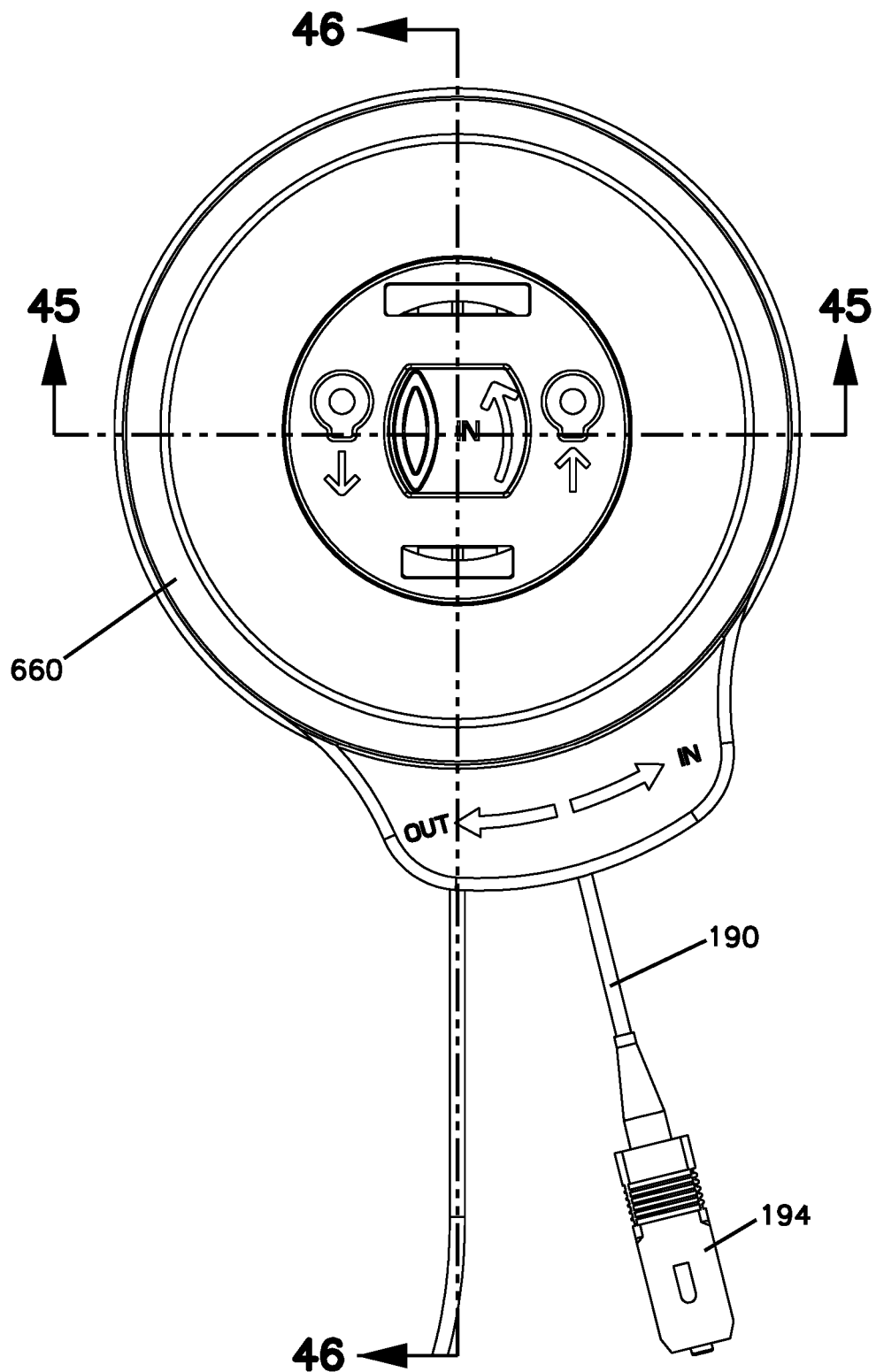
FIG. 44 is a top view of the telecommunications wall outlet shown in FIG. 38.
Figure 45:
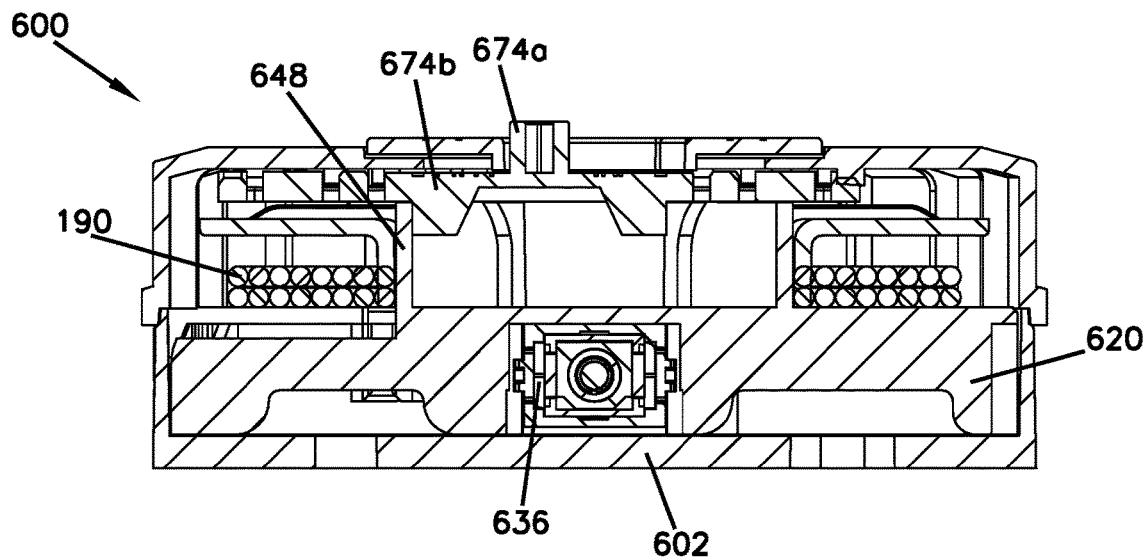
FIG. 45 is a cross-sectional view of the telecommunications wall outlet shown in FIG. 38, taken along the line 45-45 in FIG. 44.
Figure 46:
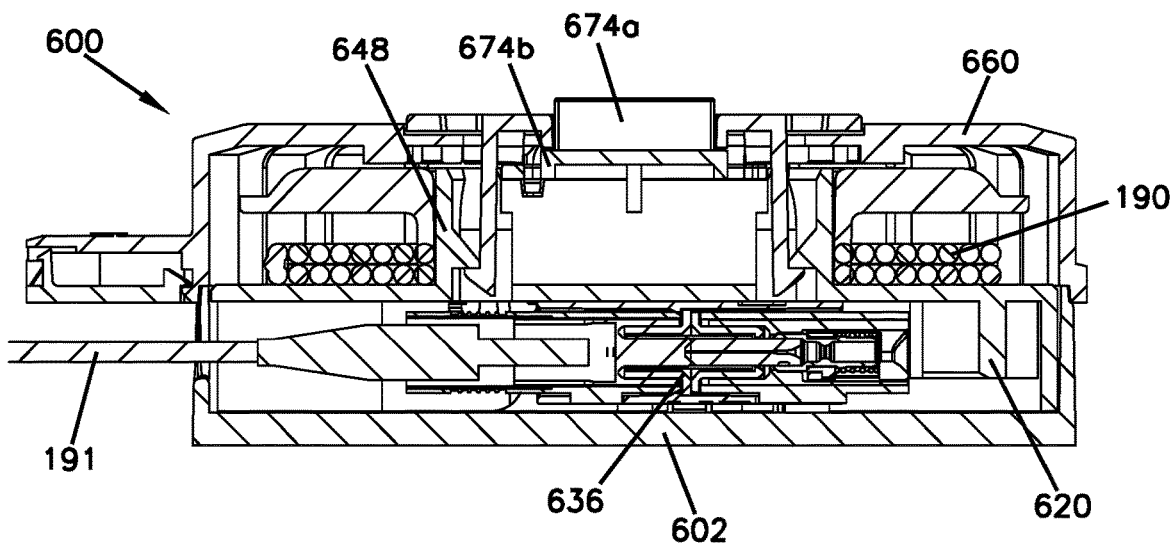
FIG. 46 is a cross-sectional view of the telecommunications wall outlet shown in FIG. 38, taken along the line 46-46 in FIG. 44.
Figure 47:
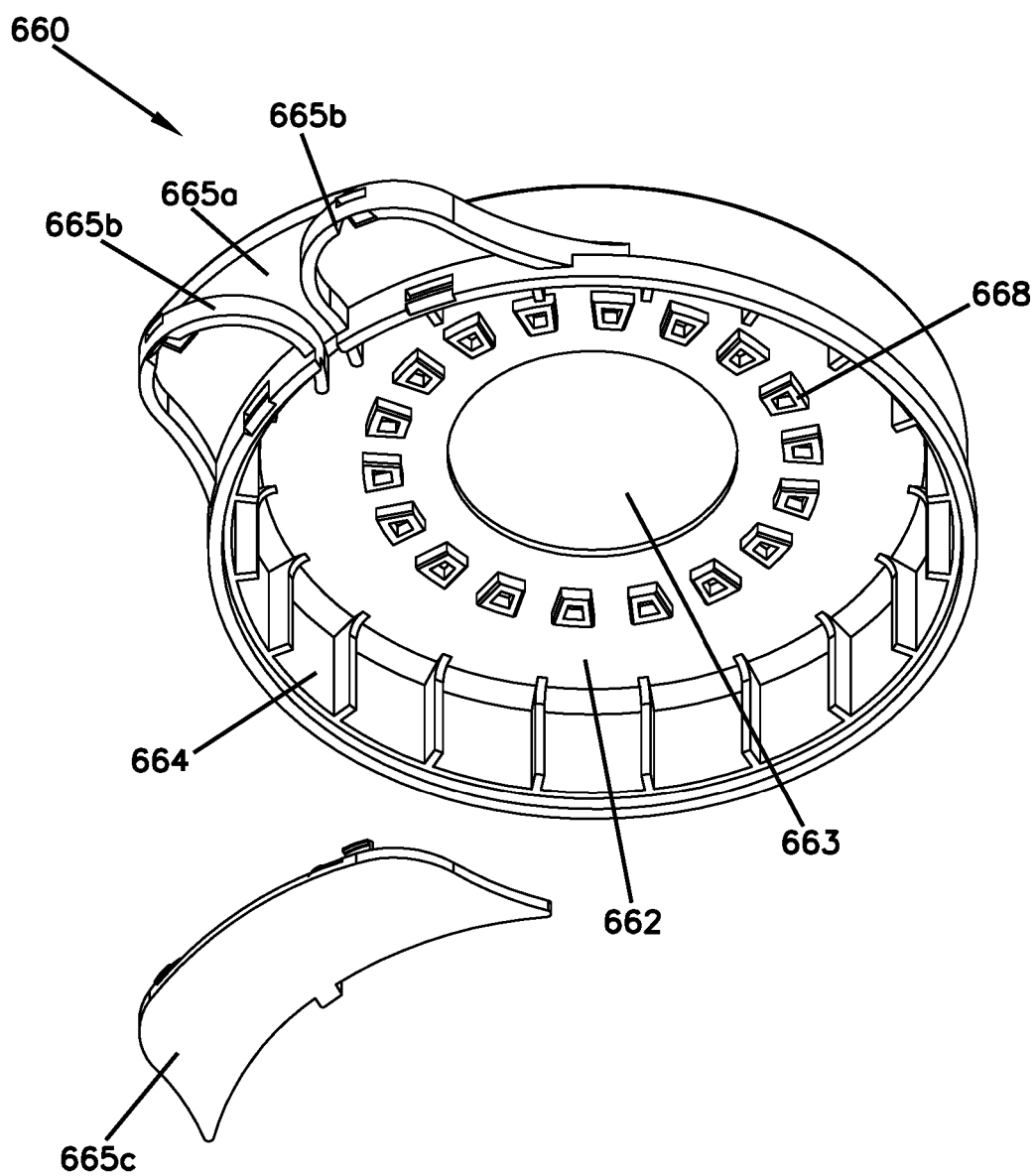
FIG. 47 is a bottom perspective view of a cover of the telecommunications wall outlet shown in FIG. 38.
Figure 48:
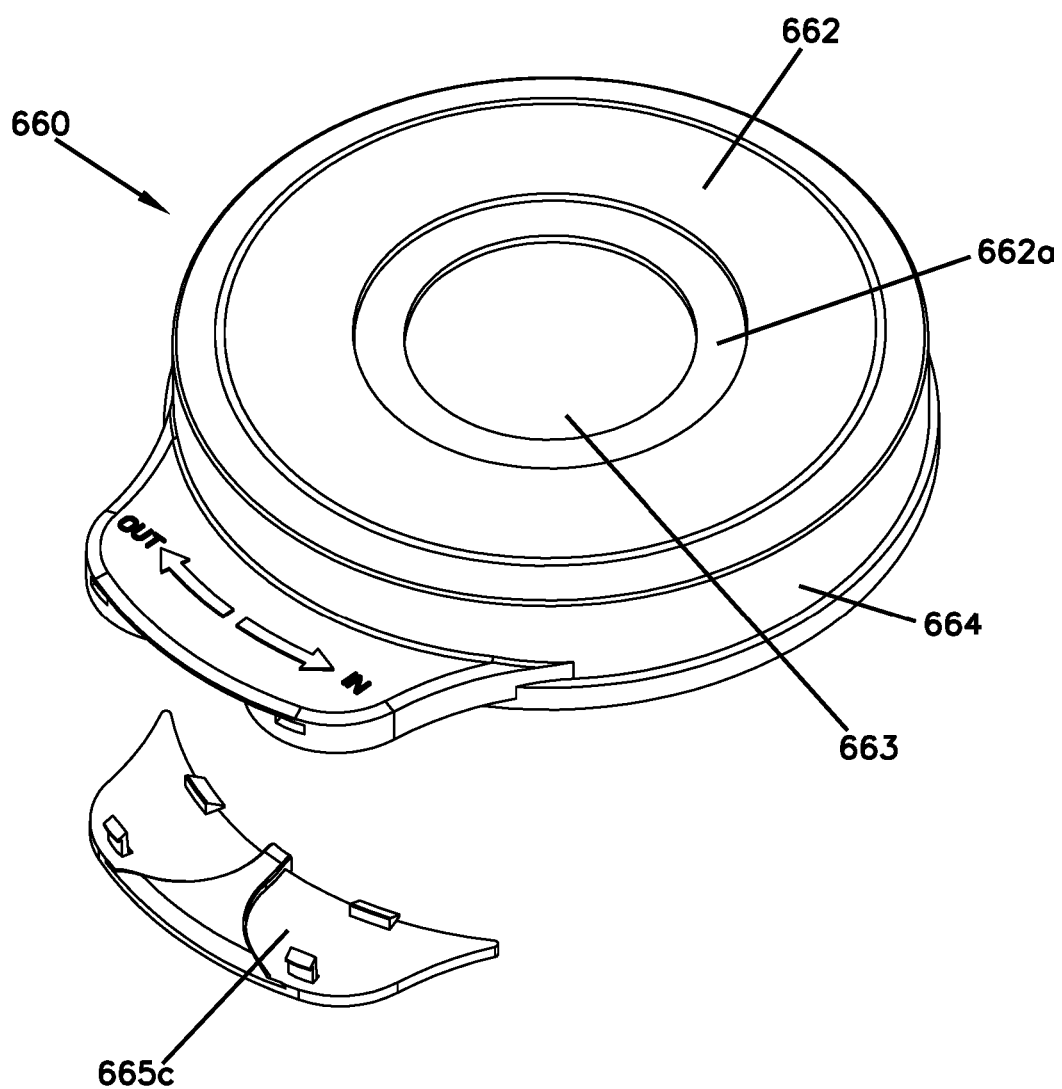
FIG. 48 is a top perspective view of the cover shown in FIG. 47.
Figure 54:
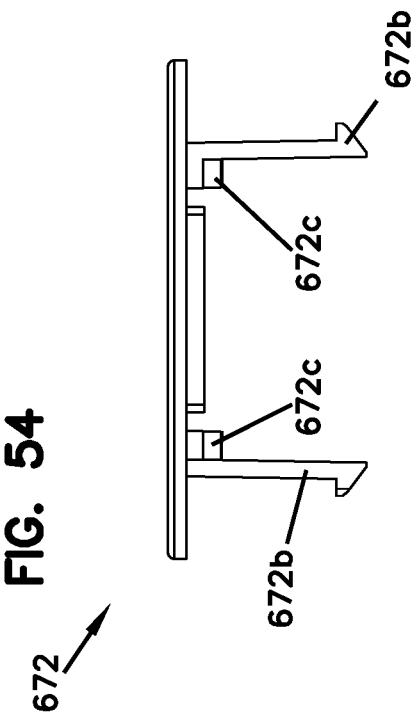
FIG. 54 is a side view of the latch member shown in FIG. 53.
Figure 56:
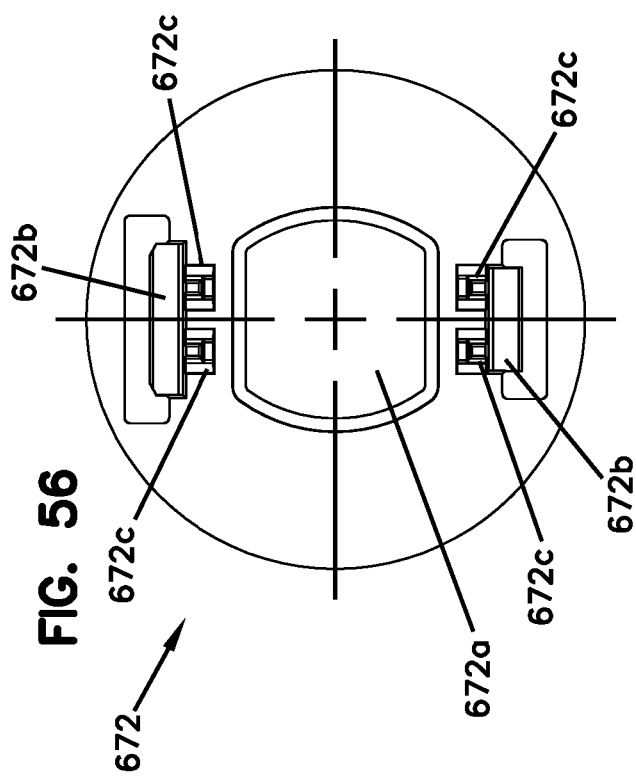
FIG. 56 is a bottom view of the latch member shown in FIG. 53.
Figure 53:
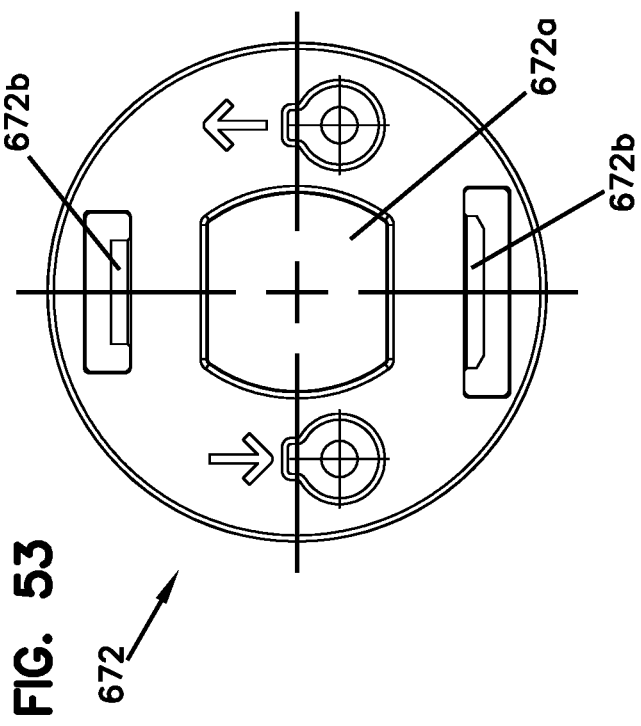
FIG. 53 is a top view of a latch member of the telecommunications wall outlet shown in FIG. 38.
Figure 55:
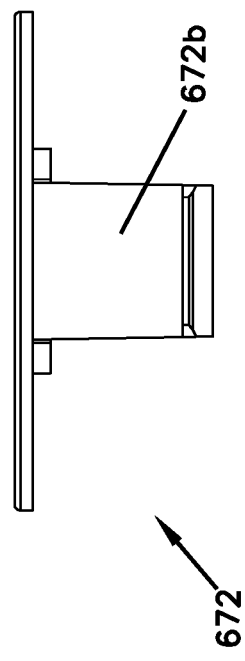
FIG. 55 is a front view of the latch member shown in FIG. 53.
Figure 61:
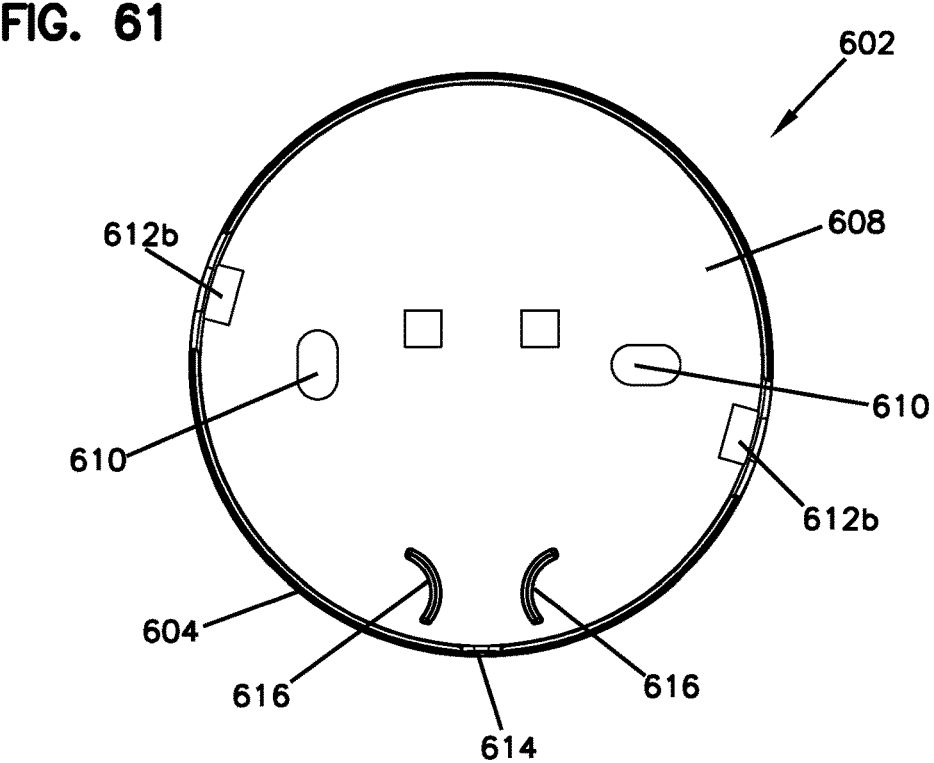
FIG. 61 is a top view of a mounting plate of the telecommunications wall outlet shown in FIG. 38.
Figure 62:
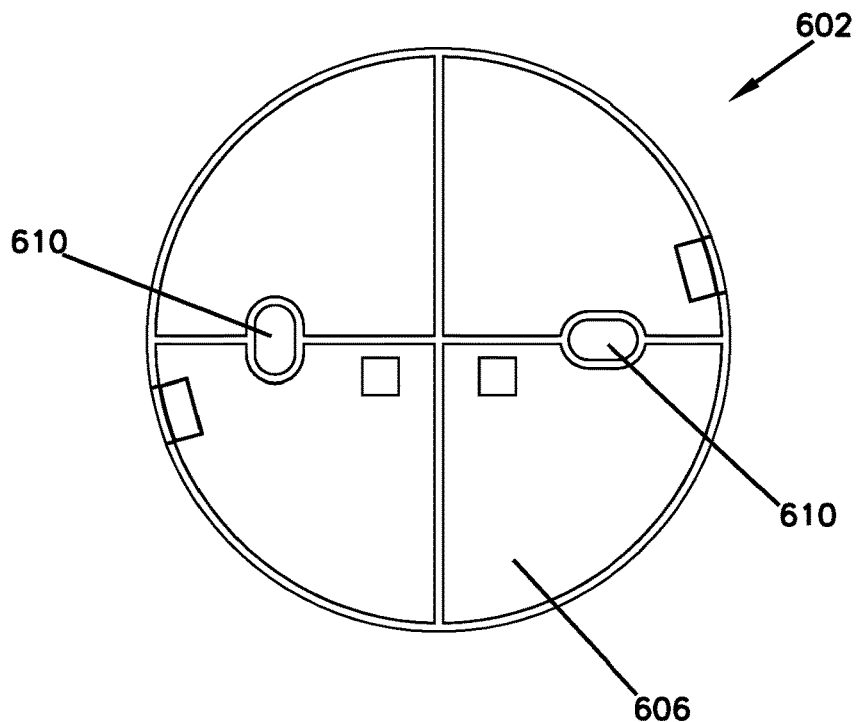
FIG. 62 is a bottom view of the mounting plate shown in FIG. 61.
Figure 63:
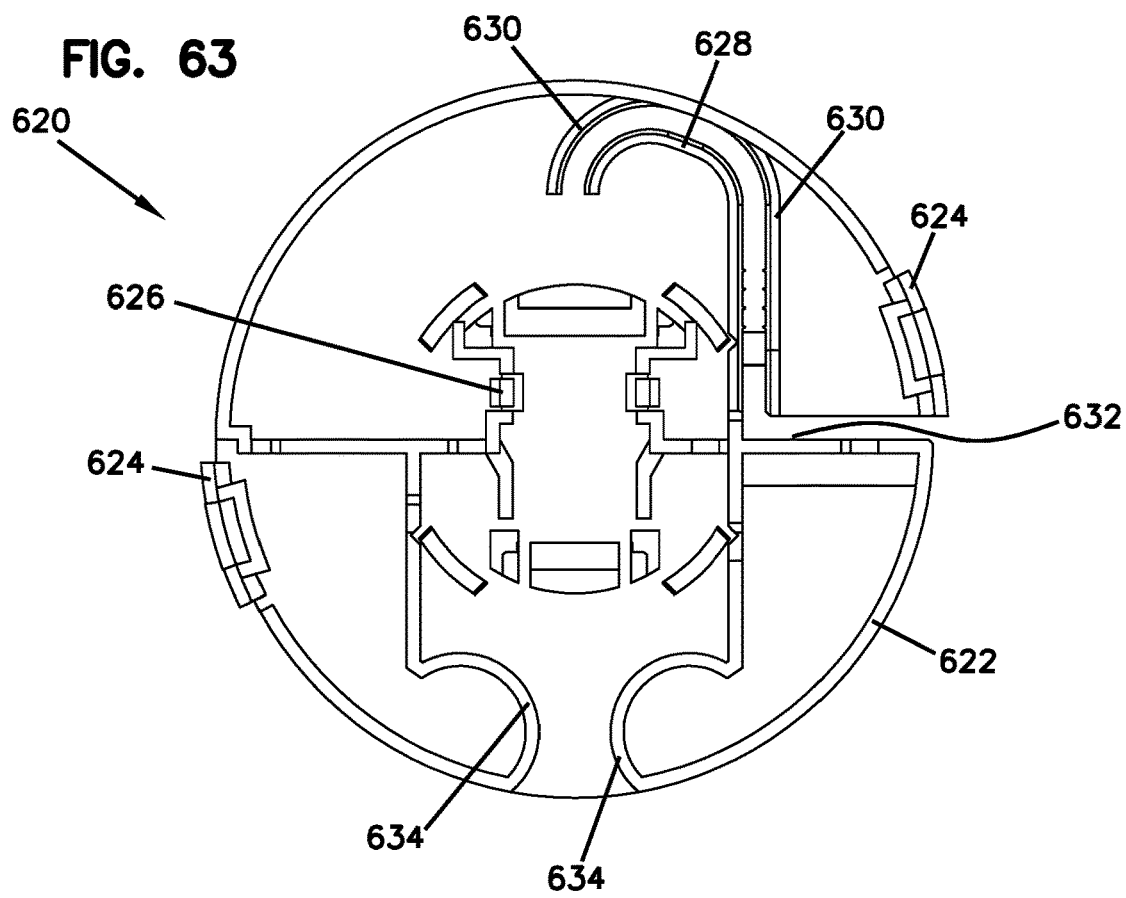
FIG. 63 is a top view of a base structure of the telecommunications wall outlet shown in FIG. 38.
Figure 64:
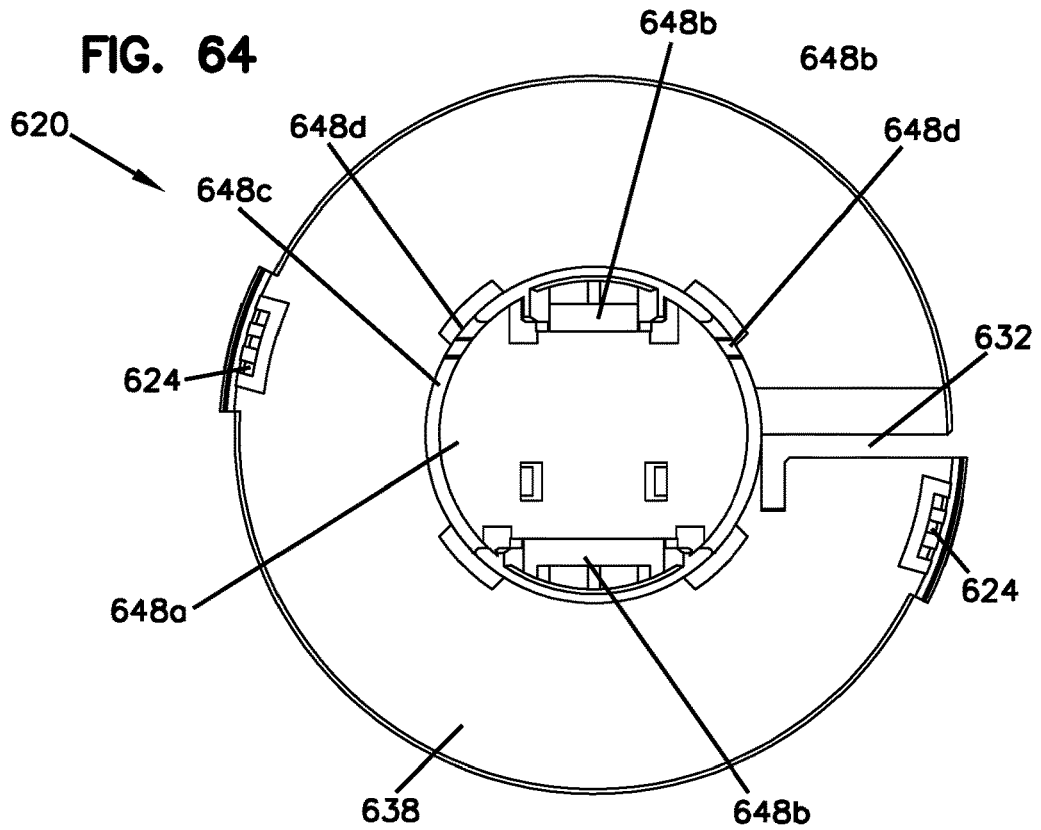
FIG. 64 is a bottom view of the base structure shown in FIG. 63, with a second wall 650 of the base structure in a removed position away from the base structure.
Figure 65:
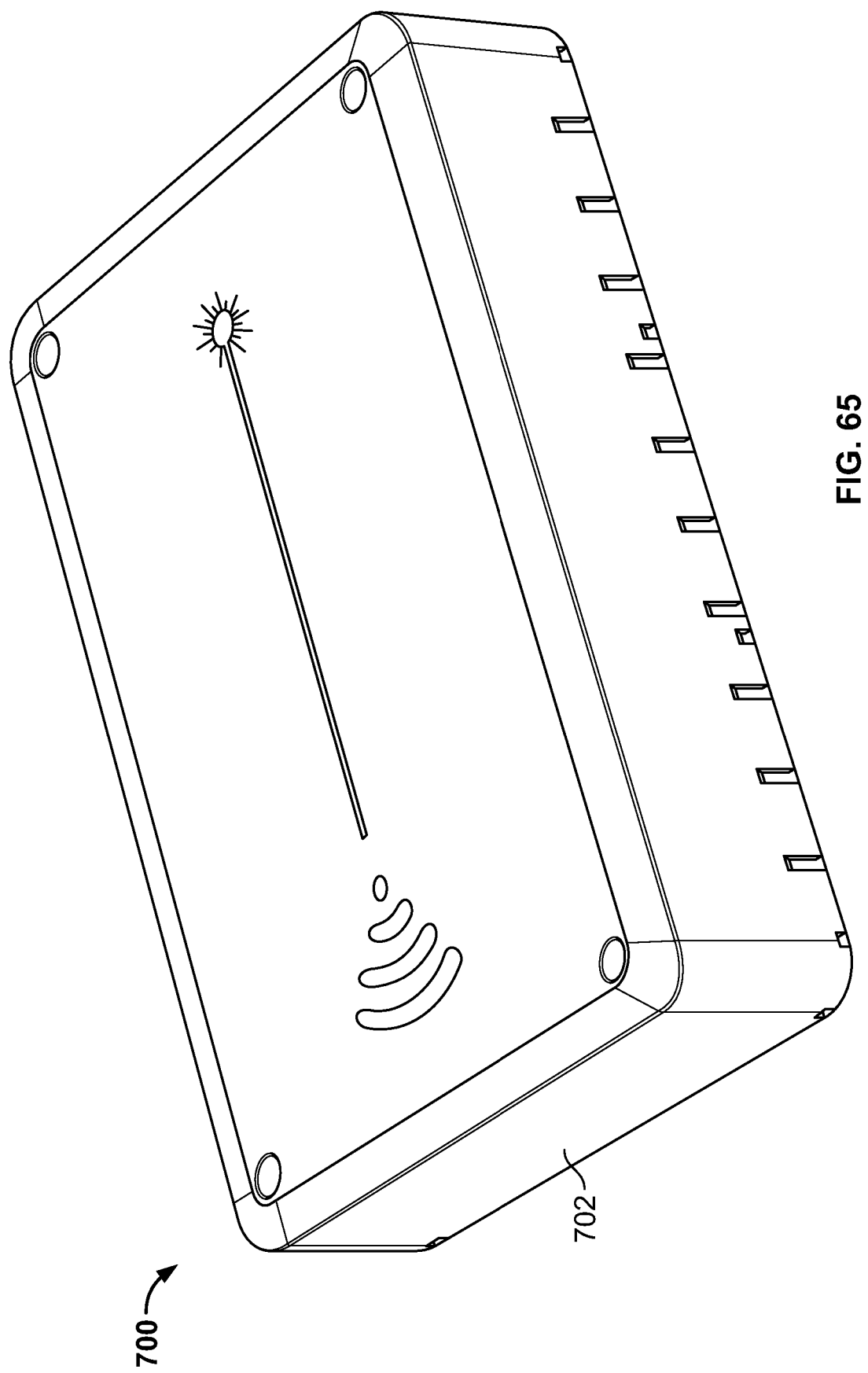
FIG. 65 is a perspective view of a telecommunications box housing the telecommunications wall outlet shown in FIG. 38.
Figure 66:
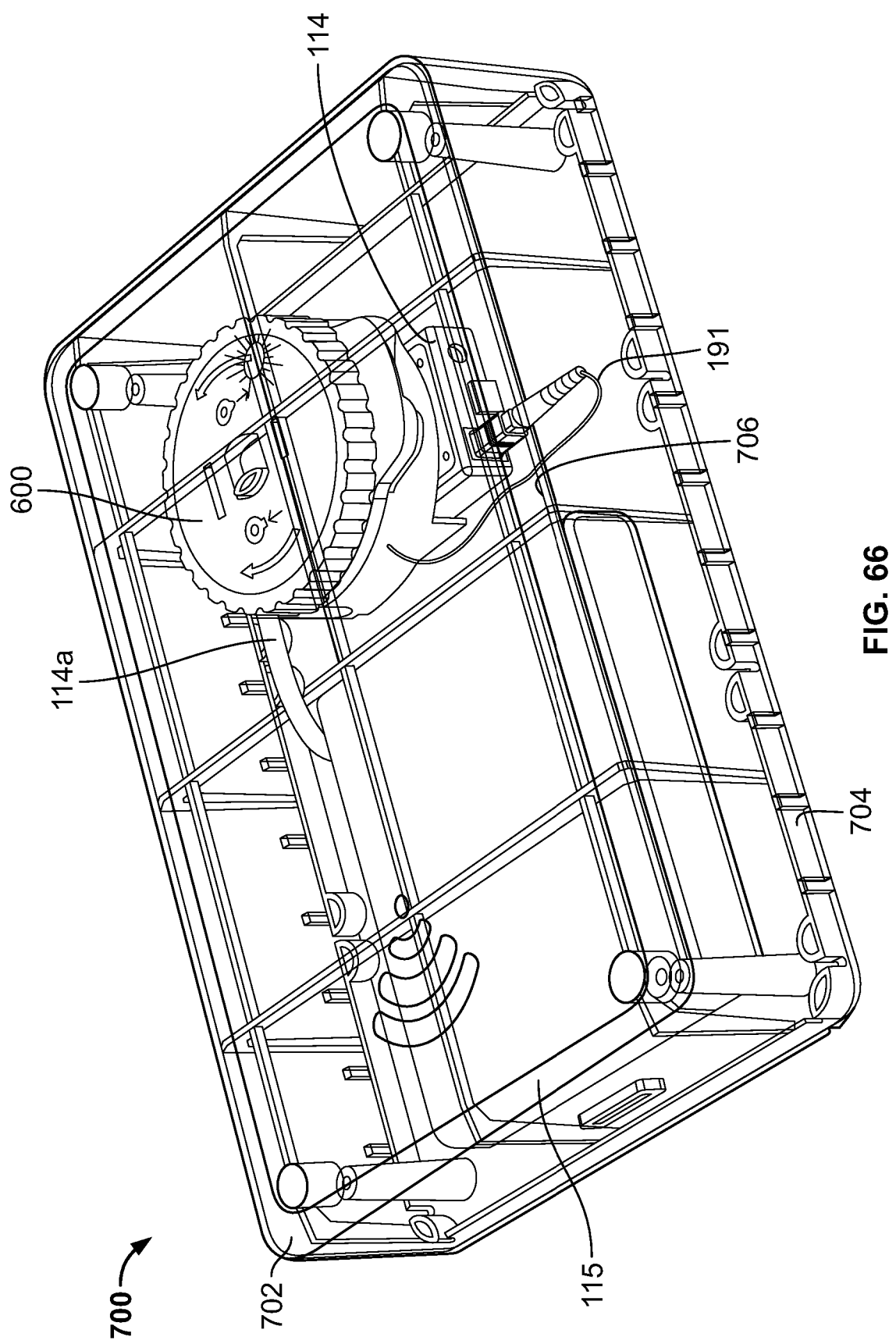
FIG. 66 is a perspective view of the telecommunications box shown in FIG. 65, with a cover portion transparently shown.
Figure 67:
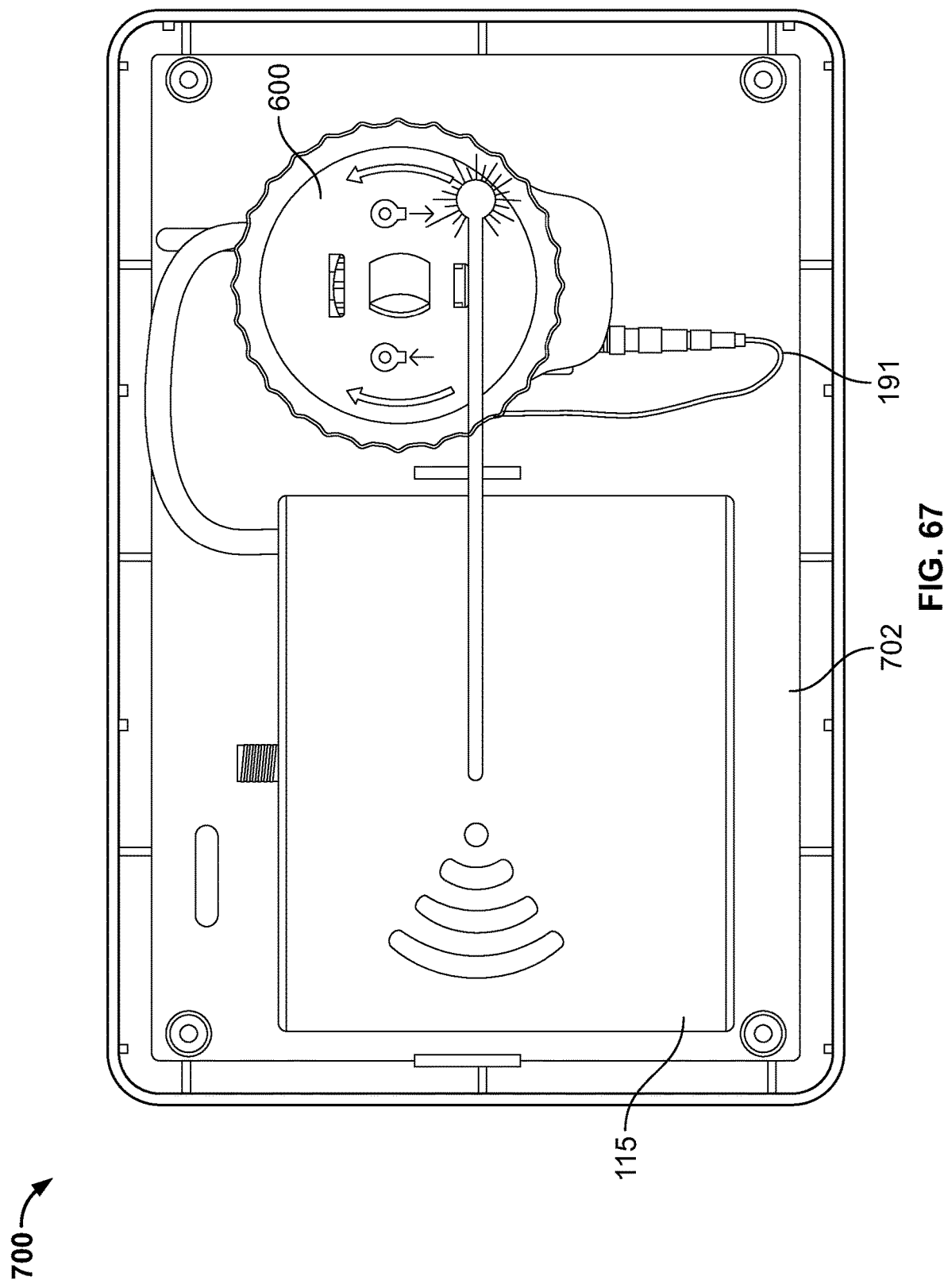
FIG. 67 is a top view of the telecommunications box shown in FIG. 65, with a cover portion transparently shown.
Figure 68:
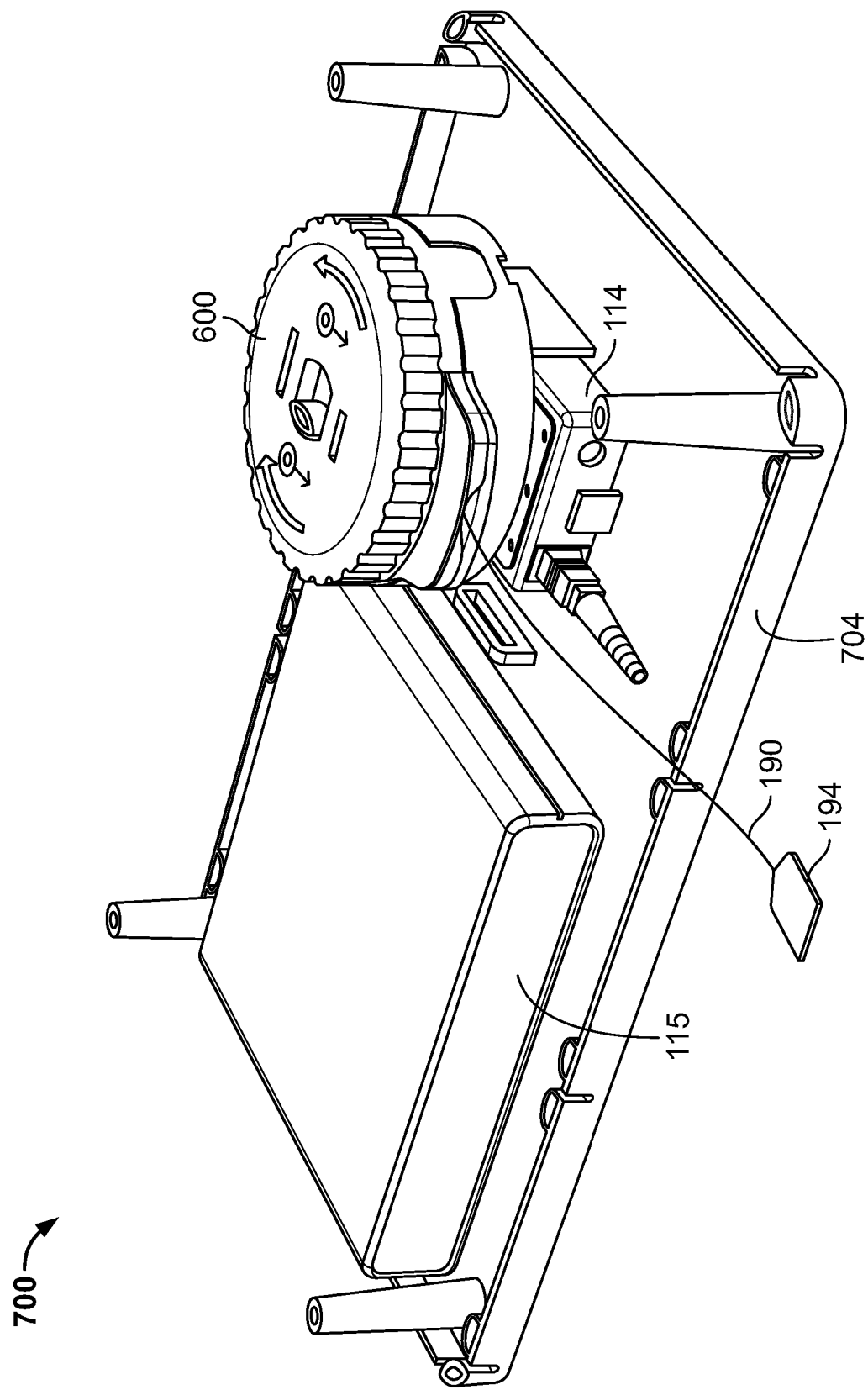
FIG. 68 is a perspective view of the telecommunications box shown in FIG. 65, with a cover portion removed.
Figure 69:
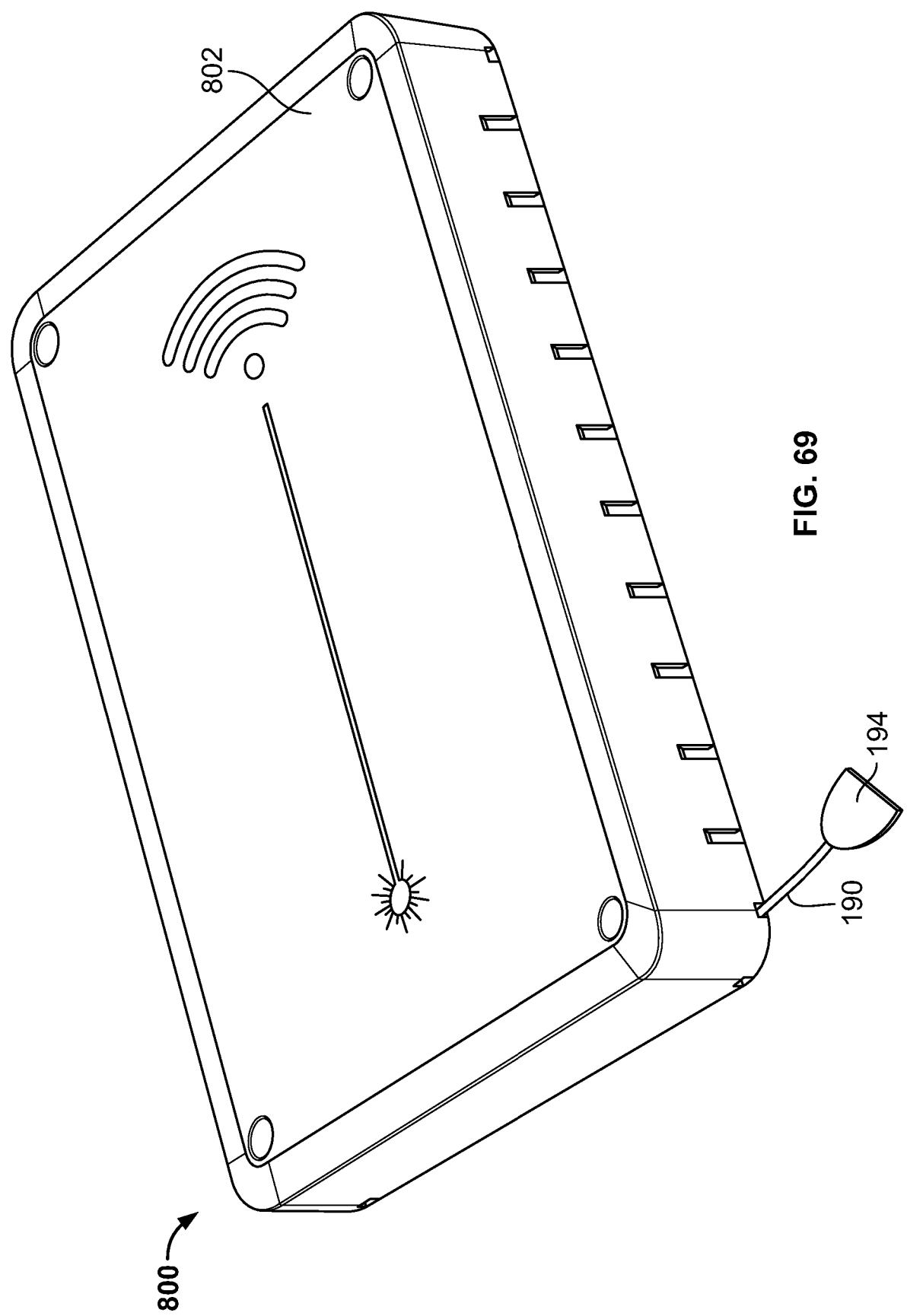
FIG. 69 is a perspective view of a telecommunications box having features in common with the telecommunications box shown in FIG. 65 and with a sixth example of a telecommunications wall outlet.
Figure 70:
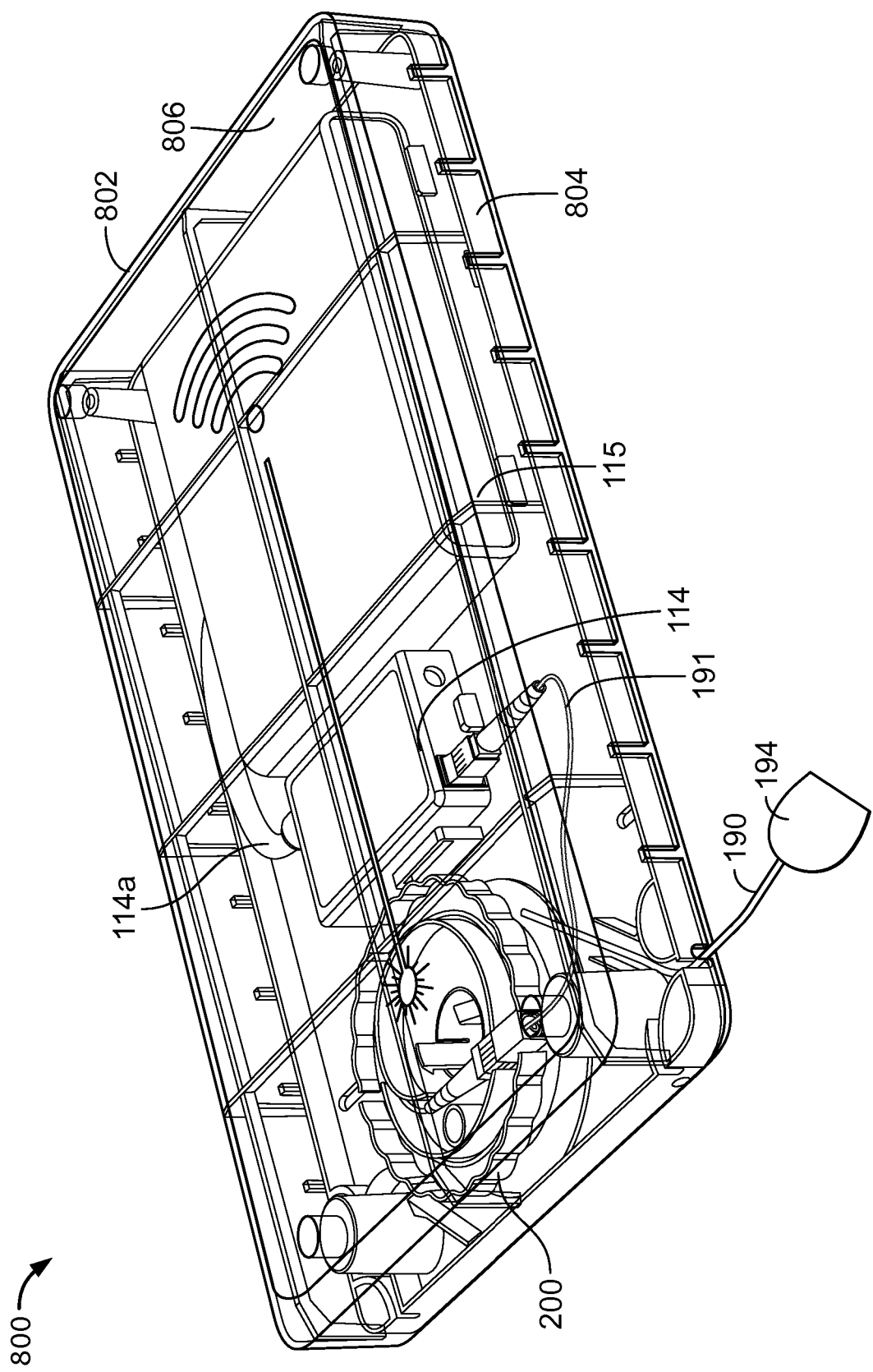
FIG. 70 is a perspective view of the telecommunications box shown in FIG. 69, with a cover portion transparently shown.
Figure 71:
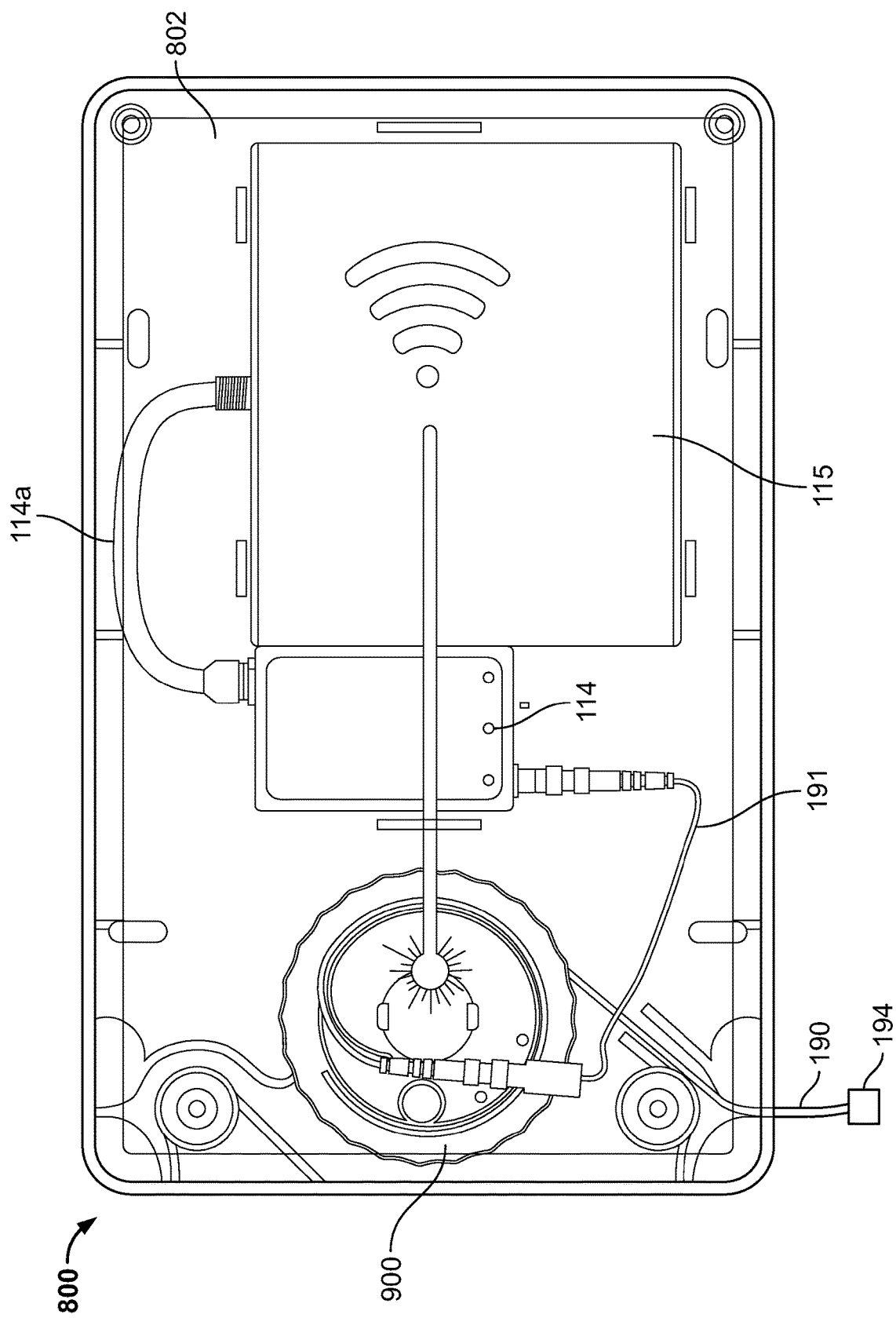
FIG. 71 is a top view of the telecommunications box shown in FIG. 69, with a cover portion transparently shown.
Figure 72:
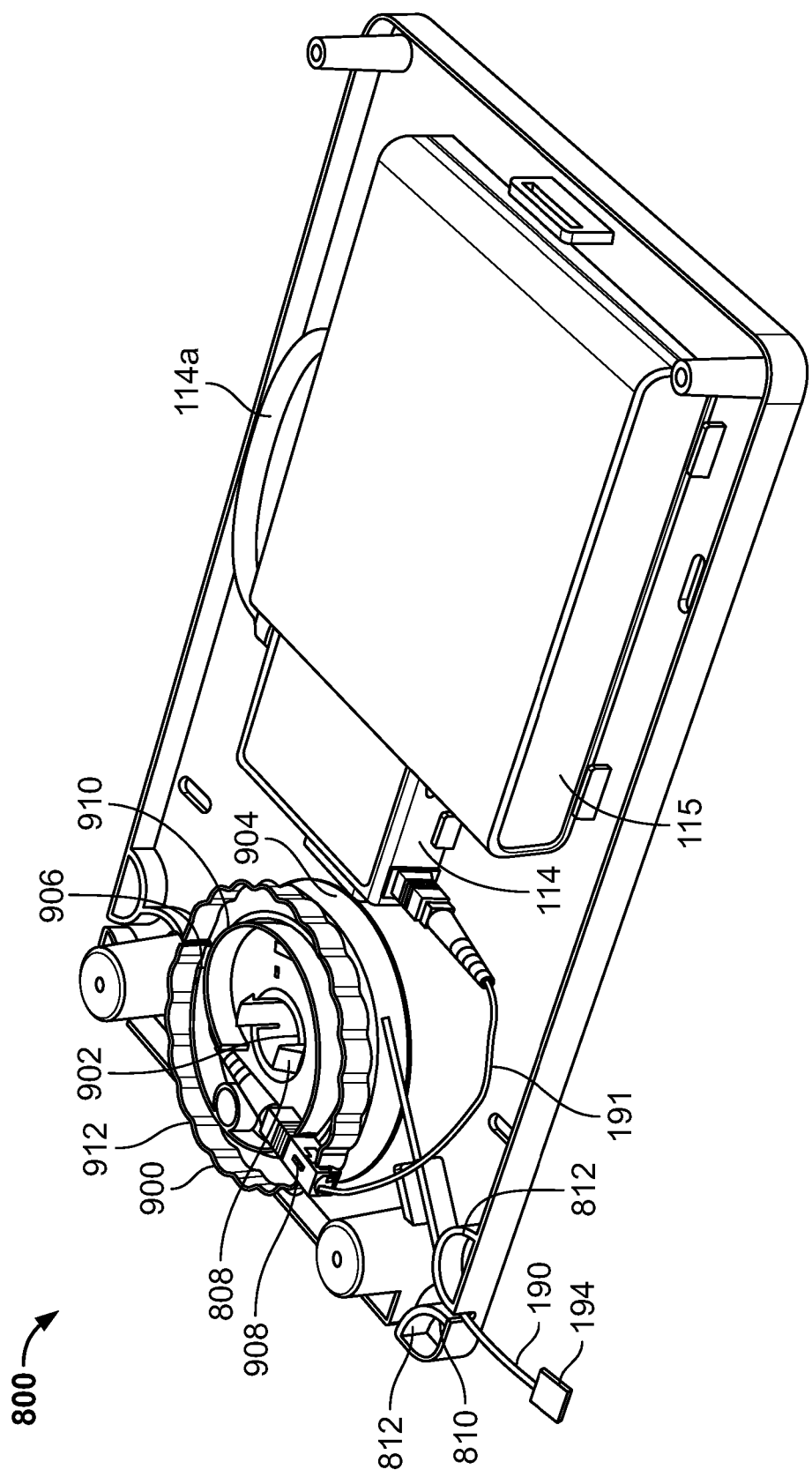
FIG. 72 is a perspective view of the telecommunications box shown in FIG. 69, with a cover portion removed.

When the selector plate 674 is moved to the second position, the engagement members 674g engage between the projection members 668, as most easily seen at FIG. 43. As the engagement members 674g are configured as protrusions without ramped surfaces and without any means to allow for deflection away from the projection members 668, the cover 660 is prevented from moving in either of the first and second rotational directions R1, R2 when the selector plate 674 is moved to the second position. Thus, when the selector plate 674 is moved into the second position, the cable 190 can neither be fed out of our wound into the wall outlet 600.

The wall outlet 600 can also be provided with various indicia to allow an operator to understand what position into which the selector plate 674 has been placed and which rotational direction R1, R2 relates to feeding out the cable and winding the cable back into the wall outlet 600. For example, indicia 680a can be provided on the cover 660, for example the port structure 665, to indicate the winding direction of the cable that will result in the cable being wound into the wall outlet 600. Indicia 680b can also be provided on the cover 660, for example the port structure 665, to indicate the winding direction of the cable that will result in the cable being unwound and fed out of the wall outlet 600. Indicia 680c and 680d can also be provided on the cover to provide an indication as to which direction to move the selector plate 674 in order to attain the desired allowed rotational direction for the cover 660. Indicia 680e and 680f can also be provided on the selector plate 674 to indicate the position of the selector plate 674. For example, indicia 680e can be associated with the first position of the selector plate 674 while indicia 680f can be associated with the third position of the selector plate 674. As presented, the aperture 672a and selector plate 674 are configured such that only indicia 680e or indicia 680f is visible through the aperture 672a at any single time. This configuration ensures that it is clear to an operator that the indicia associated with the present position of the selector plate 674 is viewable through the aperture 672a.

Although the cable storage arrangements 200, 300, 400, and 500, 600 are described as being configure as wall outlets, their use and application is not limited to any such configuration. For example, cable storage arrangements 200, 300, 400, 500, 600 can be located between a wall outlet box 112 and an ONT 180, wherein a cable from the wall outlet box 112 or ONT 180 extends to the cable storage arrangement 200, 300, 400, 500, 600 and the jumper cable 190 extends to the other of the wall outlet box 112 and the ONT 180. Alternatively, the cable storage arrangement 200, 300, 400, 500, 600 can be configured such that the jumper cable 190 extends to both the wall outlet box 112 and the ONT 180, for example, by providing a free length of cable 190 at connector 192 instead of an adapter 236, 336, 436, 536, 636.

In one example implementation, and as shown at FIGS. 65 to 68, the wall outlet 600 is used as a cable storage component in a telecommunications package or box 700 which also includes an ONT 180 connected to a wireless (wi-fi) router 115 via a cable 114a. As shown, the telecommunications box 700 includes a cover 702 attached to a base 704 that defines an interior space 706. The ONT 114, the router 115 are mounted to the base and the wall outlet 600 is mounted above the ONT 114. The cable 191 from the wall outlet 600 is routed to the ONT 114. In this configuration, the stored cable 190 in the wall outlet 600 can be dispensed and routed to a wall outlet box 112 or can be used as the subscriber cable 110.

Yet another arrangement 800 is shown at FIGS. 69 to 72 which is similar to the telecommunications box 700 in that a router 115 and ONT 114 are mounted within an interior space 806 defined by a cover 802 and a base 804. However, a different storage component 900 is utilized instead of wall outlet 600. In one aspect, storage component 900 is provided with a central aperture 902 through which a pair of latch members 808 extend from the base 804 in order to secure the storage component 900 to the base 804. The latch members 808 form a snap-fit type connection with the storage component 900 and allow for the storage component 900 to rotate with respect to the base 804. The storage component 900 has a lower spool portion 904 about which cable 190 can be wound and an upper portion 906 which receives an end of the cable 190 and an adapter 908. Bend radius limiter structures 910 may be provided at the upper portion 906 to guide the cable 190 through an aperture leading from the lower portion 904 to the adapter 908. The upper portion 906 may be provided with a sidewall having ridges or a waved surface 912 to allow an operator to wind or unwind the cable 190 from the lower spool portion 904 by manually gripping and rotating the storage component 900. Of course, the cable 190 can be unwound from the lower spool portion 904 by simply pulling the cable 190. The base 804 can also be provided with an exit passageway 810 defined between a pair of bend radius limiters 812 to allow the cable 190 to be routed externally of the box 800.

Although storage components 600 and 900 are shown for the embodiments of FIGS. 48 to 54, any of the above disclosed wall outlets may be utilized.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

List of Reference Numerals and Corresponding Features

| | |
|---|---|
| F | facility |
| R | residences |
| 100 | fiber optic network |
| 102 | feeder cable |
| 104 | cable input location |
| 106 | fiber optic enclosure |
| 108 | riser cable |
| 110 | subscriber cable |
| 112 | wall outlet box |
| 114 | ONT |
| 114a | ONT to Wi-Fi cable |
| 117 | optical connector |
| 118 | power cable |
| 190 | jumper cable |
| 192 | connector |
| 194 | connector |
| 200 | wall outlet |
| 202 | mounting plate |
| 204 | sidewall |
| 206 | first side |
| 208 | second side |
| 210 | apertures |
| 212 | attachment structure |
| 212a | channel |
| 212b | open end |
| 212c | closed end |
| 220 | base structure |
| 222 | first sidewall |
| 223 | internal cavity |
| 224 | attachment structure |
| 224a | rib |
| 224b | rib |
| 226 | adapter mounting structure |
| 228 | bend radius limiter |
| 230 | bend radius limiter |
| 232 | aperture |
| 234 | aperture |
| 236 | adapter |
| 237 | spool structure |
| 238 | base wall |
| 248 | hub portion |
| 250 | second wall |
| 252 | first socket |
| 254 | second socket |
| 260 | cover |
| 262 | front wall |
| 264 | sidewall |
| 265 | projection |
| 266 | port |
| 268 | latches |
| 270 | flange wall |
| 300 | outlet |
| 302 | base part |
| 304 | attachment part |
| 306 | first portion |
| 308 | second portion |
| 310 | first portion |
| 312 | second portion |
| 314 | cover |
| 316 | recess |
| 318 | aperture |
| 320 | internal cavity |
| 322 | hollow winding interior |
| 324 | bushing |
| 336 | adapter |
| 400 | outlet |
| 420 | base structure |
| 420a | front face |
| 436 | adapter |
| 437 | spool structure |
| 438 | base wall |
| 448 | hub portion |
| 450 | cable retaining wall |
| 450a | front face |
| 500 | outlet |
| 520 | base structure |
| 536 | adapter |
| 537 | spool structure |
| 538 | base wall |

-continued

| List of Reference Numerals and Corresponding Features | | |
|---|---|---|
| 540 | first hub portion | |
| 542 | second hub portion | |
| 550 | first flange portion | |
| 552 | second flange portion | |
| 600 | wall outlet | |
| 602 | mounting plate | |
| 604 | sidewall | |
| 606 | first side | |
| 608 | second side | |
| 610 | apertures | |
| 612 | attachment structure | |
| 612a | recess | |
| 612b | latch aperture | |
| 614 | recess | |
| 616 | radius limiter | |
| 620 | base structure | |
| 622 | sidewall | |
| 623 | interior cavity | |
| 624 | attachment structure | |
| 624a | tab | |
| 624b | latch | |
| 626 | adapter mounting structure | |
| 628 | bend radius limiter | |
| 630 | bend radius limiter | |
| 632 | aperture | |
| 634 | bend radius limiter | |
| 637 | spool structure | |
| 638 | base wall | |
| 648 | hub portion | |
| 648a | interior portion | |
| 648b | latch tabs | |
| 648c | top edge | |
| 648d | grooves | |
| 650 | second wall | |
| 660 | cover | |
| 662 | front wall | |
| 662a | recessed portion | |
| 663 | aperture | |
| 664 | sidewall | |
| 665 | port structure | |
| 665a | central passageway | |
| 665b | bend radius limiter | |
| 665c | bottom plate | |
| 667 | ribs | |
| 668 | projection members | |
| 670 | selector assembly | |
| 672 | latch member | |
| 672a | aperture | |
| 672b | latch member | |
| 674 | selector plate | |
| 674a | handle portion | |
| 674b | plate portion | |
| 674c | guide rib | |
| 674d | indexing feature | |
| 674e | end stops | |
| 674f | engagement members | |
| 674g | engagement members | |
| 674h | engagement members | |
| 680a | indicia | |
| 680b | indicia | |
| 680c | indicia | |
| 680d | indicia | |
| 680e | indicia | |
| 680f | indicia | |
| 700 | telecommunications box | |
| 702 | cover | |
| 704 | base | |
| 706 | interior space | |
| 800 | telecommunications box | |
| 802 | cover | |
| 804 | base | |
| 806 | interior space | |
| 808 | latch members | |
| 900 | storage component | |
| 902 | central aperture | |
| 904 | lower spool portion | |
| 906 | upper storage portion | |

-continued

| List of Reference Numerals and Corresponding Features | | |
|---|---|---|
| 908 | adapter | |
| 910 | bend radius limiter structures | |
| 912 | ridged sidewall | |
| D1 | slide direction | |
| R1 | first rotational direction | |
| R2 | second rotational direction | |

What is claimed is:

1. A cable storage arrangement comprising:
a) a spool structure including a fixed hub portion extending between a fixed first wall and a fixed second wall, the spool structure being configured to be non-rotatably mounted to a mounting surface, the spool structure defining a first socket;
b) a length of cable extending between a first fiber optic connector and a second fiber optic connector, wherein at least a portion of the cable is coiled about the spool structure hub portion between the first and second walls; and
c) a circular cover rotatably mounted to the spool structure and rotatable with respect to the mounting surface, the cover including a projection received into the first socket such that the projection connects to the socket to secure the cover to the spool structure, the cover including a circumferential sidewall extending over the second wall and at least a portion of the hub portion, the cover sidewall including a port through which the length of cable can be dispensed from the spool structure by pulling and unwinding the cable about the spool structure with the port following the cable such that the cover revolves about the spool structure in an unwinding direction.

2. The cable storage arrangement of claim 1, wherein the projection includes one or more latches that engage with the first socket to retain the cover onto the spool structure.

3. The cable storage arrangement of claim 1, further comprising a base structure from which the spool structure extends and further comprising a mounting plate configured to be mounted to a wall and configured to be attached to the base structure.

4. The cable storage arrangement of claim 3, wherein the mounting plate includes a first attachment structure and the base structure includes a second attachment structure, wherein the first and second attachment structures are configure to engage each other, wherein the cable storage arrangement is configured as a wall outlet configured to receive a subscriber cable from a fiber optic enclosure remote from the cable storage arrangement.

5. The cable storage arrangement of claim 3, wherein the base structure includes a sidewall extending from the first wall, wherein the base structure sidewall, the first wall, and the mounting plate define an internal cavity, wherein an adapter is mounted at least partially within the internal cavity, the adapter being connected to the first fiber optic connector, wherein the base structure further includes at least one bend radius limiter for limiting the bending radius of the cable extending from the first fiber optic connector, wherein the first wall includes at least one aperture allowing the cable to pass from the internal cavity to the spool structure.

6. A cable storage arrangement comprising:
a) a spool structure including a fixed hub portion and being configured to be non-rotatably mounted to a mounting surface;

b) a length of cable coiled about the spool structure hub portion;

c) a cover secured to the spool structure and rotatable with respect to the mounting surface, the cover including a circumferential sidewall extending over at least a portion of the spool structure, the cover including a port through which the length of cable can be dispensed from the spool structure and through the cover by pulling and unwinding the cable about the spool structure with the port following the cable such that the cover revolves about the spool structure in an unwinding direction; and d) a selector assembly having at least a first position in which the cover is rotatable with respect to the spool structure and the mounting surface and a second position in which the cover is non-rotatable with respect to the spool structure and mounting surface.

7. The cable storage arrangement of claim 6, wherein the selector assembly secures the cover to the spool structure.

8. The cable storage arrangement of claim 6, wherein, when the selector assembly is in the first position, the cover is rotatable in a first rotational direction (R1) and is unable to be rotated in a second rotational direction opposite the first rotational direction.

9. The cable storage arrangement of claim 8, wherein when the selector assembly is in a third position, the cover is rotatable in the second rotational direction and is unable to be rotated in the first rotational direction.

10. The cable storage arrangement of claim 9, wherein the selector assembly is displaceable between the first, second, and third positions along a linear pathway.

11. The cable storage arrangement of claim 10, wherein the second position is between the first and third positions.

12. The cable storage arrangement of claim 6, wherein the selector assembly includes a handle portion extending through an aperture of the cover.

13. The cable storage arrangement of claim 12, wherein the selector assembly includes a plate portion having at least one pair of engagement members, that engage with projection members located on the cover based on the position of the plate portion.

14. The cable storage arrangement of claim 13, wherein the at least one pair of engagement members has: a) a ramped surface that allows the projection members to rotate past the at least one pair of engagement members in a first rotational direction; and b) a non-ramped surface opposite the ramped surface that prevents the projection members from rotating past the at least one pair of engagement members in a second rotational direction.

\* \* \* \* \*